(12) United States Patent
Karonis et al.

(10) Patent No.: US 7,584,123 B1
(45) Date of Patent: Sep. 1, 2009

(54) SYSTEMS FOR DYNAMICALLY ALLOCATING FINITE OR UNIQUE RESOURCES

(75) Inventors: Andrew Karonis, Europort (GI); Brendan Ross, Toronto (CA); Shigeki Hirose, Sammamish, WA (US); Dennis Denker, Scottsdale, AZ (US); Happy Kush, Venice, CA (US); Adam Sussman, Los Angeles, CA (US); Craig Mclane, South Pasadena, CA (US); Sean Moriarty, Pasadena, CA (US)

(73) Assignee: Ticketmaster, West Hollywood, CA (US)

( * ) Notice: Subject to any disclaimer, the term of this patent is extended or adjusted under 35 U.S.C. 154(b) by 666 days.

(21) Appl. No.: 11/100,336

(22) Filed: Apr. 6, 2005

Related U.S. Application Data

(60) Provisional application No. 60/559,982, filed on Apr. 6, 2004.

(51) Int. Cl.
G06Q 30/00 (2006.01)
(52) U.S. Cl. .......................... 705/26; 705/37
(58) Field of Classification Search .................. 705/26, 705/27, 37
See application file for complete search history.

(56) References Cited

U.S. PATENT DOCUMENTS

| | | |
|---|---|---|
| 3,581,072 A | 5/1971 | Nymeyer |
| 3,622,995 A | 11/1971 | Dilks |
| 4,412,287 A | 10/1983 | Braddock, III |
| 4,603,232 A | 7/1986 | Kurland et al. |
| 4,788,643 A | 11/1988 | Trippe et al. |
| 4,789,928 A | 12/1988 | Fujisaki |
| 4,799,156 A | 1/1989 | Shavit et al. |
| 4,816,904 A | 3/1989 | McKenna et al. |
| 4,845,739 A | 7/1989 | Katz |
| 4,862,357 A | 8/1989 | Ahlstrom et al. |
| 4,889,280 A * | 12/1989 | Grald et al. ............... 236/44 C |
| 4,980,826 A | 12/1990 | Wagner |
| 5,077,665 A | 12/1991 | Silverman et al. |
| 5,101,353 A | 3/1992 | Lupien et al. |
| 5,112,050 A | 5/1992 | Koza et al. |
| 5,136,501 A | 8/1992 | Silverman et al. |

(Continued)

FOREIGN PATENT DOCUMENTS

EP 0828223 A2 3/1998

(Continued)

OTHER PUBLICATIONS

Arey, N., "Tickets," Atlanta Constitution, p. E/8, Apr. 9, 1992.*

(Continued)

*Primary Examiner*—Nicholas D Rosen
(74) *Attorney, Agent, or Firm*—Knobbe, Martens, Olson & Bear LLP

(57) ABSTRACT

The present invention is related to electronically allocating finite or limited resources. In an embodiment, a computer system is configured to receive bids over a network from a first plurality of users for a limited number of units, the bids including associated bid amounts. A data store is operable to store the bid amounts. Program code is stored in computer readable memory and is configured to determine which bids are winning bids, determine a unit price for units associated with the winning bids, wherein the unit price associated with the winning bids is based on the lowest winning bid amount, and units can be tickets.

48 Claims, 67 Drawing Sheets

U.S. PATENT DOCUMENTS

| | | |
|---|---|---|
| 5,181,786 A | 1/1993 | Hujink |
| 5,237,499 A | 8/1993 | Garback |
| 5,239,480 A | 8/1993 | Huegel |
| 5,253,165 A | 10/1993 | Leiseca et al. |
| 5,265,916 A | 11/1993 | Coe |
| 5,283,734 A | 2/1994 | Von Kohorn |
| 5,311,425 A | 5/1994 | Inada |
| 5,329,589 A | 7/1994 | Fraser et al. |
| 5,333,257 A | 7/1994 | Merrill et al. |
| 5,347,306 A | 9/1994 | Nitta |
| 5,408,417 A | 4/1995 | Wilder |
| 5,422,809 A | 6/1995 | Griffin et al. |
| 5,426,281 A | 6/1995 | Abecassis |
| 5,428,778 A | 6/1995 | Brookes |
| 5,475,585 A | 12/1995 | Bush |
| 5,489,096 A | 2/1996 | Aron |
| 5,518,239 A | 5/1996 | Johnston |
| 5,553,145 A | 9/1996 | Micali |
| 5,557,518 A | 9/1996 | Rosen |
| 5,559,707 A | 9/1996 | DeLorme et al. |
| 5,592,375 A | 1/1997 | Salmon et al. |
| 5,598,477 A | 1/1997 | Berson |
| 5,664,115 A | 9/1997 | Fraser |
| 5,724,520 A | 3/1998 | Goheen |
| 5,742,763 A | 4/1998 | Jones |
| 5,754,654 A | 5/1998 | Hiroya et al. |
| 5,757,917 A | 5/1998 | Rose et al. |
| 5,774,873 A | 6/1998 | Berent et al. |
| 5,794,207 A | 8/1998 | Walker et al. |
| 5,794,210 A | 8/1998 | Goldhaber et al. |
| 5,794,219 A | 8/1998 | Brown |
| 5,797,126 A | 8/1998 | Helbling et al. |
| 5,812,670 A | 9/1998 | Micali |
| 5,818,914 A | 10/1998 | Fujisaki |
| 5,826,241 A | 10/1998 | Stein et al. |
| 5,835,896 A | 11/1998 | Fisher et al. |
| 5,845,266 A | 12/1998 | Lupien et al. |
| 5,850,442 A | 12/1998 | Muftic |
| 5,890,138 A | 3/1999 | Godin et al. |
| 5,918,209 A | 6/1999 | Campbell et al. |
| 6,023,685 A | 2/2000 | Brett et al. |
| 6,023,686 A | 2/2000 | Brown |
| 6,026,383 A | 2/2000 | Ausubel |
| 6,044,363 A | 3/2000 | Mori et al. |
| 6,047,264 A | 4/2000 | Fisher et al. |
| 6,048,271 A | 4/2000 | Barcelou |
| 6,067,532 A | 5/2000 | Gebb |
| 6,070,146 A | 5/2000 | Mimata |
| 6,082,620 A | 7/2000 | Bone, Jr. |
| 6,085,164 A | 7/2000 | Smith et al. |
| 6,085,169 A | 7/2000 | Walker et al. |
| 6,085,976 A | 7/2000 | Sehr |
| 6,094,640 A | 7/2000 | Goheen |
| 6,107,932 A | 8/2000 | Walker et al. |
| 6,119,096 A | 9/2000 | Mann et al. |
| 6,119,945 A | 9/2000 | Muller et al. |
| 6,175,922 B1 | 1/2001 | Wang et al. |
| 6,192,349 B1 | 2/2001 | Husemann et al. |
| 6,216,227 B1 | 4/2001 | Goldstein et al. |
| 6,223,166 B1 | 4/2001 | Kay |
| 6,230,146 B1 | 5/2001 | Alaia et al. |
| 6,240,396 B1 | 5/2001 | Walker et al. |
| 6,243,691 B1 | 6/2001 | Fisher et al. |
| 6,246,996 B1 | 6/2001 | Stein et al. |
| 6,308,159 B1 | 10/2001 | Strohl |
| 6,341,353 B1 | 1/2002 | Herman et al. |
| 6,418,415 B1 | 7/2002 | Walker et al. |
| 6,434,398 B1 | 8/2002 | Inselberg |
| 6,446,045 B1 | 9/2002 | Stone et al. |
| 6,449,346 B1 | 9/2002 | Katz |
| 6,466,917 B1 * | 10/2002 | Goyal et al. .................. 705/18 |
| 6,470,451 B1 | 10/2002 | Weinstein |
| 6,477,503 B1 | 11/2002 | Mankes |
| 6,484,153 B1 | 11/2002 | Walker et al. |
| 6,496,809 B1 | 12/2002 | Nakfoor |
| 6,523,037 B1 | 2/2003 | Monahan et al. |
| 6,603,568 B1 | 8/2003 | Sansone |
| 6,604,107 B1 | 8/2003 | Wang |
| 6,658,390 B1 | 12/2003 | Walker et al. |
| 6,679,421 B2 | 1/2004 | Shin et al. |
| 6,685,093 B2 | 2/2004 | Challa et al. |
| 6,690,794 B1 | 2/2004 | Terao et al. |
| 6,704,713 B1 | 3/2004 | Brett et al. |
| 6,736,322 B2 | 5/2004 | Gobburu et al. |
| 6,820,201 B1 | 11/2004 | Lincoln et al. |
| 6,842,741 B1 | 1/2005 | Fujimura |
| 6,854,651 B2 | 2/2005 | Smith et al. |
| 6,877,661 B2 | 4/2005 | Webb et al. |
| 6,877,665 B2 | 4/2005 | Challa et al. |
| 6,901,429 B2 | 5/2005 | Dowling |
| 6,907,405 B2 | 6/2005 | Brett |
| 6,910,019 B2 | 6/2005 | Dorr |
| 6,910,627 B1 | 6/2005 | Simpson-Young et al. |
| 6,920,428 B2 | 7/2005 | Greene |
| 6,944,599 B1 | 9/2005 | Vogel et al. |
| 6,963,854 B1 | 11/2005 | Boyd et al. |
| 6,965,914 B2 | 11/2005 | Dowling |
| 6,999,936 B2 | 2/2006 | Sehr |
| 7,003,485 B1 | 2/2006 | Young |
| 7,004,388 B2 * | 2/2006 | Kohta ......................... 235/381 |
| 7,010,494 B2 | 3/2006 | Etzioni et al. |
| 7,031,945 B1 | 4/2006 | Donner |
| 7,044,362 B2 | 5/2006 | Yu |
| 7,058,602 B1 | 6/2006 | La Mura et al. |
| 7,069,243 B2 | 6/2006 | Dinwoodie |
| 7,076,460 B2 | 7/2006 | Dinwoodie |
| 7,080,026 B2 | 7/2006 | Singh et al. |
| 7,080,030 B2 | 7/2006 | Eglen et al. |
| 7,080,328 B1 | 7/2006 | Sawyer |
| 7,080,882 B2 | 7/2006 | Stitt |
| 7,083,081 B2 | 8/2006 | McGee et al. |
| 7,085,818 B2 | 8/2006 | Brown et al. |
| 7,092,892 B1 | 8/2006 | Sobalvarro et al. |
| 7,093,130 B1 | 8/2006 | Kobayashi et al. |
| 7,099,841 B1 | 8/2006 | Hall et al. |
| 7,110,960 B2 | 9/2006 | Phillips et al. |
| 7,114,179 B1 | 9/2006 | Ritter et al. |
| 7,127,404 B1 | 10/2006 | Poon |
| 7,127,408 B2 | 10/2006 | Rosen |
| 7,133,848 B2 | 11/2006 | Phillips et al. |
| 7,139,916 B2 | 11/2006 | Billingsley et al. |
| 7,149,549 B1 | 12/2006 | Ortiz et al. |
| 7,152,043 B2 | 12/2006 | Alaia et al. |
| 7,162,454 B1 | 1/2007 | Donner et al. |
| 7,191,147 B2 | 3/2007 | Heene et al. |
| 2001/0034687 A1 | 10/2001 | Bushonville et al. |
| 2001/0049652 A1 | 12/2001 | Nakajima |
| 2002/0004762 A1 | 1/2002 | Izumoto |
| 2002/0023955 A1 | 2/2002 | Frank et al. |
| 2002/0040308 A1 | 4/2002 | Hasegawa et al. |
| 2002/0040346 A1 | 4/2002 | Kwan |
| 2002/0042729 A1 | 4/2002 | Yajima et al. |
| 2002/0052758 A1 | 5/2002 | Arthur et al. |
| 2002/0052965 A1 | 5/2002 | Dowling |
| 2002/0062265 A1 | 5/2002 | Poon |
| 2002/0065763 A1 | 5/2002 | Taylor et al. |
| 2002/0065783 A1 | 5/2002 | Na et al. |
| 2002/0082879 A1 | 6/2002 | Miller et al. |
| 2002/0082969 A1 * | 6/2002 | O'Keeffe et al. ............... 705/37 |
| 2002/0087456 A1 | 7/2002 | Abeshouse et al. |
| 2002/0091555 A1 | 7/2002 | Leppink |
| 2002/0095357 A1 | 7/2002 | Hunter et al. |
| 2002/0103849 A1 | 8/2002 | Smith |
| 2002/0107779 A1 | 8/2002 | Maltzman |

| | | |
|---|---|---|
| 2002/0116343 A1 | 8/2002 | Nakamura et al. |
| 2002/0128922 A1 | 9/2002 | Joao |
| 2002/0138325 A1 | 9/2002 | Mashimo et al. |
| 2002/0138751 A1 | 9/2002 | Dutta |
| 2002/0138770 A1 | 9/2002 | Dutta |
| 2002/0156715 A1 | 10/2002 | Wall et al. |
| 2002/0169623 A1 | 11/2002 | Call et al. |
| 2002/0178093 A1 | 11/2002 | Dean et al. |
| 2002/0188551 A1 | 12/2002 | Grove et al. |
| 2003/0040943 A1 | 2/2003 | Bates et al. |
| 2003/0061303 A1 | 3/2003 | Brown et al. |
| 2003/0067464 A1 | 4/2003 | Gathman et al. |
| 2003/0069762 A1 | 4/2003 | Gathman et al. |
| 2003/0069763 A1 | 4/2003 | Gathman et al. |
| 2003/0069764 A1 | 4/2003 | Gathman et al. |
| 2003/0069789 A1 | 4/2003 | Gathman et al. |
| 2003/0069810 A1 | 4/2003 | Gathman et al. |
| 2003/0069827 A1 | 4/2003 | Gathman et al. |
| 2003/0069829 A1 | 4/2003 | Gathman et al. |
| 2003/0105641 A1 | 6/2003 | Lewis |
| 2003/0154142 A1 | 8/2003 | Ginsburg et al. |
| 2003/0154169 A1 | 8/2003 | Yanai |
| 2003/0163373 A1 | 8/2003 | Cornateanu |
| 2003/0164400 A1 | 9/2003 | Boyd |
| 2003/0171960 A1 | 9/2003 | Skinner |
| 2003/0177022 A1 | 9/2003 | Francis |
| 2003/0187802 A1 | 10/2003 | Booth |
| 2003/0229790 A1 | 12/2003 | Russell |
| 2003/0236736 A1* | 12/2003 | Harmon et al. ............... 705/37 |
| 2004/0006497 A1 | 1/2004 | Nestor et al. |
| 2004/0019571 A1 | 1/2004 | Hurwitz et al. |
| 2004/0039635 A1 | 2/2004 | Linde et al. |
| 2004/0039696 A1 | 2/2004 | Harmon et al. |
| 2004/0049412 A1 | 3/2004 | Johnson |
| 2004/0073439 A1 | 4/2004 | Shuster |
| 2004/0083156 A1 | 4/2004 | Schulze |
| 2004/0086257 A1* | 5/2004 | Werberig et al. ............... 386/46 |
| 2004/0093175 A1 | 5/2004 | Tan |
| 2004/0111303 A1 | 6/2004 | Francis |
| 2004/0128257 A1 | 7/2004 | Okamoto et al. |
| 2004/0128516 A1 | 7/2004 | Okamoto et al. |
| 2004/0138962 A1 | 7/2004 | Kopelman et al. |
| 2004/0172270 A1 | 9/2004 | Sugimoto et al. |
| 2004/0204990 A1 | 10/2004 | Lee et al. |
| 2004/0204991 A1 | 10/2004 | Monahan et al. |
| 2004/0205013 A1* | 10/2004 | DeLaCruz ................... 705/37 |
| 2004/0215527 A1 | 10/2004 | Grove et al. |
| 2004/0220821 A1 | 11/2004 | Ericsson et al. |
| 2005/0001711 A1 | 1/2005 | Doughty et al. |
| 2005/0015303 A1 | 1/2005 | Dubin et al. |
| 2005/0015308 A1 | 1/2005 | Grove et al. |
| 2005/0021364 A1 | 1/2005 | Nakfoor |
| 2005/0021365 A1 | 1/2005 | Nakfoor |
| 2005/0027608 A1 | 2/2005 | Wiesmuller et al. |
| 2005/0027641 A1 | 2/2005 | Grove et al. |
| 2005/0065866 A1 | 3/2005 | Grove et al. |
| 2005/0071245 A1 | 3/2005 | Norins, Jr. et al. |
| 2005/0131809 A1 | 6/2005 | Watt, II et al. |
| 2005/0139661 A1 | 6/2005 | Eglen et al. |
| 2005/0139662 A1 | 6/2005 | Eglen et al. |
| 2005/0140675 A1 | 6/2005 | Billingsley et al. |
| 2005/0144115 A1 | 6/2005 | Brett |
| 2005/0149458 A1 | 7/2005 | Eglen et al. |
| 2005/0160020 A1 | 7/2005 | Asher et al. |
| 2005/0165758 A1 | 7/2005 | Kasten et al. |
| 2005/0209954 A1 | 9/2005 | Asher et al. |
| 2005/0228722 A1 | 10/2005 | Embree |
| 2005/0240453 A1 | 10/2005 | Lyons |
| 2005/0273405 A1 | 12/2005 | Chen |
| 2006/0017541 A1 | 1/2006 | Nguyen |
| 2006/0085396 A1 | 4/2006 | Evans et al. |
| 2006/0095344 A1 | 5/2006 | Nakfoor |
| 2006/0100985 A1 | 5/2006 | Mark et al. |
| 2006/0105783 A1 | 5/2006 | Giraldin et al. |
| 2006/0108418 A1 | 5/2006 | Rice |
| 2006/0111967 A1 | 5/2006 | Forbes |
| 2006/0116916 A1 | 6/2006 | Bowman et al. |
| 2006/0124734 A1 | 6/2006 | Wallerstorfer et al. |
| 2006/0140374 A1 | 6/2006 | Light et al. |
| 2006/0143094 A1 | 6/2006 | Kohout et al. |
| 2006/0143109 A1 | 6/2006 | Goel |
| 2006/0143698 A1 | 6/2006 | Ohara |
| 2006/0144946 A1 | 7/2006 | Kuriyama et al. |
| 2006/0148566 A1 | 7/2006 | Lakshminarasimha |
| 2006/0155659 A1 | 7/2006 | DiCesare |
| 2006/0167756 A1 | 7/2006 | VonBergen et al. |
| 2006/0178930 A1 | 8/2006 | Kim |
| 2006/0190387 A1 | 8/2006 | Molloy |
| 2006/0190388 A1 | 8/2006 | Molloy |
| 2006/0190389 A1 | 8/2006 | Molloy |
| 2006/0190390 A1 | 8/2006 | Molloy |
| 2006/0195356 A1 | 8/2006 | Nerenhausen et al. |
| 2006/0232110 A1 | 10/2006 | Ovadia |
| 2006/0244564 A1 | 11/2006 | Madsen |
| 2006/0249572 A1 | 11/2006 | Chen et al. |
| 2006/0271462 A1 | 11/2006 | Harmon |
| 2006/0277130 A1 | 12/2006 | Harmon |
| 2006/0293929 A1 | 12/2006 | Wu et al. |
| 2006/0293994 A1 | 12/2006 | Stuart |
| 2007/0012765 A1 | 1/2007 | Trinquet et al. |
| 2007/0017979 A1 | 1/2007 | Wu et al. |
| 2007/0055554 A1 | 3/2007 | Sussman et al. |

FOREIGN PATENT DOCUMENTS

| | | |
|---|---|---|
| EP | 1069539 A2 | 1/2001 |
| JP | 5266049 | 10/1993 |
| JP | 11031204 A | 2/1999 |
| WO | WO 88/03295 | 5/1988 |
| WO | WO 98/10361 | 3/1998 |
| WO | WO 99/06928 | 2/1999 |
| WO | WO 99/18533 | 4/1999 |
| WO | WO 99/38129 | 7/1999 |
| WO | WO 99/60489 | 11/1999 |
| WO | WO 00/62260 | 10/2000 |
| WO | WO 00/74300 A1 | 12/2000 |
| WO | WO 00/75838 A1 | 12/2000 |
| WO | WO 01/03040 A1 | 1/2001 |
| WO | WO 01/08065 A1 | 2/2001 |
| WO | WO 01/41021 A1 | 6/2001 |
| WO | WO 01/41085 A2 | 6/2001 |
| WO | WO 01/44892 A2 | 6/2001 |
| WO | WO 01/52139 A1 | 7/2001 |
| WO | WO 01/59649 A1 | 8/2001 |
| WO | WO 01/59658 A1 | 8/2001 |
| WO | WO 01/71669 A2 | 9/2001 |
| WO | WO 01/84473 | 11/2001 |
| WO | WO 02/03174 | 1/2002 |
| WO | WO 02/35322 A2 | 5/2002 |
| WO | WO 03/027808 A2 | 4/2003 |

OTHER PUBLICATIONS

Postelnicu, A., "Tickets.com Inc.", Venture Capital Journal, pp. 67-68, Jan. 1, 2000.*
Anon., "techies.com Launches Reverse Auction Place for Technology Training," Business Wire, p. 2115, Jul. 17, 2000.*
"Acteva and Enspot.com Sign Agreement to Provide On-Line Ticketing, Broader Distribution", Business Wire (Dec. 3, 1999).
"AuctionNet Still One-Of-A-Kind", Automotive News, S12 (Sep. 20, 1993).
"Cathay Pacific Airways Auctions a Boeing 747-400 Worth of Seats in Third Cybertraveler Auction", Business Wire (Apr. 29, 1996).
"Cathay Pacific Airways-USA Receives More than 1,300 Bids During First Five Days of CyberAuction", Business Wire (Oct. 18, 1995).
"Cathay Pacific Airways-USA to Hold First-Ever Internet CyberAuction", Business Wire (Sep. 26, 1995).

"E-TicketBoard Launches PSL Xchange for Eight NFL Teams", PR Newswire (Jul. 18, 2000).
"E-TicketBoard Launches Revolutionary New Site—SeatsandSuites", PR Newswire (Oct. 17, 2000).
"Keyware Unveils Multi-Application Smart Card Suite", Card News, vol. 16, No. 10 (May 30, 2001).
"Online Movie Ticket Site Launched in China", China Online (Dec. 23, 1999).
"OnSale Brings Thrill of the Auction to the Web", Link-up p. 34 (Jul./Aug. 1995).
"Season Ticket Solutions Announces Availability of Ticket Exchange for Sporting Teams and Entertainment Venues", Business Wire (Jul. 30, 2001).
"WBGH to Hold Online Computer Auction", Link-Up, p. 10 (Sep./Oct. 1988).
Banâtre, "Distributed Auction Bidding System", International Computing Symposium, vol. 4, No. 4 (Aug. 1981).
Banks, "PSL Put Owners on the Hot Seat", St. Petersburg Times, p. 10C (Oct. 31, 1993).
Beam et al., "Electronic Negotiation through Internet-Based Auctions", CITM Working Paper 96-WP-1019, http://haas.berkeley.edu/citm/publications/papers/wp-1019.pdf (Dec. 1996).
Blau, "Dormitories See Departure from Previous Years' Trends", The Tech, vol. 116, No. 38 (Aug. 30, 1996).
Boyes et al, "Auctions as an Allocation Mechanism in Academia: The Case of Faculty Offices", Journal of Economic Perspectives, vol. 3, No. 3, pp. 37-40 (Summer 1989).
Collier, "Columbia, S.C.-Based Internet Firm Helps Buy, Sell Sports Tickets", The State, (Oct. 23, 2000).
Dickey, "Raider PSL Without Permanent Place", San Francisco Chronicle, p. B2 (Jun. 26, 1997).
Dickey, "Raiders' PSLs May Be for Life", San Francisco Chronicle, p. D5 (Mar. 26, 1997).
Garza, "Space Cruise", Reason (May 2000).
Happel, "Creating a Futures Market for Major Event Tickets: Problems and Prospects", Cato Journal, vol. 21, No. 3 (Winter 2002).
Harlan, "At Least it isn't the Team's Ball that's in Somebody Else's Court", Wall Street Journal (Jun. 4, 1991).
Holbrook, "Oakland, Calif., Professional Football Team Sees Gain in Seat License Sales", Contra Costa Times (Feb. 26, 2001).
Hylton, "Dorm Lottery Starts Strong", The Tech, vol. 114, No. 34 (Aug. 29, 1994).
Jackson, "Media Futures: This Bazaar Could Put Retailers Under the Hammer", Financial Times (May 25, 1995).
Jenkins, "Giants Draw Fans into Web Team Helps Season-Ticket Holders Get Mileage Out of Plans", USA Today, p. 3C (Jun. 27, 2000).
Kasper, "Purchase Griz Playoff Tickets Now", Missoulian Online (May 3, 2001).
Koenig, "Texas Firm Links Sports Teams, Fans", Amarillo Globe-News, Feb. 20, 2000).
Kravets, "Going, Going, Gone! Real Estate Auctions in the 90s", Probate & Property, p. 38 (May/Jun. 1993).
Kroll et al, "The Commodity Futures Market Guide", Harper and Row, pp. 9-10 (1973).
Kumar, "With Stars in their Eyes, Travelers Look to Space", St. Petersburg Times, p. 1A (Jun. 11, 2000).
Labuszewski et al, "Inside the Commodity Option Markets", John Wiley & Sons, pp. 19-21 (1985).
Liao, "Sloan's Class Priority System Set to Go", The Tech, vol. 116, No. 25 (May 10, 1996).
Martin, "LiquidSeats Helps Fill the House, Sans Scalping" cnn.com, (Dec. 14, 2000).
Matsumoto et al, "Feasibility of Space Tourism 'Cost Study for Space Tour'", Proceedings of 40th IAF Congress, Paper IAF-89-700 (1989).
Menezes et al, "Simultaneous Pooled Auctions", The Journal of Real Estate Finance and Economics, vol. 17(3), pp. 219-232 (Nov. 19, 1996).
Moldovanu et al, "The Optimal Allocation of Prizes in Contests", http://www.sfb504.uni-mannheim.de/publications/dp99-75.pdf (Jul. 14, 1999).
Nestor et al, "Transforming Tickets from a Commodity into a Valuable Strategic Asset", Global eTicket Exchange whitepaper, Oct. 13, 2000.
O'Neil, "Q and A", St. Louis Post-Dispatch, p. 4D (Jan. 19, 1995).
Riley et al, "Optimal Auctions", The American Economic Review, vol. 71, No. 3, pp. 381-392 (Jun. 1981).
Rosen et al, "Ticket Pricing" University of Chicago Center for the Study of the Economy and the State (Sep. 1995).
Rubel, "ETM to Ticketmaster: Let's Rock", Marketing News (Jun. 19, 1995).
Stevenson, "Frosh Get at Least Fifth Choice Dorm: Women Find Shortage of Single-Sex Rooms", The Tech, vol. 115, No. 37 (Aug. 31, 1995).
Thomas, "Deadline Looms for Playoff Tickets; PSL Owners Have Until Dec. 8 to Make Purchase", St. Louis Post-Dispatch, p. D8 (Dec. 3, 1999).
Waddell, "Advantix, Tickets.com Hope Merger Brings Best of Both Ticketing Worlds", Amusement Business (Feb. 8, 1999).
Wagner, "How Retailers are Using Web Auctions to Let Customers Help Them Set Prices", http://www.internetretailer.com/printArticle.asp?id=3164 (Mar. 2001).
www.TicketOptions.com Web Pages, as retreived from archive.org (2001).
wwwSeasonTicket.com Web Pages, as retreived from archive.org (2001).
Zoltak, "Advantix Acquisitions Continue with Protix Deal", Amusement Business (Nov. 2, 1998).
Hes, et al. "At Face Value" On biometrical identification and privacy, Registratiekamer, Sep. 1999; 78 pp.
Fujimura, "XML Ticket: Generalized Digital Ticket Definition Language", The W3C Signed XML Workshop—Copyright © 1999, 33 pages.
Matsuyama, et al. "Distributed Digital-Ticket Management for Rights Trading System", E-Commerce, 1999; pp. 110-118.
In, Shirley Siu Weng, "A Proposed Electronic Ticket Management for trading Service in Internet", Feb. 9, 2001; 7 pages.
Article from Smart Card News, "Major Players Form Proton World International", Aug. 1998, pp. 141-160.
Fujimura, et al. "General-purpose Digital Ticket Framework", NTT Information and Communication Systems Labs, USENIX Workshop on Electronic Commerce; Aug. 31-Sep. 1998.
Fujimura, et al. "Digital-Ticket-Controlled Digital Ticket Circulation", NTT Information Sharing Platform Laboratories, USENIX Security Symposium, Aug. 23-26, 1999.
Chui, et al. "Auction on the Internate—A Preliminary Study", Department of Marketing, HK Univiersity of Science and Technology; 1999, pp. 1-7.
Asokan, et al. "Semper Consortium: Advanced Services, Architecture and Design", Deliverable D10 of ACTS Project AC026, Mar. 15, 1999.
U.S. Appl. No. 09/702,794, filed Nov. 1, 2000.
Office Action mailed on Aug. 2, 2007 in U.S. Appl. No. 11/453,286.
Office Action mailed on Jul. 27, 2007 in U.S. Appl. No. 11/475,733.

* cited by examiner

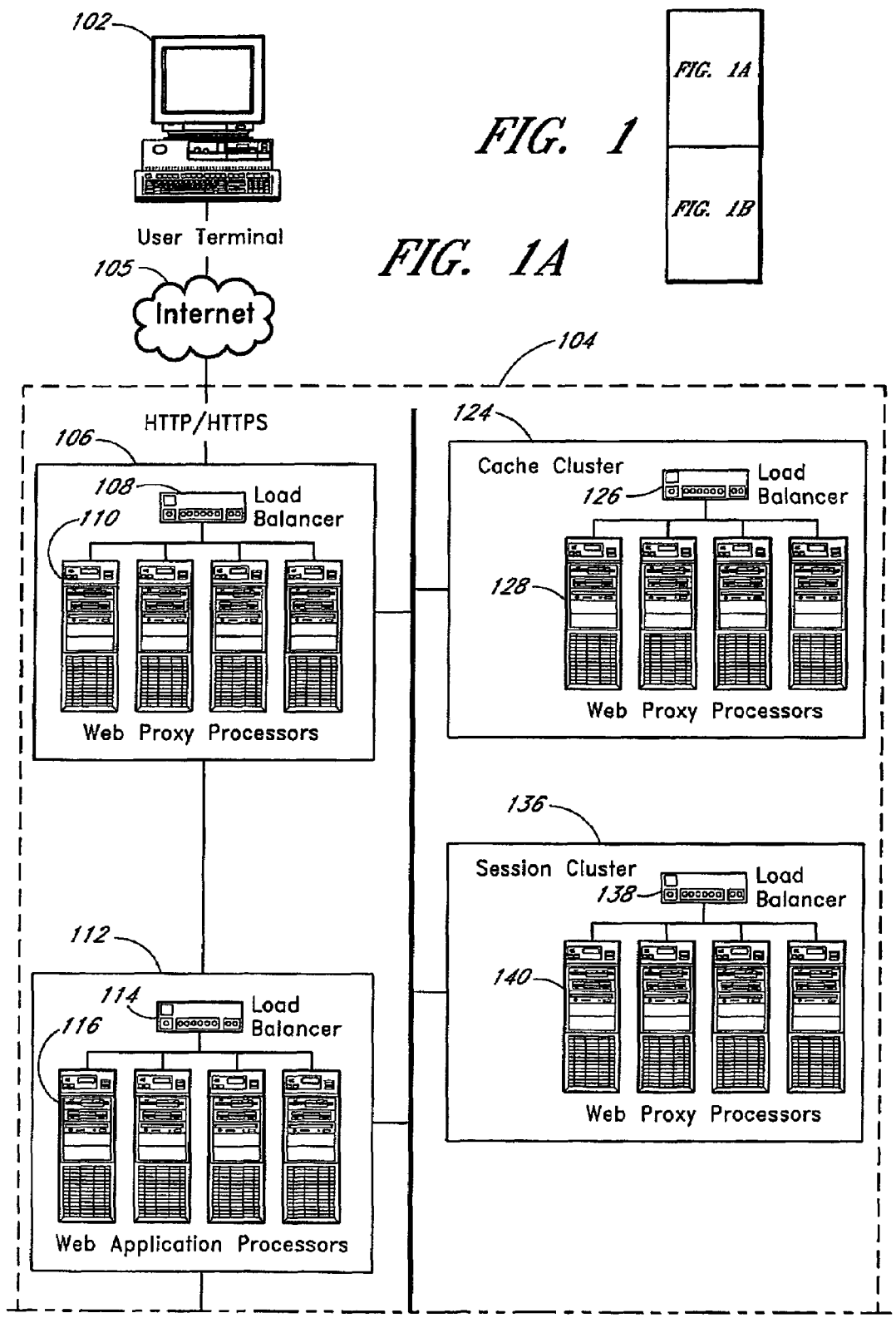

bid on tickets / Help with bidding

Already bid in this auction?  *201B*

Number of Tickets: [0 ▼]

Max Bid Per Ticket: $ [ ]

(Bid must be in multiples of $5)

☑ Email me if I am outbid

You must confirm your bid on the next page

[♿ REQUEST ACCESSIBLE TICKET]

auction status  *208B*

Auction ends in: 1 Day 18 hours 2 Minutes

| Ticket Groups | Low Bid |
|---|---|
| General Admission | $150 |

As of Wed. August 27 at 4:00 pm Pacific

Auction starting bid $100 per ticket

Learn about Ticket Groups

[refresh status]

auction info  *210B*

Rules

- You can only have one valid bid at a time in an auction. Once you submit a bid, you will not be able to cancel it

- You may rebid and increase your bid amount at any time before the auction ends. If you rebid it is considered your new bid; your previous bid will no longer be valid

- Bids are ranked first by the amount bid per ticket. Ties will be broken based on the time that the bids were placed with earlier bids receiving priority. Higher ranked bids may bump your bid into lower Ticket Groups or out of the auction entirely

- If you have a valid winning bid when the auction ends, your credit card will be charged a per ticket price equal to the lowest winning bid at the close of auction plus a delivery price (if applicable) and a processing fee.

- The auction is also subject to the Auction Terms and the Ticketmaster Policies, which shall be considered part of the auction rules

*FIG. 3*

| bid on tickets | Help with bidding |
|---|---|

*201C*

Already bid in this auction?

Number of Tickets: [ 0 ▼ ]

Max Bid Per Ticket: $ [          ]

(Bid must be in multiples of $5)

☑ Email me if I am outbid

You must confirm your bid on the next page

[♿ REQUEST ACCESSIBLE TICKET]

| auction status | *208C* |
|---|---|

Auction ends in: 1 Day 18 hours 2 Minutes

| Ticket Groups | Low Bid |
|---|---|
| First Row | $600 |
| Second Row | $375 |
| Rows 3 to 5 | $220 |
| Rows 6 to 10 | $150 |
| Rows 11 to 20 | $110 |

*As of Wed. August 27 at 4:00 pm Pacific*

Auction starting bid $100 per ticket

Learn about Ticket Groups

[ refresh status ]

auction info

*210C*

Rules

- You can only have one valid bid at a time in an auction. Once you submit a bid, you will not be able to cancel it

- You may rebid and increase your bid amount at any time before the auction ends. If you rebid it is considered your new bid; your previous bid will no longer be valid

- Bids are ranked first by the amount bid per ticket. Ties will be broken based on the time that the bids were placed with earlier bids receiving priority. Higher ranked bids may bump your bid into lower Ticket Groups or out of the auction entirely

- If you have a valid winning bid when the auction ends, your credit card will be charged a per ticket price equal to the Low Bid for the Ticket Group your is in plus a delivery price (if applicable) and a processing fee.

- The auction is also subject to the Auction Terms and the Ticketmaster Policies, which shall be considered part of the auction rules

*FIG. 4*

Navigation Naming Conventions

ADP Name

ADP named "<Artist>-<Auction Inventory Group>". This is a concatenation of two names with a "-" between them
    <Artist> is taken from first the Performer name and if no Performer then Primary Act
    <Auction Inventory Group> is the name given to the auction inventory in the Auction Event editor

Example Navigation Links

Pre-Auction ⟶ <u>Cher - Charity Auction</u>    Sat, 8/13/03
                       STAPLES Center Auction Open ⟶ <u>Cher - Charity Auction</u>    <u>Auction Open</u>
                        STAPLES Center        Closes 8/20/03

Auction Closed ⟶ Auction should not appear on Home or Categories after it is closed All other TM links including EDP Pre-Auction ⟶ <u>Cher - Charity Auction</u>    <u>More Info</u>
                       STAPLES Center        Auction Opens 8/13/03

Auction Open ⟶ <u>Cher - Charity Auction</u>    <u>Auction Open</u>
                        STAPLES Center        Closes 8/20/03

Auction Closed ⟶ <u>Cher - Charity Auction</u>    <u>Auction Closed</u>
                       STAPLES Center        Ended 8/20/03

Calendar View

Pre-Auction ⟶ <u>Cher - Charity Auction</u>    <u>Auction Info</u>
                       STAPLES Center Auction Open ⟶ <u>Cher - Charity Auction</u>    <u>Auction Open</u>
                        STAPLES Center Auction Closed ⟶ <u>Cher - Charity Auction</u>    <u>Auction Results</u>
                       STAPLES Center

*FIG. 6*

FIG. 7 ticketmaster

- The auction you requested has closed.

ticketmaster

- The auction you requested has closed. Refer to the links below for additional ticket information:

Onsale

| Sun, 8/10/03 4:00 pm | Cher | Hollywood Bowl Los Angeles, CA | Auction Open Closes 8/20/03 | auctions

| Sun, 8/10/03 4:00 pm | Cher – VIP Auction | Hollywood Bowl Los Angeles, CA | Auction Open Closes 8/20/03 |
| Sun, 8/10/03 4:00 pm | Cher – Charity Auction | Hollywood Bowl Los Angeles, CA | More Info Auction Opens 8/15/03 |

Callouts:
- If there are >=1 other channels available to purchase tickets
- Links to EDP – display rules as exist currently on TM.com
- Links ADP – display rules as listed on Naming page
- If there are no other channels available to purchase tickets
- If 1 then "link" If >=1 then "links"
- Auctions will show up in this list if it is after the ADP Release Date and before the ADP Expiration Date
- EDP will show here if after EDP Release Date
- "auctions" If>1 or "auction" If=1

| File | Edit | View | Go | Favorite | Help |

STAPLES Center
1111 S. Figueroa St., Los Angeles, CA. 90015

[ View a Seating Chart ▼ ]  ( Go )

directions

ESPN X GAMES
For event times and dates please refer to EXPN.COM

Driving Directions To The STAPLES Center

101 Southbound (from Thousand Oaks, Simi Valley, San Fernando Valley, etc.)
* 101 South To 110 South/Pasadena Fwy. Exit Towards Harbor Fwy/San Pedro
* Exit Olympic Blvd. And Turn Left to 11th St.
* Turn Left Onto 11th St.
* Continue Straight To The West Hall Convention Center Parking Structure 405 Northbound (from San Diego, Orange County, Anaheim, etc.)
* 405 North to 110 North Towards Los Angeles
* Take 10 East Towards Santa Monica/San Bernadino
* Exit Pico Blvd. And Continue Straight On Cherry St. Past Pico Blvd.
* Turn Right Into West Hall Convention Center Parking Structure 10 Eastbound (from San Bernadino, Riverside, Pomona, Ontario, etc.)
* 10 West Towards Los Angeles
* Take 101 North to 110 South Towards San Pedro And Exit Olympic Blvd.
* Turn Left To First Traffic light (11th ST.)
* Turn Left Onto 11th St. and Continue To West Hall Convention Center Parking Structure 110 Southbound (from Burbank, Glendale, Pasadena)

event schedule

● Showing 1 – 20 of 22 events                    (1 – 20) next ▶

| | | |
|---|---|---|
| Thu, 09/14/03 10:00 am | ESPN X Games IX – STAPLES Center | Find Tickets on sale now |
| Fri, 08/15/03 10:00 am | ESPN X Games IX – STAPLES Center | Find Tickets on sale now |
| Sat, 08/16/03 10:00 am | ESPN X Games IX – STAPLES Center | Find Tickets on sale now |
| Sun, 08/17/03 10:00 am | ESPN X Games IX – STAPLES Center | More Info currently not on sale |
| Thu, 08/21/03 7:30 pm | Cher | Auction Open closes 8/20/03 |
| Thu, 08/21/03 7:30 pm | Cher – VIP Auction | Find Tickets on sale now |
| Fri, 08/22/03 8:00 pm | Redwon–Bigwon | Find Tickets on sale now |
| Fri, 08/22/03 8:00 pm | STAPLES Parking | Find Tickets on sale now |
| Sat, 08/23/03 7:30 pm | Los Angeles Sparks vs. San Antonio Silver Stars | Find Tickets on sale now |
| Sat, 08/23/03 7:30 pm | STAPLES Parking | Find Tickets on sale now |
| Sun, 08/24/03 7:30 pm | STAPLES Parking – Toby Keith | Find Tickets on sale now |

FIG. 11

| File | Edit | View | Go | Favorite | Help |

| home | concerts | sports | arts & theater | family | enter artist, team or venue
[Cher] (Search)

Los Angeles & Surrounding Areas
Change location

● Your search for "cher" returned: 8 act, team, or show matches act, team, or shows showing 1 - 8 act, team, or show matches

| | | |
|---|---|---|
| Cher | Rock and Pop | dates scheduled in your area |
| Premier Parking: Cher | Parking | dates scheduled in your area |
| Journal Pavilion Premier Parking: Cher | Parking | dates scheduled |
| Premier Parking for Cher | Parking | dates scheduled |
| West Bottoms Parking Garage -- Cher | Parking | dates scheduled |
| Woodlands parking for Cher | | |
| Cher U.K. | Rock and Pop | no dates scheduled |
| DJ Cher | Rock and pop | no dates scheduled |

FIG. 12

File  Edit  View  Go  Favorite  Help

| home | concerts | sports | arts & theater | family | enter artist, team or venue [Search]

Cher
Hollywood Bowl, Los Angeles, CA
Wed. Oct. 15, 2003 7:30pm

Price | seating chart

Ticket Limit

There is an 8 ticket limit for this event during public onsale. Presale ticket limit is 4.

Please adhere to published ticket limits. Orders exceeding the ticket limit will be canceled without notice. This includes duplicate orders having the same name, billing address or credit card.

Internet Onsale Info
Onsale to General Public:
Sat, 08/16/03, 10:00am

Internet Presale Info
getAccess presale:
Starts: Wed, 08/10/03, 10:00am
Ends: Thu, 08/15/03, 5:00pm cc.com presale:
Start: 08/15/03, 10:00am
Ends: Fri, 08/15/03 5:00pm look for tickets auction for this event

| | Open | Closed | Status |
|---|---|---|---|
| Cher – VIP Auction | 8/13/03 | 8/20/03 | Auction Open<br>4 Days Remaining |
| Cher – Charity Auction | 8/18/03 | 8/20/03 | More Info<br>Auction Opens 8/15/03 |

Tickets are not currently available thru Onsale or Presale. Why?

- Tickets may not be on sale yet.
- Tickets may simply not be available at this time. More tickets may become available later.
- Tickets may not be available online just hours before an event occurs.
- On rare occasions, tickets may only be available at ticket outlets or the box office.

[Back]

Sign up now!

Become a Ticketmaster member and register your information before purchasing tickets. Join today!

[Register]

ticketAlert

Find out when your favorite performers and teams will be in your area
Email me in advance when tickets go on sale for:

☐ Cher

Email me the monthly calendar for my favorite venue(s):

☐ Scope

Your Email Address          Your Zip Code

[Notify Me]

Ticketmaster Privacy Policy

*FIG. 13*

```
┌─────────────────────────────────────────────────────────────────────┐
│                                                      _ □ ⊠          │
│ File  Edit  View  Go  Favorite  Help                                │
│  ┌──────┬────────┬───────┬──────────────┬────────┐                  │
│  │ home │concerts│ sports│ arts & theater│ family │                 │
│  └──────┴────────┴───────┴──────────────┴────────┘                  │
│  enter artist, team or venue                                        │
│  ┌────────────────┐ ┌Search┐                                        │
│  └────────────────┘ └──────┘                                        │
│  ┌────────────────────────────────────────────────────────────────┐ │
│  │ Cher                                                           │ │
│  │ Hollywood Bowl, Los Angeles, CA                                │ │
│  │ Wed. Oct. 15, 2003  7:30pm                                     │ │
│  │ ───────────────────────────────────────────────────────────── │ │
│  │ Price | seating chart         │ Internet Onsale Info           │ │
│  │                               │ Onsale to General Public:      │ │
│  │ Main floor seating            │ Sat, 08/16/03, 10:00am         │ │
│  │ $77.75                        │ Internet Presale Info          │ │
│  │ Lower level seating           │ getAccess presale:             │ │
│  │ $32.75 - $77.75               │ Starts: Wed, 08/10/03, 10:00am │ │
│  │ Upper level seating           │ Ends: Thu, 08/15/03, 5:00pm    │ │
│  │ $32.75 - 77.75                │ cc.com presale:                │ │
│  │                               │ Start: 08/15/03, 10:00am       │ │
│  │                               │ Ends: Fri, 08/15/03 5:00pm     │ │
│  └────────────────────────────────────────────────────────────────┘ │
│  ┌────────────────────────────────────────────────────────────────┐ │
│  │ look for tickets                                               │ │
│  │ Note: Tickets may not be available in all price levels and sections.│
│  │   Reset Form                                                   │ │
│  │   Quantity  Price        Type                                  │ │
│  │   [0 ▼]   [Any Price▼]  Full Price Tickets                     │ │
│  │   Section:                                                     │ │
│  │   [BEST AVAILABLE  ▼]                                          │ │
│  │   Location:                                                    │ │
│  │   [BEST AVAILABLE  ▼]                                          │ │
│  │   Additional:                                                  │ │
│  │   [BEST AVAILABLE  ▼]                                          │ │
│  │                                                                │ │
│  │ Please adhere to published ticket limits. Orders exceeding the ticket limit will be canceled without│
│  │ notice. This includes duplicate orders having the same name, billing address, or credit card│
│  │    ┌─────────────────────┐                                     │ │
│  │    │"auctions" if>1      │                                     │ │
│  │    │and "auction" if only 1│   ┌Look For Tickets┐              │ │
│  │    └─────────────────────┘   └────────────────┘                │ │
│  │                   Your credit card will not be charged         │ │
│  ├────────────────────────────────────────────────────────────────┤ │
│  │ auction for this event                                         │ │
│  │                    Open         Closed        Status           │ │
│  │                                               Auction Open     │ │
│  │ Cher - VIP Auction  8/13/03     8/20/03       4 Days Remaining │ │
│  │ ───────────────────────────────────────────────────────────── │ │
│  │                                               More Info        │ │
│  │ Cher - Charity Auction  8/18/03  8/20/03      Auction Opens 8/15/03│
│  └────────────────────────────────────────────────────────────────┘ │
│                        ┌──────────────────────────────┐             │
│                        │Visible if current date is >= │             │
│                        │ADP Release Date and <=       │             │
│                        │ADP Release Date              │             │
│                        └──────────────────────────────┘             │
│                              FIG. 13A                               │
└─────────────────────────────────────────────────────────────────────┘
```

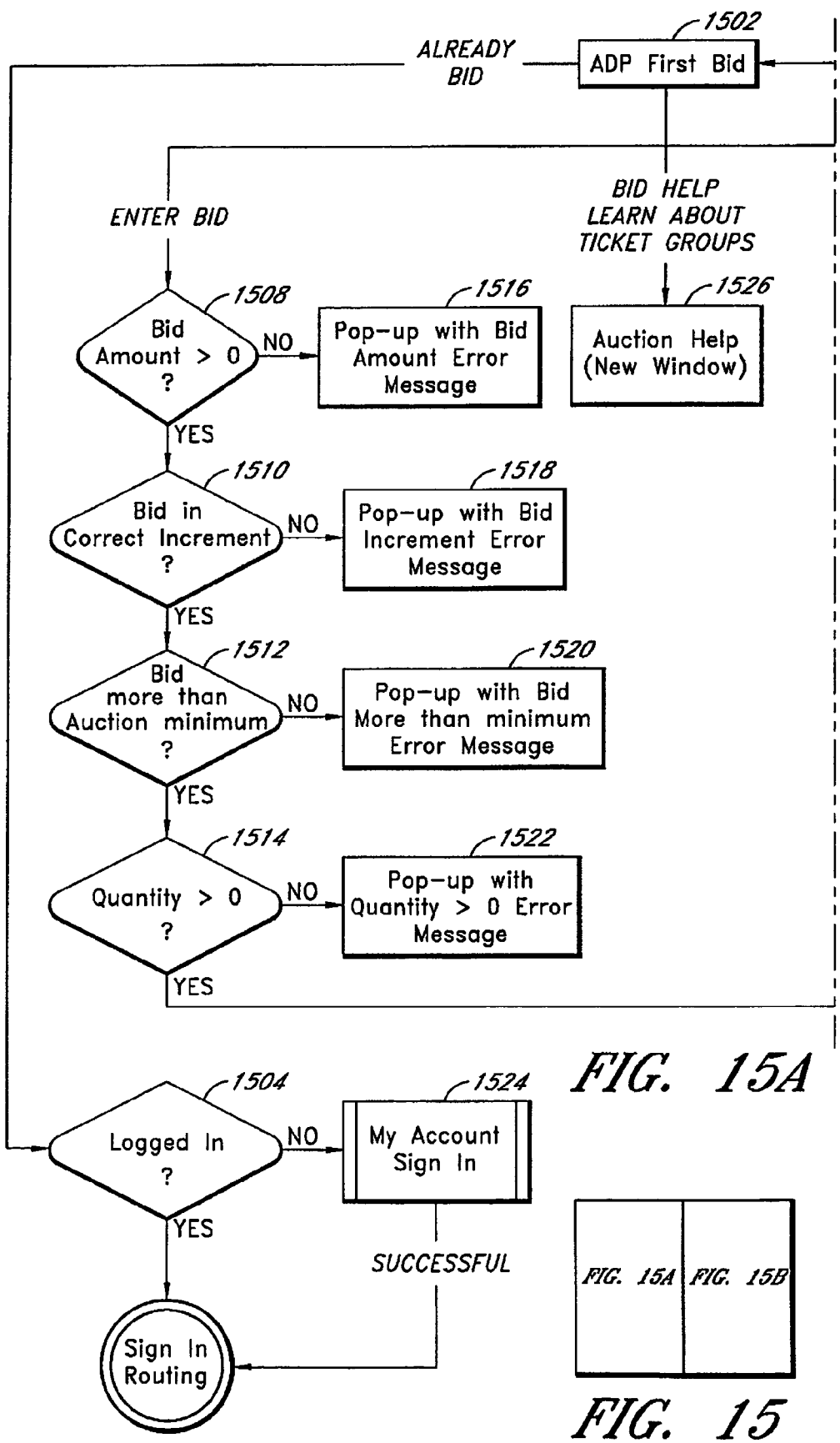

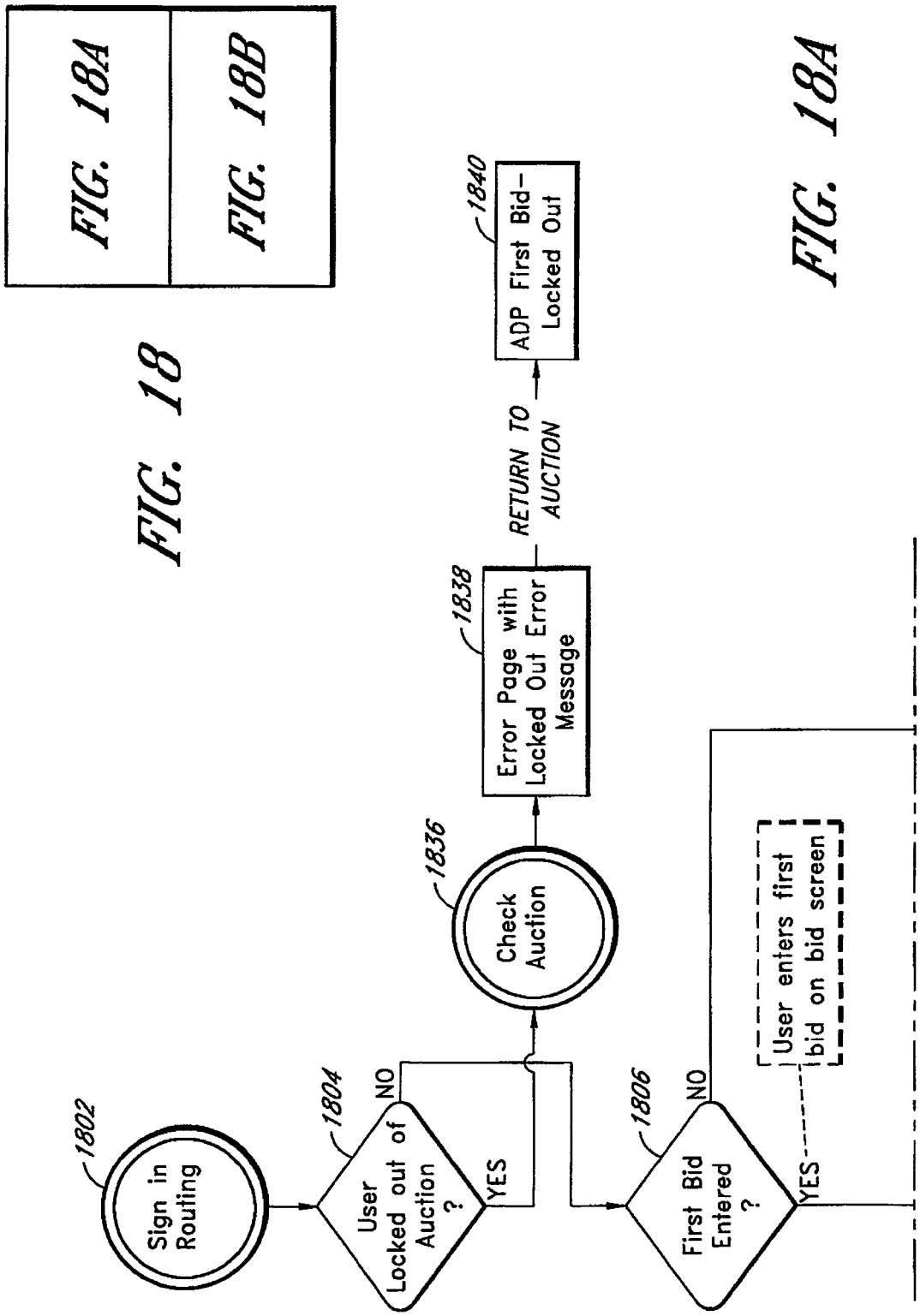

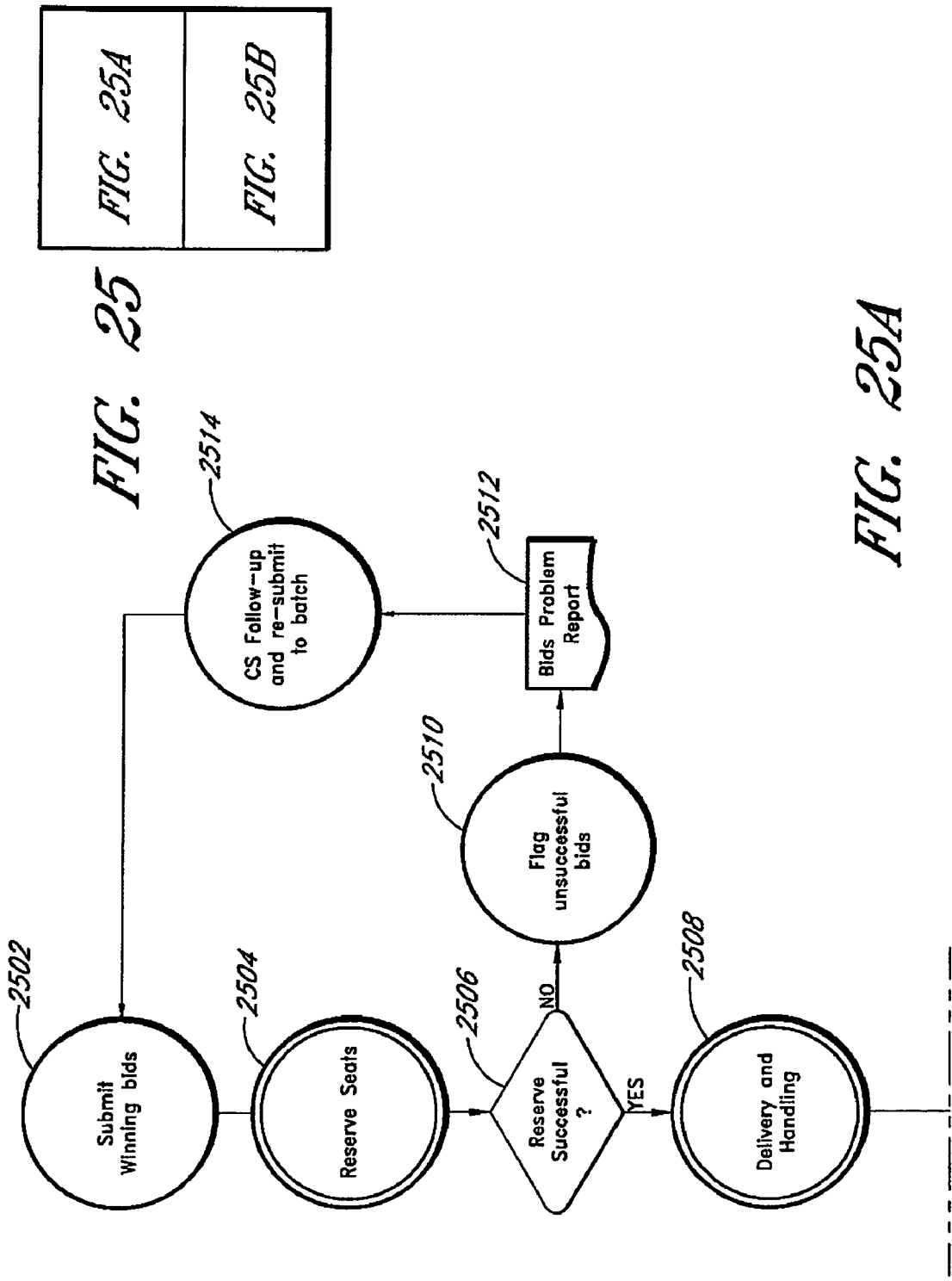

There are 12 formats for an auction, with 6 versions of help and 2 different ADP modules:

| | PWYB | Uniform | Single TG | Multiple TG | Subset Bidding | ADA Accommodated | ADP | Help |
|---|---|---|---|---|---|---|---|---|
| 1 | X | | X | | | | Standard | PWYB, Single TG |
| 2 | X | | X | | | X | Standard | PWYB, Single TG |
| 3 | X | | | X | | | Standard | PWYB, Mult TG |
| 4 | X | | | X | | X | Subset BGG | PWYB, Mult TG |
| 5 | X | | | X | X | | Subset BGG | PWYB, Mult TG, Subset |
| 6 | X | | | X | X | X | Standard | PWYB, Mult TG, Subset |
| 7 | | X | X | | | | Standard | Uniform, Single TG |
| 8 | | X | X | | | X | Standard | Uniform, Single TG |
| 9 | | X | | X | | | Standard | Uniform, Mult TG |
| 10 | | X | | X | | X | Standard | Uniform, Mult TG |
| 11 | | X | | X | X | | Subset BGG | Uniform, Mult TG, Subset |
| 12 | | X | | X | X | X | Subset BGG | Uniform, Mult TG, Subset |

FIG. 26

| | | home | concerts | sports | arts & theater | family | |

Search / you are viewing events in Greater Los Angeles Area

Dave Matthew's Band – VIP Ticket Auction
STAPLES Center, Los Angeles, CA
Sat, Oct 25, 2003, 9:30 pm (local venue time)
seating chart    see onsale info Auction Start: Fri 8/22/03 10:00 am Pacific
Auction End:   Fri 8/29/03 10:00 am Pacific
Presale Start: Fri 9/5/03 10:00 am Pacific
Onsale Start:  Sat 9/6/03 10:00 am Pacific bid on tickets / Help with bidding

Already bid in this auction?

Number of Tickets: [0 ▼]

Max Bid per Ticket: $ [     ]

(Bid must be in multiples of $5)

☑ Email me if I am outbid ( place bid )
You must confirm your bid on the next page auction status

Auction ends in: 1 Day 18 hours 2 Minutes

| Ticket Groups | Low Bid |
|---|---|
| First Row | $600 |
| Second Row | $375 |
| Rows 3 to 5 | $220 |
| Rows 6 to 10 | $150 |
| Rows 11 to 20 | $110 |

As of Wed. August 27 at 4:00 pm Pacific

Auction starting bid $100 per ticket
Learn about Ticket Groups ( refresh status )

auction info

This is an Auction for the Dave Matthew's Band concert on Saturday, October 25 at the Staples Center in Los Angeles Rules You can only have one valid bid at a time in an auction. Once you submit a bid, you will not be able to cancel it Bids are ranked by the amount bid per ticket. Then, ties will be broken based on the time that the bids were placed with earlier bids receiving priority.

If you have a valid winning bid when the auction ends, you will pay a per ticket price equal to the Low Bid for the ticket group your bid is in at the close of the auction You may rebid and increase your bid amount at any time before the auction ends. If you rebid it is considered your new bid, your previous bid will no longer be valid.

The auction is also subject to the Auction Terms and the Ticketmaster Policies which shall be considered part of the action rules.

donation info

The Dave Matthew's Band has chosen an auction for this event as a way to raise money for UNICEF. All ticket revenue in excess of the starting minimum bids will be donated to this charity. The band would like to thank you for your participation and support for UNICEF.

*FIG. 27* ticketmaster

◐ There were no tickets available that matched your request
There are several things you can try:

- Change the quantity of tickets you are requesting.
- If you selected a specific seat section, switch to "Best Available".
- If you are unable to find tickets, be sure to check back often. As the date of the event nears, many times a limited number of tickets may be released.
- If you entered a promotional code, check that the code is valid for the ticket price and criteria selected.

[ Return to Event Page ]

◐ You can also bid on tickets in the following auctions for this event:

| auctions for this event | | | |
|---|---|---|---|
| | Open | Close | Status |
| Cher – VIP Auction | 8/13/03 | 8/20/03 | Auction Open<br>4 Days Remaining |
| Cher – Charity Auction | 8/18/03 | 8/20/03 | More Info<br>Auction Opens 8/15/03 |

*FIG. 27A*

| File | Edit | View | Go | Favorite | Help |

| home | concerts | sports | arts & theater | family |

[Search]  you are viewing events in
Greater Los Angeles Area

Dave Matthew's Band – VIP Ticket Auction
STAPLES Center, Los Angeles, CA
Sat, Oct 25, 2003, 9:30 pm (local venue time)
seating chart    see onsale info Auction Start: Fri 8/22/03 10:00 am Pacific
Auction End:   Fri 8/29/03 10:00 am Pacific
Presale Start: Fri 9/5/03 10:00 am Pacific
Onsale Start:  Sat 9/6/03 10:00 am Pacific bid on tickets / Help with bidding

Already bid in this auction?

Number of Tickets: [0 ▼]

Max Bid per Ticket: $ [_____]
(Bid must be in multiples of $5)

Ticket Group: [ ▼ ]
- 
- 1
- 1 to 2
- 1 to 3
- 1 to 4
- 1 to 5

☑ Email me if I am outbid

[bid]
m your bid on the next page auction status

Auction ends in: 1 Day 18 hours 2 Minutes

| Ticket Groups | Low Bid |
|---|---|
| First Row | $600 |
| Second Row | $375 |
| Rows 3 to 5 | $220 |
| Rows 6 to 10 | $150 |
| Rows 11 to 20 | $110 |

As of Wed. August 27 at 4:00 pm Pacific

Auction starting bid $100 per ticket
Learn about Ticket Groups

[refresh status]

auction info

This is an Auction for the Dave Matthew's Band concert on Saturday, October 25 at the Staples Center in Los Angeles Rules
   Cascading BGG Rules donation info

The Dave Matthew's Band has chosen an auction for this event as a way to raise money for UNICEF. All ticket revenue in excess of the starting minimum bids will be donated to this charity. The band would like to thank you for your participation and support for UNICEF.

*FIG. 28*

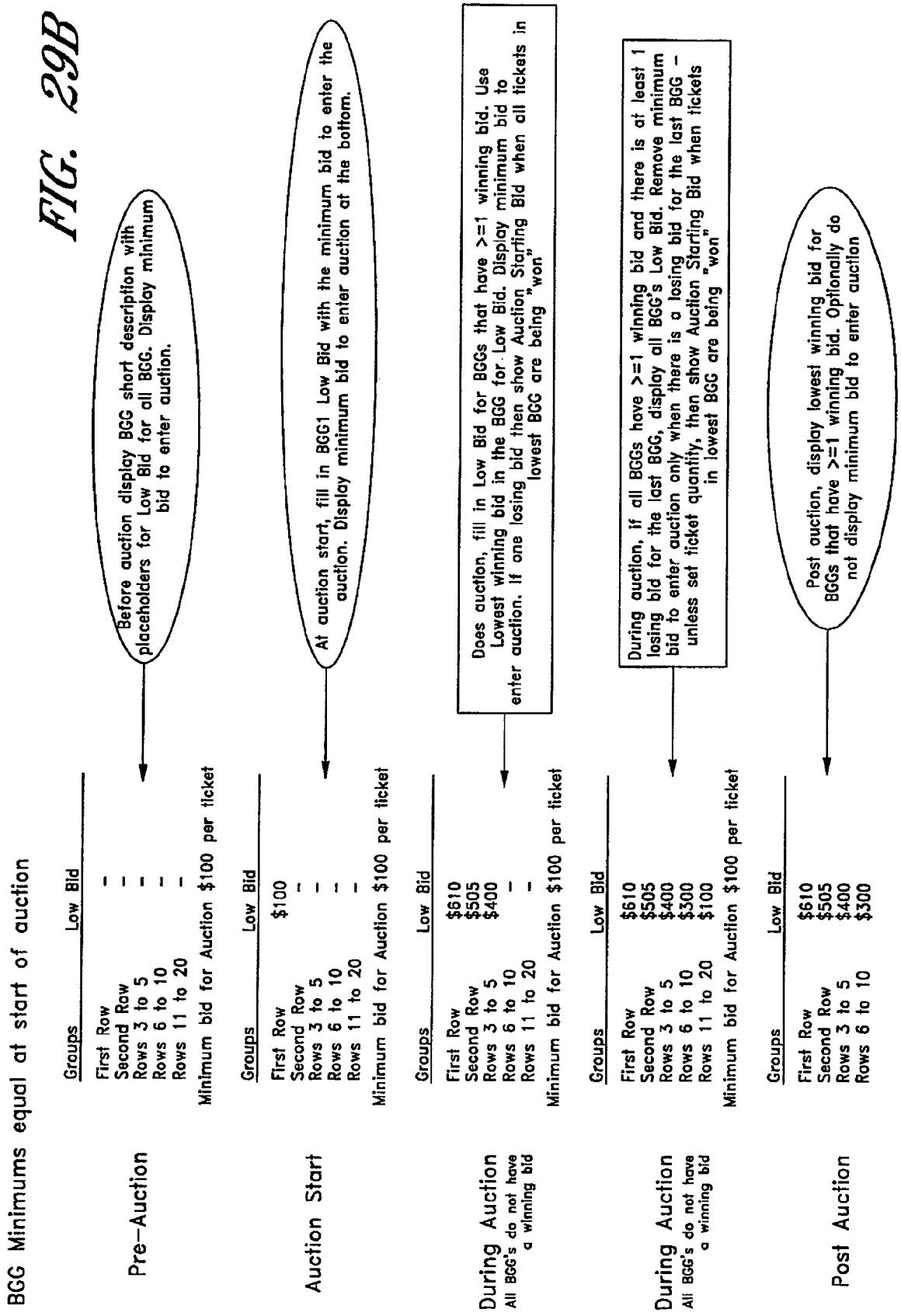

- You can only have one valid bid at a time in an auction. Once you submit a bid, you will not be able to cancel it

- You may rebid and increase your bid amount any time before the auction ends. If you rebid it is considered your new bid; your previous bid will no longer be valid

- Bids are ranked first by the amount bid per ticket. Ties will be broken based on the time that the bids were placed with earlier bids receiving priority

- If you you have a valid winning bid when the auction ends, your credit card will be charged a per ticket price equal to the amount you bid plus a delivery price (if applicable) and a processing fee

- The auction is also subject to the <u>Auction Terms</u> and the <u>Ticketmaster Policies,</u> which shall be considered part of the auction rules

---

- You can only have one valid bid at a time in an auction. Once you submit a bid, you will not be able to cancel it

- You may rebid and increase your bid amount any time before the auction ends. If you rebid it is considered your new bid; your previous bid will no longer be valid

- Bids are ranked first by the amount bid per ticket. Ties will be broken based on the time that the bids were placed with earlier bids receiving priority. Higher ranked bids may bump your bid into lower Ticket Groups or out of the auction entirely.

- If you you have a valid winning bid when the auction ends, your credit card will be charged a per ticket price equal to the amount you bid plus a delivery price (if applicable) and a processing fee

- The auction is also subject to the <u>Auction Terms</u> and the <u>Ticketmaster Policies,</u> which shall be considered part of the auction rules

- You can only have one valid bid at a time in an auction. Once you submit a bid, you will not be able to cancel it

- You may rebid and increase your bid amount any time before the auction ends. If you rebid it is considered your new bid; your previous bid will no longer be valid

- Bids are ranked first by the amount bid per ticket. Ties will be broken based on the time that the bids were placed with earlier bids receiving priority

- If you you have a valid winning bid when the auction ends, your credit card will be charged a per ticket price equal to the lowest bid plus a delivery price (if applicable) and a processing fee

- The auction is also subject to the <u>Auction Terms</u> and the <u>Ticketmaster Policies,</u> which shall be considered part of the auction rules

---

- You can only have one valid bid at a time in an auction. Once you submit a bid, you will not be able to cancel it

- You may rebid and increase your bid amount any time before the auction ends. If you rebid it is considered your new bid; your previous bid will no longer be valid

- Bids are ranked first by the amount bid per ticket. Ties will be broken based on the time that the bids were placed with earlier bids receiving priority. Higher ranked bids may bump your bid into lower Ticket Groups or out of the auction entirely.

- If you you have a valid winning bid when the auction ends, your credit card will be charged a per ticket price equal to the Low Bid for the Ticket Group your bid is in plus a delivery price (if applicable) and a processing fee

- The auction is also subject to the <u>Auction Terms</u> and the <u>Ticketmaster Policies,</u> which shall be considered part of the auction rules

| Pre | Auction During | Post | Maintenance Period No | Maintenance Period Yes | Auction Status Available | Auction Status Unavailable | Spec Page |
|---|---|---|---|---|---|---|---|
| X | | | | | X | | ADP First Bid – Pre |
| X | | | | | | X | TM System Down |
| | X | | X | | X | | ADP First Bid |
| | X | | | X | X | | ADP First Bid – Maint |
| | X | | | X | | X | TM System Down |
| | | X | | | X | | ADP First Bid – Post |
| | | X | | | | X | TM System Down |

*FIG. 31*

File  Edit  View  Go  Favorite  Help

| home | concerts | sports | arts & theater | family |

Search     you are viewing events in
           Greater Los Angeles Area

Dave Matthew's Band – VIP Ticket Auction
STAPLES Center, Los Angeles, CA
Sat, Oct 25, 2003, 9:30 pm (local venue time)
 seating chart    see onsale info Auction Start: Fri 8/22/03 10:00 am Pacific
Auction End: Fri 8/29/03 10:00 am Pacific
Presale Start: Fri 9/5/03 10:00 am Pacific
Onsale Start: Sat 9/6/03 10:00 am Pacific bid on tickets / Help with bidding

This auction has not begun yet.

To place a bid and view auction status, please return when the auction begins on Friday, August 22 at 10 am Pacific If you would like to be reminded by email when the auction begins, please enter your email address below:

email [                    ]

submit email auction status

| Ticket Groups | Low Bid |
|---|---|
| First Row | -- |
| Second Row | -- |
| Rows 3 to 5 | -- |
| Rows 6 to 10 | -- |
| Rows 11 to 20 | -- |

Minimum Bid $100 per ticket
Learn about Ticket Groups auction info

This is an Auction for the Dave Matthew's Band concert on Saturday, October 25 at the Staples Center in Los Angeles Rules You can only have one valid bid at a time in an auction. Once you submit a bid, you will not be able to cancel it Bids are ranked by the amount bid per ticket. Then, ties will be broken based on the time that the bids were placed with earlier bids receiving priority.

If you have a valid winning bid when the auction ends, you will pay a per ticket price equal to the Low Bid for the ticket group your bid is in at the close of the auction You may rebid and increase your bid amount at any time before the auction ends. If you rebid it is considered your new bid, your previous bid will no longer be valid.

The auction is also subject to the Auction Terms and the Ticketmaster Policies which shall be considered part of the action rules.

donation info

The Dave Matthew's Band has chosen an auction for this event as a way to raise money for UNICEF. All ticket revenue in excess of the starting minimum bids will be donated to this charity. The band would like to thank you for your participation and support for UNICEF.

*FIG. 32*

| | | | | | |
|---|---|---|---|---|---|
| home | concerts | sports | arts & theater | family | | you are viewing events in
Greater Los Angeles Area

Dave Matthew's Band – VIP Ticket Auction
STAPLES Center, Los Angeles, CA
Sat, Oct 25, 2003, 9:30 pm (local venue time)
    seating chart    see onsale info Auction Start: Fri 8/22/03 10:00 am Pacific
Auction End: Fri 8/29/03 10:00 am Pacific
Presale Start: Fri 9/5/03 10:00 am Pacific
Onsale Start: Sat 9/6/03 10:00 am Pacific bid on tickets / Help with bidding

Already bid in this auction?

The auction is temporarily inaccessable while we perform routine nightly maintenance. Please return after 4:00 am Pacific to place a bid or check the auction status.

auction status

Auction ends in: 1 Day 18 hours 2 Minutes

| Ticket Groups | Low Bid |
|---|---|
| First Row | $600 |
| Second Row | $375 |
| Rows 3 to 5 | $220 |
| Rows 6 to 10 | $150 |
| Rows 11 to 20 | $110 |

*As of Wed. August 27 at 4:00 pm Pacific*

Minimum Bid $100 per ticket
Learn about Ticket Groups auction info

This is an Auction for the Dave Matthew's Band concert on Saturday, October 25 at the Staples Center in Los Angeles

Rules

You can only have one valid bid at a time in an auction. Once you submit a bid, you will not be able to cancel it Bids are ranked by the amount bid per ticket. Then, ties will be broken based on the time that the bids were placed with earlier bids receiving priority.

If you have a valid winning bid when the auction ends, you will pay a per ticket price equal to the Low Bid for the ticket group your bid is in at the close of the auction You may rebid and increase your bid amount at any time before the auction ends. If you rebid it is considered your new bid, your previous bid will no longer be valid.

The auction is also subject to the Auction Terms and the Ticketmaster Policies which shall be considered part of the action rules.

donation info

The Dave Matthew's Band has chosen an auction for this event as a way to raise money for UNICEF. All ticket revenue in excess of the starting minimum bids will be donated to this charity. The band would like to thank you for your participation and support for UNICEF.

*FIG. 33*

| | | | | |
|---|---|---|---|---|
| home | concerts | sports | arts & theater | family | you are viewing events in
Greater Los Angeles Area

Dave Matthew's Band – VIP Ticket Auction
STAPLES Center, Los Angeles, CA
Sat, Oct 25, 2003, 9:30 pm (local venue time)
seating chart    see onsale info Auction Start: Fri 8/22/03 10:00 am Pacific
Auction End:   Fri 8/29/03 10:00 am Pacific
Presale Start: Fri 9/5/03 10:00 am Pacific
Onsale Start:  Sat 9/6/03 10:00 am Pacific bid on tickets / Help with bidding

Already bid in this auction?

You have been blocked from participating in this auction.

auction status

Auction ends in: 1 Day 18 hours 2 Minutes

| Ticket Groups | Low Bid |
|---|---|
| First Row | $600 |
| Second Row | $375 |
| Rows 3 to 5 | $220 |
| Rows 6 to 10 | $150 |
| Rows 11 to 20 | $110 |

As of Wed. August 27 at 4:00 pm Pacific

Minimum Bid $100 per ticket
Learn about Ticket Groups auction info

This is an Auction for the Dave Matthew's Band concert on Saturday, October 25 at the Staples Center in Los Angeles Rules You can only have one valid bid at a time in an auction. Once you submit a bid, you will not be able to cancel it Bids are ranked by the amount bid per ticket. Then, ties will be broken based on the time that the bids were placed with earlier bids receiving priority.

If you have a valid winning bid when the auction ends, you will pay a per ticket price equal to the Low Bid for the ticket group your bid is in at the close of the auction You may rebid and increase your bid amount at any time before the auction ends. If you rebid it is considered your new bid, your previous bid will no longer be valid.

The auction is also subject to the Auction Terms and the Ticketmaster Policies which shall be considered part of the action rules.

donation info

The Dave Matthew's Band has chosen an auction for this event as a way to raise money for UNICEF. All ticket revenue in excess of the starting minimum bids will be donated to this charity. The band would like to thank you for your participation and support for UNICEF.

FIG. 34

| | | | | |
|---|---|---|---|---|
| home | concerts | sports | arts & theater | family | you are viewing events in
Greater Los Angeles Area

Dave Matthew's Band – VIP Ticket Auction
STAPLES Center, Los Angeles, CA
Sat, Oct 25, 2003, 9:30 pm (local venue time)
seating chart    see onsale info Auction Start: Fri 8/22/03 10:00 am Pacific
Auction End: Fri 8/29/03 10:00 am Pacific
Presale Start: Fri 9/5/03 10:00 am Pacific
Onsale Start: Sat 9/6/03 10:00 am Pacific bid on tickets / Help with bidding

Auction Completed

If you placed a valid bid in this auction, check your email box for your final bid status.

auction status

Auction Closed

| Ticket Groups | Low Bid |
|---|---|
| First Row | $600 |
| Second Row | $375 |
| Rows 3 to 5 | $220 |
| Rows 6 to 10 | $150 |
| Rows 11 to 20 | $100 |

Learn about Ticket Groups auction info

This is an Auction for the Dave Matthew's Band concert on Saturday, October 25 at the Staples Center in Los Angeles Rules You can only have one valid bid at a time in an auction. Once you submit a bid, you will not be able to cancel it Bids are ranked by the amount bid per ticket. Then, ties will be broken based on the time that the bids were placed with earlier bids receiving priority.

If you have a valid winning bid when the auction ends, you will pay a per ticket price equal to the Low Bid for the ticket group your bid is in at the close of the auction You may rebid and increase your bid amount at any time before the auction ends. If you rebid it is considered your new bid, your previous bid will no longer be valid.

The auction is also subject to the Auction Terms and the Ticketmaster Policies which shall be considered part of the action rules.

donation info

The Dave Matthew's Band has chosen an auction for this event as a way to raise money for UNICEF. All ticket revenue in excess of the starting minimum bids will be donated to this charity. The band would like to thank you for your participation and support for UNICEF.

*FIG. 35*

| | | | | |
|---|---|---|---|---|
| home | concerts | sports | arts & theater | family |

Search you are viewing events in
Greater Los Angeles Area

Dave Matthew's Band – VIP Ticket Auction
STAPLES Center, Los Angeles, CA
Sat, Oct 25, 2003, 9:30 pm (local venue time)
seating chart    see onsale info Auction Start:  Fri 8/22/03 10:00 am Pacific
Auction End:    Fri 8/29/03 10:00 am Pacific
Presale Start:  Fri 9/5/03 10:00 am Pacific
Onsale Start:   Sat 9/6/03 10:00 am Pacific re-bid / Help with bidding

Current bid for Erick. Not you? Change user

| Quantity | Current Bid | Status |
|---|---|---|
| 2 | $400 | Winning |

If the auction ended right now you would pay $375 per ticket and be in the Second Row Ticket Group Increase Your Bid or Quantity Quantity: [2 ▼]   Bid Per Ticket: $[        ]
(Bid must be in multiples of $5)

☑ Email me if I am outbid ( place bid )

You must confirm your bid on the next page auction status

Auction ends in: 1 Day 18 hours 2 Minutes

| Ticket Groups | Low Bid |
|---|---|
| First Row | $600 |
| Second Row | $375 |
| Rows 3 to 5 | $220 |
| Rows 6 to 10 | $150 |
| Rows 11 to 20 | $110 |

As of Wed. August 27 at 4:00 pm Pacific

Minimum Bid $100 per ticket

Learn about Ticket Groups ( refresh status )

auction info

This is an Auction for the Dave Matthew's Band concert on Saturday, October 25 at the Staples Center in Los Angeles Rules You can only have one valid bid at a time in an auction. Once you submit a bid, you will not be able to cancel it Bids are ranked by the amount bid per ticket. Then, ties will be broken based on the time that the bids were placed with earlier bids receiving priority.

If you have a valid winning bid when the auction ends, you will pay a per ticket price equal to the Low Bid for the ticket group your bid is in at the close of the auction You may rebid and increase your bid amount at any time before the auction ends. If you rebid it is considered your new bid, your previous bid will no longer be valid.

The auction is also subject to the Auction Terms and the Ticketmaster Policies which shall be considered part of the action rules.

donation info

The Dave Matthew's Band has chosen an auction for this event as a way to raise money for UNICEF. All ticket revenue in excess of the starting minimum bids will be donated to this charity. The band would like to thank you for your participation and support for UNICEF.

*FIG. 36*

FIG. 37 bid confirmation

Your bid has been successfully submitted:

[Auction Help]

| | |
|---|---|
| Auction Name: | Dave Matthews Band – VIP Ticket Auction |
| Event Date: | Sat. Aug. 2, 2003 9:30 pm (local venue time) |
| Bidder: | Drew Karonis |
| Bid Entered: | Wed. Jul 16 at 3:45 pm PST |
| Shippng Address: | 1234 Main Street<br>Apartment 444<br>Somewhere, St 10101<br>USA |

| | |
|---|---|
| Bid Amount per Ticket | $400.00 x 2 tickets |
| Delivery | $16.00 |
| Handling | $3.50 |
| TOTAL | $819.50 |

All taxes included in total.

Note: The total is the most you will pay if you are a winner. The bid portion of your total will be calculated as the lowest winning bid in the group you are a winner in at the end of the auction

[Print]  [Next]

For additional help please check FAQ donation info

The Dave Matthew's Band has chosen an auction for this event as a way to raise money for UNICEF. All ticket revenue in excess of the starting minimum bids will be donated to this charity. The band would like to thank you for your participation and support for UNICEF.

*This is the version of the Note for a Uniform auction Discriminatory auction version of note is below*

Note: If you are a winner at the end of the auction your credit card will be charged for the above total amount

*FIG. 38*

| Message | Trigger |
|---|---|
| Your bid amount must be greater than 0 | Bid amount is 0 |
| Your bid amount contains non-numeric characters | Bid amount contains non-numeric characters |
| Your bid amount must be in the proper multiple | User has not placed a bid in the proper increment. The bid increment of $X is set for the entire auction. |
| Your bid amount must be greater than (or equal to in some cases) the current minimum bid | Bid amount has to be high enough to be a winning bid |
| You must select a ticket quantity that is greater than 0 | Ticket quantity is 0 |
| The bid amount you entered is lower than your previous bid amount | Cannot lower bid amount with re-bid |
| You have not entered a bid for this auction | User clicked on "Already bid?", signed in, but had not bid |
| You may not select fewer tickets than you selected in your previous bid | Cannot lower quantity of tickets with re-bid |
| Your credit card expiration date must be at least 1 week after the auction closes. Please select another card | Card expiration date has to be more than a week after auction ends |
| You have been blocked from participating in this auction | Exceeded retry counter |
| You have been blocked from participating in this auction | Canceled Bid |
| Your bid was not entered in time. The auction is now closed. | Bid not entered in time -- Auction closed |
| You have not selected a Ticket Group | No Ticket Group selected |

*FIG. 39*

OPTIONAL EMAIL NOTIFICATION RULES

| | | |
|---|---|---|
| Bid Losing (Outbid Notice) | Winning to Losing | Opt in for outbid notice on first bid and rebid pages |
| Re-Winning Bid | Losing to Winning without a rebid having been placed | Automatically sent whenever it occurs, no option |
| Auction End – Win Pending | Winning to Win Pending | Automatically sent whenever it occurs, no option – to bidders who have won the auction |
| Auction End – Lost | Any status that changes to Lost | Opt in for outbid notice on first bid and rebid pages |
| Payment Processed Successfully | Win Pending to Win Transacted | Automatically sent whenever it occurs, no option – to all bidders who have won the auction and had successful payment |

*FIG. 41*

File  Edit  View  Go  Favorite  Help

| home | concerts | sports | arts & theater | family |

Search you are viewing events in
Greater Los Angeles Area

Dave Matthew's Band – VIP Ticket Auction
STAPLES Center, Los Angeles, CA
Sat, Oct 25, 2003, 9:30 pm (local venue time)
seating chart    see onsale info Auction Start: Fri 8/22/03 10:00 am Pacific
Auction End:   Fri 8/29/03 10:00 am Pacific bid on tickets / Help with bidding

Already bid in this auction?

Number of Tickets: [0 ▼]
Max Bid Per Ticket: $[      ]
(Bid must be in multiples of $5)

☑ Email me if I am out bid ( place bid )
You must confirm your bid
on the next page auction status

Auction Time Remaining: 1 Day  18 hours

| Ticket Groups | Low Bid |
|---|---|
| Section 200 | $10 |
| Section 201 | $9 |
| Section 202 | $9 |
| Section 203 | $8 |
| Section 204 | $6 |

As of Wed. August 27 at 4:00 pm Pacific

Auction starting bid $5 per ticket
Learn about Ticket Groups ( refresh status )

Invite friends and get Money Back, a Discount, or Credit  evite auction info

This is an Auction for the Dave Matthew's Band concert on Saturday, October 25 at the Staples Center in Los Angeles.

Rules

You can only have one valid bid at a time in an auction. Once you submit a bid, you will not be able to cancel it Bids are ranked by the amount bid per ticket. Then, ties will be broken based on the time that the bids were placed with earlier bids receiving priority.

If you have a valid winning bid when the auction ends, you will pay a per ticket price equal to the Low Bid for the ticket group your bid is in at the close of the auction You may rebid and increase your bid amount at any time before the auction ends. If you rebid it is considered your new bid, your previous bid will no longer be valid.

The auction is also subject to the Auction Terms and the Ticketmaster Policies which shall be considered part of the action rules.

| File | Edit | View | Go | Favorite | Help |

Event Details (* required)

Hosted by *  
Do not include HTML tags

Name your Event* [Dave Mathews]

Event Type* [Concert/Show ▼]

[Preview] [Finish Later] [Send Now]

Graphic Image Here

View Design Gallery

Location

Street Address [1111 S. Figueroa St.]
(e.g. 123 Main Street #15)

City [Los Angeles]  State/Prov. [CA ▼]

☑ Include a map

Country [United States ▼]

Place [Staples Center]   Telephone [213-742-7840]
(e.g. John's House)

Guest List

1) Enter email addresses separated by commas, or return
or
2) Add from your Address Book (500 guests maximum)

☑ Automatically add these guest to my Address book.

Message To Guest

Include a greeting, event details, etc.

Date & Time

Event Begins (or Offer Choices)

Date: [10]/[29]/[03] 🗓 Time: [9]:[30] [PM ▼]

▶ Event End (optional)
▶ Schedule Recurring Events

[Preview] [Finish Later] [Send Now]   Spell Check auction status

Auction Time Remaining: 1 Day 18 hours

| Ticket Groups | Low Bid |
|---|---|
| First Row | $600 |
| Second Row | $375 |
| Rows 3 to 5 | $220 |
| Rows 6 to 10 | $150 |
| Rows 11 to 20 | $110 |

*As of Wed. August 27 at 4:00 pm Pacific*

Auction starting bid $100 per ticket

<u>Learn about Ticket Groups</u>

( refresh status )

auction status

Auction Time Remaining: 1 Day 18 hours

| Quantity | Ticket Groups | Low Bid |
|---|---|---|
| 1 | First Row | $600 |
| 2 | Second Row | $375 |
| 3 | Rows 3 to 5 | $220 |
| 4 | Rows 6 to 10 | $150 |
|  | Rows 11 to 20 | $110 |

*As of Wed. August 27 at 4:00 pm Pacific*

Auction starting bid $100 per ticket

<u>Learn about Ticket Groups</u>

( refresh status )

*FIG. 50*

If cascading BGG's then list the BGG or BGGs that the user selected. If only one BGG selected then:

Ticket Group: <BGG#> <BGG Name>

If multiple groups then:

Ticket Groups: <BGG#> <BGG Name> to <BGG#> <BGG Name>

Dave Matthews Band-VIP Ticket Auction
Staples Center, Los Angeles, Ca
Sat. Oct. 25, 2003, 9:30 pm (local venue time)

Auction Start: Fri 8/22/03 10:00 am Pacific
Auction End: Fri 8/29/03 10:00 am Pacific
Presale Start: Fri 9/5/03 10:00 am Pacific
Onsale Start: Sat 9/6/03 10:00 am Pacific seating chart your bid          Billing and Shipping info cannot be changed once a bid is submitted*

Auction Time Remaining: 2 Days 6 hours                                    Auction Help Bid per Ticket    $400      Ticket Groups: (1) First Row to (4) Rows 6 to 10
Ticket Quantity   X 2
Total*            $800

Note: All winning bids will be charged a handling fee of $3.50 in addition to the chosen delivery fee      cancel bid select credit card      * Winners will have handling and delivery charges added to the clearing price of their bids. All taxes are included.
Your order may be canceled without notice if you do not use the exact billing address of your credit card.

Billing & Shipping Restrictions
Tickets shipped via standard mail or UPS are sent to your billing address only. UPS orders cannot be shipped to P.O. Boxes
Your credit card billing address and name must appear exactly as it does on your credit card statement

| Select | Credit Card | Last 5 | Expiration Date | Billing Address |
|--------|-------------|--------|-----------------|-----------------|
| ● | American Express | 56157 | 02 ▼ 2005 ▼ | 1234 Main Street |
| ○ | Visa | 86208 | 04 ▼ 2007 ▼ | 11845 Montezuma Avenue |

Edit or add card updates My Accounts new card

Card ID Number
For your protection, we ask that you enter your credit card ID numbers:

last 3 digits located on the back of your credit card 123456789025 345

345

Card ID Number

Show CIN help for whichever card type is chosen for billing -Diners does not require CIN CIN is checked for first Bid

FIG. 51A

Delivery methods offered should only be ones that are valid as of end date of auction

Shiping method choices in Auction must be same as Event. If want different, Auction must be set to different delivery types and then event programming changes delivery types for event after auction ends.

select shipping method

| Select | Cost | Method |
|---|---|---|
| U.S. Customers | | |
| ○ | $1.75 | TicketFasat (Get your tickets by e-mail. Then print them out with any printer) |
| ○ | $25.50 | UPS 2nd Day AM (by 10:30am in 2 business days) |
| ○ | $22.50 | UPS 2 Day (By 5:00pm in 2 business days) |
| ○ | $17.50 | UPS 3 Days (By 7:30pm in 3 business days) |
| ○ | $16.00 | UPS Saturday (By noon on Saturday if order placed by Wednesday prior) |
| ○ | No additional charge | Standard Mail (Tickets will arrive at least 4 days before the event) |
| ○ | No additional charge | Will Call (Tickets held at will call at the venue box office can only be retrieved by the cardholder with original credit card of purchase and a valid photo ID with signature such as a state ID, driver's license or passport) |

Get Information on: Mail, Will Call, and UPS word verification and submit bid

Enter word as it is shown in the box below.

Some people use automated programs to block other customers from bidding for tickets. To prevent this practice we ask that you type in the word below before you submit your bid.

coronis

Word Verification
This step helps prevent unfair use of automated programs.

How does it work?

Can't see the word?

☐ I have read and agree to the Ticketmaster Auction Terms and Conditions

Refunds and Exchanges
Because of policies set forth by our clients, including venues, teams and theaters, we will not issue an exchange or refund for a ticket after it has been purchased, and we will not issue a refund for a lost, stolen, damaged or destroyed ticket or for tickets claimed to be "not delivered."
In the word below before you submit your bid.

By clicking the "Submit Bid" button, I agree to the Ticketmaster Refund and Exchanges and Canceled Events Auction Purchase Policy. All orders are subject to credit card approval and billing address verification. Additional orders that exceed the total ticket limit for the event will be canceled. After processing, please contact customer service at 213-480-3232 if you have any questions regarding your order.

( Submit Bid )

Your credit card will be charged at the end of the auction if you are a winner. You cannot cancel your bid once submitted.

Must check this submit successfully

*FIG. 51B*

If cascading BGG's then list the BGG or BGGs that the user selected. If only one BGG selected then:

Ticket Group: <BGG#> <BGG Name>

If multiple groups then:

Ticket Groups: <BGG#> <BGG Name> to <BGG#> <BGG Name>

Dave Matthews Band-VIP Ticket Auction
Staples Center, Los Angeles, Ca
Sat. Oct. 25, 2003, 9:30 pm (local venue time)

Auction Start: Fri 8/22/03 10:00 am Pacific
Auction End: Fri 8/29/03 10:00 am Pacific
Presale Start: Fri 9/5/03 10:00 am Pacific
Onsale Start: Sat 9/6/03 10:00 am Pacific seating chart your bid                                                     Billing and Shipping info cannot be changed once a bid is submitted*
Auction Time Remaining:   2 Days 6 hours                                                                                Auction Help
       Bid per Ticket      $400       Ticket Groups:  (1) First Row to (4) Rows 6 to 10
       Ticket Quantity     X  2
       Total*              $800
Note: All winning bids will be charged a handling fee of $3.50 in addition to the chosen delivery fee        cancel bid
select credit card                  * Winners will have handling and delivery charges added to the clearing price of their bids. All taxes are included.

| Select | Credit Card | Last 5 | Expiration Date | Billing Address |
|---|---|---|---|---|
| ● | American Express | 56157 | 02 ▼ 2005 ▼ | 1234 Main Street | select shipping method

| Cost | Method |
|---|---|
| $1.75 | TicketFast (Get your tickets by e-mail. Then print them out with any printer) |

Get Information on: Mail, Will Call, and UPS there will be no editing of credit card information while the auction is in process. If a participant edits a card in My Account that is being used in an auction, it will not change the information on the card in the auction. This must be messaged in My Account if this happens and is also messaged in the First Bid Confirmation.

word verification and submit bid

Enter word as it is shown in the box below,

Some people use automated programs to block other customers from bidding for tickets. To prevent this practice we ask that you type in the word below before you submit your bid.

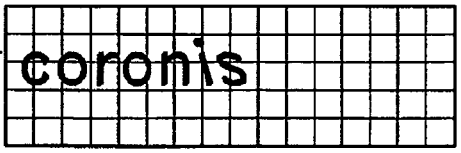

Word Verification
This step helps prevent unfair use of automated programs.

How does it work?

Can't see the word?

☐ I have read and agree to the Ticketmaster Auction Terms and Conditions

Refunds and Exchanges
Because of policies set forth by our clients, including venues, teams and theaters, we will not issue an exchange or refund for a ticket after it has been purchased, and we will not issue a refund for a lost, stolen damaged or destroyed ticket or for tickets claimed to be "not delivered."
In the word below before you submit your bid.

By clicking the "Submit Bid button, I agree to the Ticketmaster Refund and Exchanges and Canceled Events Auction Purchase Policy. All orders are subject to credit card approval and billing address verification. Additional orders that exceed the total ticket limit for the event will be canceled. After processing, please contact customer service at 213-480-3232 if you have any questions regarding your order.

Submit Bid

Your credit card will be charged at the end of the auction if you are a winner. You cannot cancel your bid once submitted.

*FIG. 52*

| ticketmaster auction history | | | | | | |
|---|---|---|---|---|---|---|
| ● Auction bids | | | | Status as Fri. Jan. 15 at 3:55 pm PST | | |
| Bid Date | Event Name | Event Date | Amount | Qty | Total | Bid Status |
| 1/15/2003 | Dave Matthews | 02/25/2002 | $400 | 2 | $800 | View Status |
| 1/13/2003 | Bon Jovi | 02/23/2002 | $165 | 1 | $165 | View Status |
| 1/10/2003 | Celine Dion | 03/05/2002 | $250 | 2 | $500 | WON-PENDING |
| 1/7/2003 | Tim McGraw | 04/07/2002 | $175 | 1 | $175 | WON-PAID |
| 1/1/2003 | Wayne Newton | 02/20/2002 | $335 | 1 | $335 | LOST |

Losing bids will drop from list 60 days after event takes place. Winning bids will drop 1 year after event takes place Actions (View Status)    Links to Auction Rebid page with status WON-PENDING    Links to order page in My Account WON-PAID    Links to order page in My Account LOST    Links to Auction Results page

Optionally a drop down for ADA seating accomodated, not accomodated or a third that
will allow free form test in an ADA text box—default is that none are checked so it forces a choice for
ADA. Optionally the ADA text box should not allow editsunless the "Other ADA" option is chosen.

Optionally subsets of ticket groups can be chosen by a bidder in multiple ticket group auctions.
By default, the largest subset will be chosen and optionally can be forced to be chosen by having a
check box that is locked and checked. For example, if there are 3 ticket groups, ticket group 3 should
be checked and locked.

By checking ticket group X, this will allow a bidder to choose ticket groups 1 to X as a possible subset.
If there are N ticket groups, ticket group N is checked and locked. If ticket group N is the only ticket
group checked, then this is a standard multiple ticket group auction. If more than just ticket group N is
checked, then this is a multiple ticket group with subset auction.

In the case of a single ticket group auction, ticket group 1 will be checked and locked.

Version 2 will have an ADP Expiration Date added to ITV. If not filled in then the ADP will expire at the
event date. If filled in the ADP will not appear and the links to the ADP will not appear anywhere on
TM.com. Default is to have the Expiration Date unchecked.

*FIG. 56*

SYSTEMS FOR DYNAMICALLY ALLOCATING FINITE OR UNIQUE RESOURCES

PRIORITY CLAIM

This application claims the benefit under 35 U.S.C. 119(e) of U.S. Provisional Application No. 60/559,982, filed Apr. 6, 2004, the contents of which is incorporated herein in its entirety.

COPYRIGHT RIGHTS

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

1. Field of the Invention

The present invention is related to resource allocation, and in particular, to apparatus and processes for electronically allocating finite or limited resources.

2. Description of the Related Art

There have been several conventional approaches to assigning or selling units, where a very finite number of units are available, and where the potential demand may exceed the number of available units. For example, one approach has been to electronically auction such units over a network so that the units will be provided to the user willing to offer the most in exchange.

Disadvantageously, many of these conventional approaches offer limited flexibility. Further, certain approaches may disadvantageously result in too few of the units being distributed. Still further, certain embodiments appear to result in an unfair distribution of units.

SUMMARY OF THE INVENTION

The present invention is related to resource allocation, and in particular, to apparatus and processes for electronically allocating finite or limited resources.

For example, the processes and systems described herein relate to systems and processes that enable system users to sell, license, or acquire specified quantities of units (each, a "Unit"), which may be in inventory, through an auction. Each Unit may be unique or identical to other Units that are being offered in auction and that may be acquired through the same auction. Each Unit may be comprised of one or more elements.

One embodiment provides, electronic ticket auction system, comprising: a computer system configured to receive over a network user ticket bids in a ticket auction, including a bid from a first user and a bid from a second user, wherein the first user bid includes a first bid amount, and the second user bid includes a second bid amount that is less than the first bid amount; a data store configured to store the bid amounts; and program code stored in computer readable memory, the program code configured to: determine which bids are winning bids, wherein the winning bids include at least the first bid and the second bid; determine a ticket price for the users associated with the winning bids based on the second bid amount, wherein the first user is assigned a ticket at a price based on the second amount and that is less than the first bid amount.

Another embodiment provides an electronic ticket auction system, comprising: a computer system configured to receive ticket bids over a network from a first plurality of bidders for tickets in at least a first ticket group offered in an auction, the ticket bids including associated bid amounts; computer readable memory operable to store the bid amounts; and program code stored in computer readable memory, the program code configured to: determine which bids are winning bids; determine a ticket price for first group tickets associated with the winning bids, wherein the ticket price for tickets associated with the winning bids is based on the lowest winning bid amount for a first group ticket.

Still another embodiment provides an electronic ticket auction system, comprising: a computer system configured to receive ticket bids over a network from a first plurality of bidders for seat tickets in a group of seat tickets offered in an auction, the ticket bids including associated bid amounts; and program code stored in computer readable memory, the program code configured to: allocate seat tickets to selected bids for tickets in the group of tickets, wherein seat tickets are allocated so that a given set of seat tickets allocated to a selected bid includes rights to contiguous seats, and wherein at least one bidder bidding a first amount per ticket is selectively allocated more preferred seat tickets then another bidder bidding a second amount per ticket, the second amount greater than the first amount, in order to fill at least one seat that would otherwise remain empty.

One embodiment provides an electronic ticket auction system, comprising: an auction editor form or other user interface stored in computer readable memory and configured to be presented on an electronic display, the auction editor including: a first field configured to provide an identifier associated with the auction being edited; an auction start field, configured to receive an auction start date; an auction end field, configured to receive an auction end date; a bid increment field, configured to receive a minimum bid increment that is to be used when submitting auction bids; and at least a first field configured to define at least one ticket group; and program code operable to store in computer readable memory entries received via the auction editor fields. Optionally, a field can be provided to receive an auction information visibility date, wherein auction information (e.g., via an Internet accessible Web page displaying the event name, date, and an indication that tickets will be auctioned for the event) is displayed to potential bidders. The auction information visibility date can optionally be set to a date prior to the auction start date. Fields can optionally be provided that are configured to receive is a specification as to whether there is a maximum and/or minimum quantity of seats tickets that a bidder can bid on, and if the ticket quantity needs to be in multiples of a predetermined number. Optionally, the form can include one or more fields that can be used to indicate whether a portion of auction revenues are to be allocated to a charity.

Still another embodiment provides an electronic ticket auction system that allocates seats to bids, comprising: program instructions stored in computer readable memory configured to: receive bids from bidders for tickets; determine which bids are winning bids and which bids are losing bids; allocate tickets to bidders associated with winning bids based at least on seat rankings and winning bidders' bid per ticket amounts; perform a payment authorization check for the winning bidders; and at least partly in response to determining that a first winning bidder failed a corresponding payment authorization check, reallocate tickets to at least a portion of the remaining winning bidders, wherein tickets are no longer allocated to the first winning bidder.

Yet another embodiment provides an electronic ticket auction system that allocates seats to bids, comprising: program instructions stored in computer readable memory configured to: receive a plurality of bids associated with corresponding bidders for tickets, the bids specifying a seat quantity; store the bids in computer readable memory; determine which bids are winning bids and which bids are losing bids; retain at least a portion of the winning bids and the losing bids in computer readable memory; determine if a first winning bid is disqualified; and retrieve a first losing bid from computer readable memory and allocate a ticket to the first losing bid that had been allocated to the disqualified first winning bid.

One embodiment provides an electronic ticket auction system, comprising: program instructions stored in computer readable memory configured to: cause a ticket quantity rule to be displayed to the user informing the user that bids need to be for an even number of tickets and/or cause a ticket quantity rule to be displayed to the user informing the user that bid ticket quantities need to be in multiples of a first predetermined number; receive a plurality of bids associated with corresponding bidders for tickets, the bids specifying a seat quantity; store the bids in computer readable memory; and for at least a first of the plurality of bids, determine if the associated ticket quantity satisfies the quantity rule, and if not, cause an error message to be displayed to the associated bidder.

Still another embodiment provides an electronic ticket system, comprising: a data store that stores: ticket auction information for an event, including an auction start date, and an indication as to which seat tickets are being auctioned; ticket sales information for the event, including a ticket sale start date, and an indication as to which seat tickets are being sold at a set predetermined price, wherein the seat tickets are being sold at a set predetermined price are not being sold at auction; and program instructions stored in computer readable memory and configured to: receive an indication that a potential purchaser is interested in the event; provide the potential purchaser with an indication that seat tickets are available outside of the auction, wherein the potential purchaser can purchase seat tickets at a set predetermined price.

One embodiment provides an electronic ticket auction system, comprising: program instructions stored in computer readable memory configured to: store event ticket information in computer readable memory, the ticket information including: an indication as to which event tickets are to be auctioned; an indication as to which event tickets are being sold at auction by a first entity;

an indication as to which event tickets are being sold at auction by a second entity; and provide an event auction offer over a network to users, the event ticket offer including an offer of a first plurality of event tickets at auction, the first plurality of event tickets including at least a first ticket offered by the first entity and a second ticket offered by the second entity.

Another embodiment provides an electronic auction system, comprising: computer readable memory that stores a plurality of event unit groups, wherein each unit in at least a first unit group entitles a unit purchaser to: a ticket granting admission to the event; merchandise; a computer system configured to receive bids over a network from a first plurality of bidders for units in at least a first unit group offered in an auction, the ticket bids including associated bid amounts; and program code stored in computer readable memory, the program code configured to: determine which bids are winning bids; determine a ticket price for first group tickets associated with the winning bids.

Yet another embodiment provides an electronic auction system, comprising: computer readable memory that stores auction notifications to be selectively provided to users over a network, the notifications including: a first notification indicating that the auction has not started; a second notification indicating that the auction system is not accepting bids due to system maintenance; a third notification indicating that a user bid is being processed; and a fourth notification indicating that the auction is closed; a network interface via which the notifications are selectively transmitted to user terminals.

Still another embodiment provides an electronic ticket auction system, comprising: a computer system configured to receive ticket bids over a network from a first plurality of bidders for tickets in at least a first ticket group offered in an auction, the ticket bids including associated bid amounts; computer readable memory that stores the bid amounts in association with corresponding timestamps indicating bid times; and program code stored in computer readable memory, the program code configured to: determine if the auction has ended; retrieve and inspect a first timestamp associated with at least a first bid after the auction has ended, to determine if the first bid was submitted before the auction has ended; based at least in part on the timestamp, determine if the first bid is a winning bid.

One embodiment provides an auction system configured to extend an online auction end time beyond an initial auction end time, the auction system comprising: a data store the stores an initial auction end time; and program code configured to: determine an auction bid rate; determine if the auction end time is to be extended based at least in part on the auction bid rate.

One embodiment provides a method of processing bids, comprising: receiving over a network user ticket bids in a ticket auction, including a bid from a first user and a bid from a second user, wherein the first user bid includes a first bid amount, and the second user bid includes a second bid amount that is less than the first bid amount; a data store configured to store the bid amounts; determining which bids are winning bids, wherein the winning bids include at least the first bid and the second bid; and determining a ticket price for the users associated with the winning bids based on the second bid amount, wherein the first user is assigned a ticket at a price based on the second amount and that is less than the first bid amount.

Another embodiment provides a method of processing bids, comprising: receiving ticket bids over a network from a first plurality of bidders for tickets in at least a first ticket group offered in an auction, the ticket bids including associated bid amounts; storing in a data store the bid amounts; determining which bids are winning bids; and determining a ticket price for first group tickets associated with the winning bids, wherein the ticket price for tickets associated with the winning bids is based on the lowest winning bid amount for a first group ticket.

Still another embodiment provides a method of processing bids, comprising: receiving ticket bids over a network from a first plurality of bidders for seat tickets in a group of seat tickets offered in an auction, the ticket bids including associated bid amounts; allocating seat tickets to selected bids for tickets in the group of tickets, wherein seat tickets are allocated so that a given set of seat tickets allocated to a selected bid includes rights to contiguous seats, and wherein at least one bidder bidding a first amount per ticket is selectively allocated more preferred seat tickets then another bidder bidding a second amount per ticket, the second amount greater than the first amount, in order to fill at least one seat that would otherwise remain empty.

One embodiment provides a method of setting up an auction, comprising: storing in computer readable memory an auction editor form or other user interface configured to be presented on an electronic display, the auction editor including: a first field configured to provide an identifier associated with the auction being edited; an auction start field, configured to receive an auction start date; an auction end field, configured to receive an auction end date; a bid increment field, configured to receive a minimum bid increment that is to be used when submitting auction bids; and at least a first field configured to define at least one ticket group. Optionally, an auction editor field can be provided to receive an auction information visibility date, wherein auction information (e.g., via an Internet accessible Web page displaying the event name, date, and an indication that tickets will be auctioned for the event) is displayed to potential bidders. The auction information visibility date can optionally be set to a date prior to the auction start date. Fields can optionally be provided that are configured to receive is a specification as to whether there is a maximum and/or minimum quantity of seats tickets that a bidder can bid on, and if the ticket quantity needs to be in multiples of a predetermined number. Optionally, the form can include one or more fields that can be used to indicate whether a portion of auction revenues are to be allocated to a charity.

Still another embodiment provides a method of processing bids, comprising: receiving over a network bids from bidders for tickets; determining which bids are winning bids and which bids are losing bids; allocating tickets to bidders associated with winning bids based at least on seat rankings and winning bidders' bid per ticket amounts; performing a payment authorization check for the winning bidders; and at least partly in response to determining that a first winning bidder failed a corresponding payment authorization check, reallocating tickets to at least a portion of the remaining winning bidders, wherein tickets are no longer allocated to the first winning bidder.

Yet another embodiment provides a method of processing bids, comprising: receiving over a network a plurality of bids associated with corresponding bidders for tickets, the bids specifying a seat quantity; storing the bids in computer readable memory; determining which bids are winning bids and which bids are losing bids; retaining at least a portion of the winning bids and the losing bids in computer readable memory; determining if a first winning bid is disqualified; and retrieving a first losing bid from computer readable memory and allocating a ticket to the first losing bid that had been allocated to the disqualified first winning bid.

One embodiment provides a method of processing bids, comprising: causing a ticket quantity rule to be displayed to the user informing the user that bids need to be for an even number of tickets and/or cause a ticket quantity rule to be displayed to the user informing the user that bid ticket quantities need to be in multiples of a first predetermined number; receiving a plurality of bids associated with corresponding bidders for tickets, the bids specifying a seat quantity; storing the bids in computer readable memory; and for at least a first of the plurality of bids, determining if the associated ticket quantity satisfies the quantity rule, and if not, causing an error message to be displayed to the associated bidder.

Still another embodiment provides a method of processing bids, comprising: storing ticket auction information for an event, including an auction start date, and an indication as to which seat tickets are being auctioned; ticket sales information for the event, including a ticket sale start date, and an indication as to which seat tickets are being sold at a set predetermined price, wherein the seat tickets are being sold at a set predetermined price are not being sold at auction; and receiving an indication that a potential purchaser is interested in the event; providing the potential purchaser with an indication that seat tickets are available outside of the auction, wherein the potential purchaser can purchase seat tickets at a set predetermined price.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIGS. 1A-B illustrates an example system embodiment that can be used in conjunction with the auctions and processes described herein.

FIGS. 2-4 illustrate example auction processes.

FIGS. 5-6 illustrate example auction site navigation.

FIG. 7 illustrates an auction closed Web page user interface.

FIGS. 9-10 illustrate example event browse user interfaces.

FIG. 11 illustrates a first example auction search results page.

FIG. 12 is an example auction search result.

FIGS. 13-13A illustrate example auction selection pages.

FIGS. 15A-B illustrate an example bid processing flow.

FIGS. 18A-B illustrate an example sign-in routing process.

FIGS. 25A-B illustrate an example batch processing of a plurality of winning bids for event seats.

FIG. 26 illustrates example alternative auction formats.

FIGS. 27, 27A and 28 illustrate example user interface forms.

FIGS. 29A-B illustrate changes in lowest winning bids for selected groupings of seats at different points in an example auction.

FIGS. 30A-B illustrate example sets of auction rules.

FIG. 31 illustrates example conditions used to select versions of the first bid page.

FIG. 32 illustrates a pre-first bid user interface.

FIG. 33 illustrates a system down user interface.

FIG. 34 illustrates a post first bid user interface.

FIG. 35 illustrates an auction completed user interface.

FIG. 36 illustrates an example rebid page which can be used to increase a bid for a unit.

FIG. 37 illustrates the example rebid page of FIG. 36 with the ticket group dropdown menu displayed.

FIG. 38 illustrates an example bid confirmation user interface.

FIG. 39 illustrates example error messages.

FIG. 41 illustrates example notification rules.

FIG. 48 illustrates an example group discount form.

FIG. 49 illustrates an example invitation form.

FIG. 50 illustrates a form used to specify seat or ticket quantities being bid on by ticket groups.

FIGS. 51A-B illustrate an example billing and shipping user interface form.

FIG. 52 illustrates another example billing and shipping user interface form.

FIG. 54 illustrates an example user account auction page.

FIG. 55 illustrates an example invitation related page, listing events that others are issuing invitations for.

FIG. 56 illustrates an example auction editor page.

DETAILED DESCRIPTION OF PREFERRED EMBODIMENTS

Figure 1B:
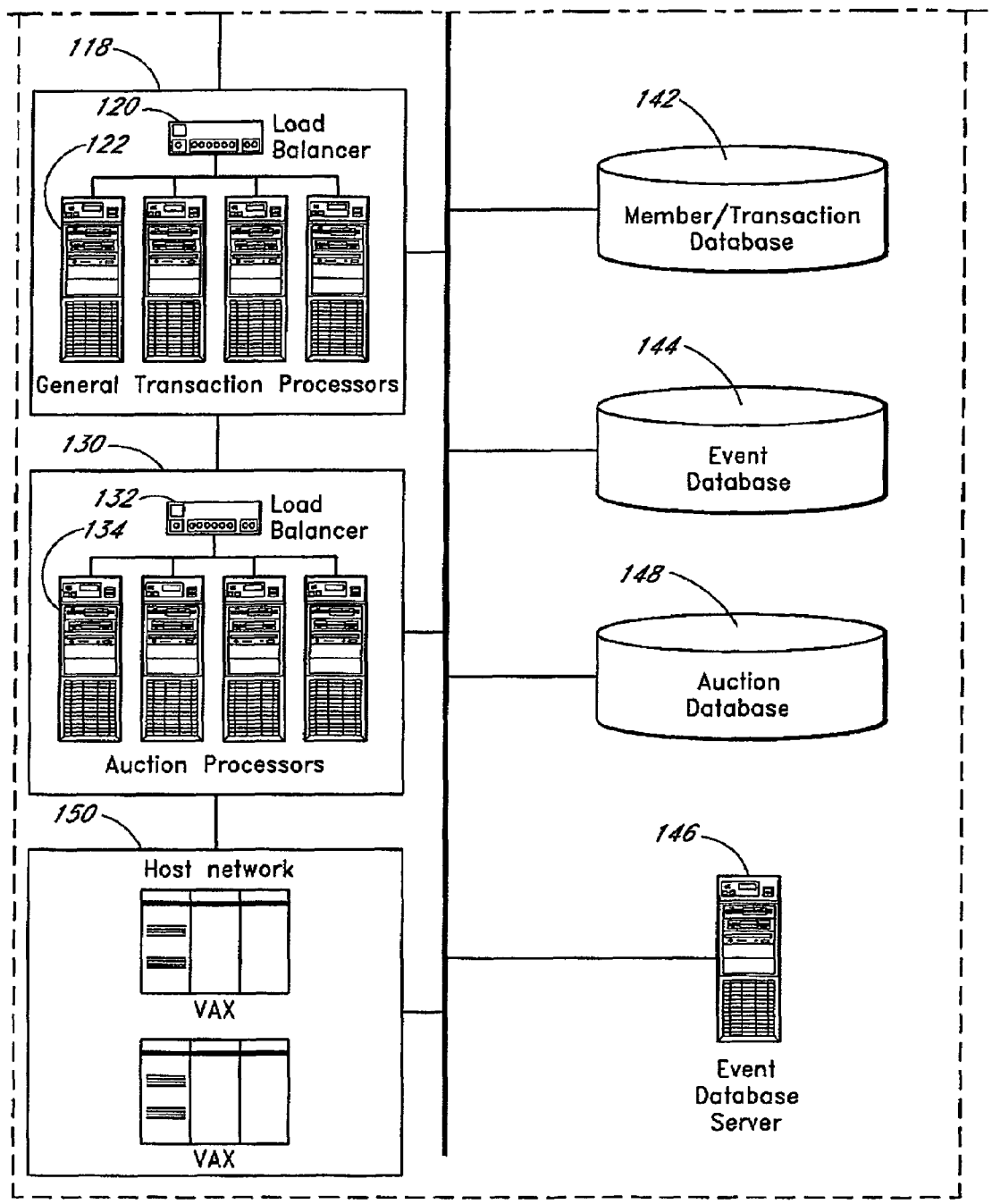

The present invention is related to resource allocation, and in particular, to apparatus and processes for electronically allocating finite or limited resources.

Throughout the following description, the term "Web site" is used to refer to a user-accessible server site that implements the basic World Wide Web standards for the coding and transmission of hypertextual documents. These standards currently include HTML (the Hypertext Markup Language), which can be used to generate Web pages, and HTTP (the Hypertext Transfer Protocol). It should be understood that the term "site" is not intended to imply a single geographic location, as a Web or other network site can, for example, include multiple geographically-distributed computer systems that are appropriately linked together. Furthermore, while the following description relates to an embodiment utilizing the Internet and related protocols, other networks, such as networked interactive televisions, and other protocols may be used as well.

In addition, unless otherwise indicated, the functions described herein may be performed by software modules including executable code and instructions running on one or more general-purpose computers. The computers can include one or more central processing units (CPUs) that execute program code and process data, memory, including one or more of volatile memory, such as random access memory (RAM) for temporarily storing data and data structures during program execution, non-volatile memory, such as a hard disc drive, optical drive, or FLASH drive, for storing programs and data, including databases, which may be referred to as a "system database," and a wired and/or wireless network interface for accessing an intranet and/or Internet. In addition, the computers can include a display for displaying user interfaces, data, and the like, and one or more user input devices, such as a keyboard, mouse, pointing device, microphone and/or the like, used to navigate, provide commands, enter information, provide search queries, and/or the like. However, the present invention can also be implemented using special purpose computers, terminals, state machines, and/or hardwired electronic circuits.

In addition, the example processes described herein do not necessarily have to be performed in the described sequence, and not all states have to be reached or performed. Further, certain process states that are illustrated as being serially performed can be performed in parallel.

Similarly, the example Web pages, emails, and associated text and images presented herein are optional and do not necessarily need to be used. Further, usage of the words "must", "require", "only", "all" and the like on the user interfaces are optional guidance and/or restrictions on example users and are not intended to limit the invention and do not limit the invention. For example, language such as "all winning bids will be charged a handling fee" is not a requirement and is not necessary, but is merely disclosed as optional language for an example embodiment. By way of further example, in an example embodiment, no fee need be charged. Several of the figures further describe optional modifications to illustrated embodiments of the described system, processes, Web pages and the like.

Further, while the following description may refer to "clicking on" a link or button, or pressing a key in order to provide a command or make a selection, the commands or selections can also be made using other input techniques, such as using voice input, pen input, mousing or hovering over an input area, and/or the like. Further, the term "button" as referred to herein can include both software generated buttons displayed on a screen and physical keyboard buttons, as appropriate. In addition, while the following description and figures may refer to email, Web pages or other methods of communicating information, still other forms of communication, such as instant messaging, SMS messaging, voice communication, and so on, can be used as well.

The processes and systems described below relate to systems and processes that enable system users to sell, license, or acquire specified quantities of units (each, a "Unit"), which may be in inventory, through an auction. Each Unit may be unique or identical to other Units that are being offered in auction and that may be acquired through the same auction. Each Unit may be comprised of one or more elements.

One example of a "Unit" may be a single event ticket. Another example of a "Unit" may be a group of event tickets. Another example of a "Unit" may be a group of event tickets and pieces of related merchandise, wherein the merchandise can optionally be related to the event (e.g., backstage passes for a concert, clothing with a performer-related design or theme, boxing gloves for a boxing event, etc.). However, a Unit need not consist of or include one or more event tickets, and may instead consist of another item or items, such as airline tickets.

In one example embodiment, user terminals access an auction computer system via a network, such as the Internet, using a broadband network interface, dial-up modem, or the like. By way of example, a user terminal can be a personal computer, an interactive television, a networkable programmable digital assistant, a computer networkable wireless phone, and the like. The user terminal can include a display, keyboard, mouse, trackball, electronic pen, microphone (which can accept voice commands), other user interfaces, printer, speakers, as well as semiconductor, magnetic, and/or optical storage devices.

An example user terminal includes a browser or other network access software capable of performing basic network or Internet functionality, such as rendering HTML or other formatting code and accepting user input. The browser optionally stores small pieces of information, such as digital cookies, in user terminal non-volatile memory. The information can be accessed and included in future requests made via the browser. By way of example, a cookie can store customer, session, and/or browser identification information which can be accessed by an auction application executing on a remote auction computer system.

The user can access information on auctions and on Units that are available for bidding, submit bids for the Units, and monitor the auction results via the user terminal browser, email, or other communication or interface mechanisms. Similarly, other users can submit Units to be auctioned off via a user terminal browser or otherwise. By way of example, an auction detail page (ADP) can be presented to a user, listing some or all of the following: the event for which Units are being auctioned, an event venue, event ticket groups (also referred to as bid guideline groups) for which tickets are being auctioned, the current low "winning" bid (wherein the winning bid may turn into a losing bid if higher bids are received) for the ticket groups, a minimum acceptable bid, a minimum bid increment, a bid field where the user can enter the bid amount, a quantity field, wherein the user can enter the quantity of Units (e.g., tickets) that the user is bidding on, etc. Optionally, the differentiator with respect to different event ticket groups is the merchandise included in a given Unit, rather than seat preferences, ranking or quality. Thus, for example, there can be different ticket groups for a general admission event, wherein one ticket group includes tickets with no associated merchandise, a second ticket group includes Units including a ticket and a first type of merchandise (e.g., a tee-shirt with a performer-related design), and a third group includes Units including a ticket and a second type of merchandise (e.g., a jacket with a performer-related design). Optionally, the ticket groupings can be based on both seat quality and the merchandise type.

Optionally, the auction system can have access to an inventory of tickets to be auctioned for an event and to tickets that are to be conventional sold at a fixed price. Thus, the auction system can sell tickets in a conventional, set price, non-auction process as well as auction tickets. Thus, a user can be informed that certain tickets for an event are available for auction and certain tickets may be conventionally purchased at a set price. Further, a Web page can be provided to a user that notifies the user that there are no tickets available at a fixed price for a desired event and that provides links to ticket auctions for the event. In addition, relevant ticket auction information is optionally provided, such as the event name, the opening date of the auction, the closing date of the auction, the auction status, and so on. Optionally, this page will not display closed auctions. In addition, a Web page can be provided to a user that notifies the user that there are no tickets available for auction for a given event, and that provides links to purchase tickets at a fixed price for the desired event.

The auction computer system can include auctioning servers, account manager servers, a credit card authorization system, an internal network, request routers, data and status queues, and an interface to the Internet. The auction computer system can host a Web site, accessible by users, for auctioning Units, such as tickets. The auction computer system can include one or more databases whose data can be accessed as needed. For example, the databases can include a user account database, that stores user contact information, billing information, preferences, account status, and the like, that can be accessed by other portions of the auction computer system, such as by account manager servers. The auction computer system can include an auction database that stores auction rules, bidder eligibility criteria, information on the Units being auctioned, including a description, the minimum bid price, if any, the quantity available, the minimum quantity of Units that can be bid on by a given user, the maximum quantity of Units a given user can bid on, the date the auction ends for the corresponding Units, the current bids, the current bid ranking, corresponding bidder identifiers, bid ranking criteria, Unit categories, and the like.

Similarly, where the Units include tickets, one or more ticket databases accessible by the auction computer system are provided that store ticket information records for tickets, including, for example, barcode information, event name, event date, seat identifier, ticket holder name or other identifier of a current ticket holder, names or other identifiers of past holders of the ticket, a ticket valid/invalid indicator, and an indicator as to whether the ticket has been used. In addition, an event database can be provided that stores information regarding events, including the venue, artist, date, time, and the like.

Optionally, the auction end date and/or time (sometimes collectively referred to as the "auction end time") can be varied in response to one or more conditions. For example, the auction end time can be initially set for a first time, and if bidding reaches a predetermined bid rate threshold during a predetermined window of time before the initial end time, the auction end time can be extended. For example, if the bid rate reaches or exceeds a first threshold level in the final five minutes of the auction, and the auction system is not adequately processing the bids (e.g., a bid queue has more than a predetermined number of bids queued), or the auction system determines that there is continued demand for auctionable units optionally based on the bid rate and/or page view of an event auction Web page, the auction end time can optionally be automatically or manually extended (e.g., for another 5 minutes or another hour).

Thus, the user interfaces described herein can be retrieved from an auction system data store, with one or more user interface fields or areas populated in substantially real time, and the user interfaces, including dynamically changing information, can be presented to the user via a user terminal.

FIGS. 1A-B illustrates an example system embodiment that can be used in conjunction with the auctions and processes described herein. Not all of the illustrated systems and components need to be included in the auction system and other systems and architectures can be used as well. With reference to FIGS. 1A-B, the auction system includes a user terminal 102 coupled to an example auctioning and ticketing system ("auction system") 104 over the Internet 105 using HTTP/HTTPS. An example web proxy system 106 includes an optional load balancer 108 and web proxy processors 110, and can selectively block or route an inbound request from a user browser executing on the terminal 102 to an appropriate internal destination, which can be a queue or other destination server.

The illustrated example auctioning and ticketing system 104 includes example Web application system 112, which includes an optional load balancer 114 and Web application processors 116. A general transaction system 118 includes an optional load balancer 120 and transaction processors 122 that are used to generate transactional pages, populate data caches, provide logic and/or rules for the transaction flows, and to sequence requests. A cache cluster system 124 includes an optional load balancer 126 and processors 128. The cache cluster system 124 caches data and states for quick access by other system components.

An example auction processor system 130 is provided that includes an optional load balancer 132 and auction processors 134. The example auction processors 134 conduct and/or manage the auctions, keep track of items or sets of items being auctioned, the status of auctions, the current bidders, the current bid amounts, the minimum bid increments, the current lowest bid prices needed to potentially win auctions, the number of items in a set being auctioned off, and so on. The use of load balancers and multiple auction processors can enable the auction to continue, potentially with little or no performance impact, even if an auction system component (e.g., a processor 134) fails. 104. For example, if an auction processor fails, auction processes that were performed by the failed auction processor are optionally directed via the load balancer to another auction processor. A session cluster system 136 includes an optional load balancer 138 and a plurality of processors 140 and is used to manage sessions.

A member transaction repository database 142 stores user contact information, billing information, preferences, account status, and the like, that can be accessed by other portions of the auctioning and ticketing system 104. In addition, the database 142 can store an opt-in indication, wherein the user has agreed to have their bid automatically increased by a certain amount and/or up to a maximum amount in order to attempt to ensure that they win a given auction. The database 142 can also store a user opt-in for notifications regarding auctions, auction status, and/or change in the user's bid status from losing to winning bid or from winning to losing.

An event database 144 stores information regarding events, including, by way of example, the venue, artist, date, time, and the like. The event database 144 or a separate database includes ticket information records, including one or more of barcode information, event name, event date, seat identifier, ticket holder name or other identifier of a current ticket holder, names or other identifiers of past holders of the ticket, a ticket valid/invalid indicator, and/or an indicator that as to whether the ticket has been used. An event database server 146 is used to provide event database access to other portions of the auction system.

An example database 148 is provided that stores one or more of Seller auction rules, auction operator auction rules, bidder eligibility criteria, information on the Units being auctioned, including a description, the minimum bid price, if any, the quantity available, the minimum quantity of Units that can be bid on by a given user, the maximum quantity of Units a given user can bid on, the date the auction ends for the corresponding Units, the current bids, the current bid ranking, corresponding bidder identifiers, bid ranking criteria, Unit categories, and/or the like. The database 148, or another database, can also store information regarding non-auction ticket sales for an event, such as a presale beginning date, where selected users can purchase tickets at set prices before the general public can, an presale end date, an onsale beginning date, where the general public can purchase event tickets at set prices, an onsale end date, the maximum quantity of Units a user can purchase, and so on.

A host network system 150 is provided that stores bids (e.g., winning and losing bids), event and auction set-up information, section and seat information (e.g., quality or ranking information), seat to bidder allocations, and credit card processing.

The auction system enables many types of auctions to be operated at the same or different times, and optionally enables Sellers to set certain of the Sellers' own rules for the auction. The Seller specified rules can optionally include one or more of bidder eligibility rules, rules regarding the number of Units a bidder can bid on at a time in a given auction, rules regarding the minimum bid amount, rules regarding the maximum bid amount, rules regarding the minimum bid increment, rules regarding retraction of bids, rules specifying the type of auction (e.g., pay-what-you-bid pricing auction, uniform pricing auction, etc.), rules specifying how bids are to be ranked, rules specifying the association between bids and Units, and so on. The auction operator can optionally also specify one or more of the foregoing rules as well as additional rules.

For example, the auction system enables a single user (the "Seller") to sell (e.g., on behalf of himself or a principal) Units to multiple users (each bidding user is also referred to as a "Bidder"). Thus, for example, the Seller can optionally be acting as a ticket issuer (such as an artist, event producer, or venue), or an agent for the issuer, rather than as a reseller. Thus, the Seller can be a primary market ticket seller, rather than a potentially less reliable secondary market reseller. The Seller can also be a reseller, such as a secondary market reseller where the seller had purchased the tickets from a source, such as a primary market ticket seller, and is reselling the purchased tickets to others. Thus, the auction system can optionally sell tickets on behalf of both a ticket issuer and a reseller, and can appropriately identify which tickets to be auctioned are associated with a ticket issuer and which tickets to be auctioned are associated with a reseller.

By way of example, the auction system enables the Seller to sell Units to multiple Bidders via an auction, such as a single online auction, where the Seller determines whether or not to impose either or both a Unit quantity maximum level or a Unit quantity minimum level, where each such level is determined by the Seller. For example, the Unit quantity maximum level can be set to a value that is less than the total quantity of Units being auctioned through such auction. If both a Unit quantity maximum level and a minimum level are set, then a Bidder is not allowed to bid for a quantity of Units offered by the Seller that is less than any Unit quantity minimum level or greater than any Unit quantity maximum level.

Instead of a minimum or maximum level as just described, the Seller may instead offer Bidders several specified choices when determining the quantity of Units to bid on. For example, the Seller may only offer Bidders the chance to bid on a Unit quantity that is a multiple of two (e.g., an integer multiple), is an odd number, or is the number five, seven, eight, or other determined number. As discussed herein, the foregoing bidding limitations or requirements can be stored in an auction database such as the example auction database 148 illustrated in FIG. 1B. If a Bidder submits a bid that violates one or more rules, the bid is optionally not entered into the auction. Thus, for example, if a Bidder attempts to submit a bid for tickets for three seats, and the auction rules specify that bids must be for an even number seats, upon receiving the bid submission, the auction system can determine that the auction rules were not met, and can further transmit a notification to the user that the bid failed to be submitted to the auction because of the rule compliance failure. Similarly, the auction system may present Bidders with a quantity menu for which a Bidder needs to select a desired seat quantity (e.g., quantity of 2, 4, 6, 8, or by way of further example, quantity of 5, 10, 13, etc.).

The auction system regulates auctions so as to enhance the auction organization and fairness. For example, the auction system optionally does not allow a Bidder to revoke her or his bid. By way of further example, the auction system may optionally not allow a Bidder to place two bids in the same auction, or use the same identifying information to place two bids in the same auction (e.g., the same email account or credit card or postal address). The auction system optionally allows a Bidder to increase or decrease either or both the quantity or price of one or more Units in a bid after placing the initial bid. The auction system rules can optionally further specify the minimum bid price increment.

The auction system may condition a potential Bidder's eligibility to participate in an auction based on certain Bidder or other characteristics, which may include, without limitation, whether the potential Bidder has purchased or registered for a certain type of membership, the potential Bidder's past purchase history with respect other items sold or offered for sale by the Seller or a third party, where the Bidder lives (for example, bidders may be required to be within a particular geographic region, within a particular governmental entity, such as a particular state or states, city or cities, zip code or zip codes, or within a certain distance from a given location, such as a venue or the like), and/or whether the Bidder meets certain financial qualifications.

Units in an auction may be placed into one or more categories. One example of categories is where the Units consist of tickets to a single event, all of which are for seats in a defined area, such as all seats that are in the first 30 rows at that event, and there are three categories of Units, the first category ("Category A") consisting of tickets for seats in row numbers one through 10, the second category ("Category B") consisting of tickets for seats in row numbers 11 through 20 and the third category ("Category C") consisting of tickets for seats in row numbers 21 through 30. These categories may then be ranked from best to worst according to criteria established by the Seller or otherwise. For example, Category A may be ranked as better or more likely to be preferred by Bidders than Category B, which may be ranked as better or more likely to be preferred than Category C. Thus, a group or category of seats can be a group of contiguous seats or rows of seats, or a group or category of seats can include, for example, only a portion (e.g., a pair of seats) of the seats in a plurality of venue sections. Another example of categories of Units are categories based on the types of rights that holders of those Units have (e.g., Units that give all holders the ability to choose from a list of items first as opposed to second). While a single physical ticket allocated to a Bidder may provide rights to several seats (e.g., several contiguous seats), for convenience, the phrase "seat tickets" allocated to a given Bidder is intended to cover a single ticket providing rights to multiple seats.

Where a Unit is unique (e.g., a Unit consists of a ticket for a reserved seat rather than a general admission ticket), the Seller may optionally rank it with respect to other Units in an auction from best to worst according to a criteria determined by the Seller or otherwise (which, may include, but not be limited to, in the case of event tickets, row, aisle, seat number and/or performance date), or may rank certain Units equally to other Units with a group or category of Units (e.g., the Seller may decide to rank equally all seats within the same row). Also, different criteria can have corresponding weightings in determining a ranking. The seats, singly or as part of a group or category of seat, can instead or also be optionally ranked as most expensive to least expensive.

The Seller may also rank Bidders' bids in an auction from highest to lowest (with some bids possibly being ranked equally to other bids) according to criteria determined by the Seller or otherwise. Examples of such criteria that may be used can include some or all of the following optional examples: the Unit price bid, the quantity of Units in the bid, the time that bid is placed, the status of the Bidder (e.g., if the Bidder has won other auctions, has paid for a certain type of membership, is placing the bid using a particular type of credit card (such as an American Express credit card) or other selected payment mechanism, has had a membership of a certain duration, or has purchased other products from the Seller or specified third parties in the past. Also, different criteria can have corresponding weightings in determining a ranking, such as certain criteria is more important then other criteria in determining a ranking. For example, bids can first be ranked based on the amount of the bid, and if there are ties, then the first received of the tying bid will be given a better rank.

If Units and Bidders' bids in an auction are ranked, then if so specified by the rules, Units are assigned to Bidders' bids according to the rankings of each (for example, the highest ranked Unit is assigned to the highest ranked bid, then the second highest ranked Unit is assigned to the second highest ranked bid, then the third highest ranked Unit is assigned to the third highest ranked bid, etc.) until no more Units remain in the auction to assign to bids, with all bids to which Units are assigned being given the status of "Winning Bids" and all bids to which Units are not assigned being given the status of "Losing Bids" (wherein the Bidders who placed those bids will not receive Units as a result of placing them); provided that this assignment process may be adjusted in accordance with different Packing (defined below) schemes. Optionally, rather than assigning seats to bids based on the bid rankings, a random seat (or seats) within a selected area or within the venue as a whole can be assigned to a highest bidder for the random seat. Thus, a "wild card" seat can optionally be put up for auction.

By way of further example, rather than rank seats (e.g., based on a perceived seat preference), the seats can be assigned to Bidders in a random or non-random seating order. For example, the highest bid may be assigned to the first row leftmost seat in a given section or the venue as a whole, even if the first row leftmost seat is not perceived to be the best seat in that given section or venue as a whole. The next highest bid can be assigned the first row, second leftmost seat, etc. Thus, a given highest bid made be sufficient to ensure that the bidder will win a ticket, but optionally may not ensure that the highest bidder will receive the best seat being auctioned.

In an optional embodiment, if Bidders' bids are ranked, and Units in a set of Units in an auction (where such set may consist of all Units, or less than all Units, in an auction) are not ranked, then Units in that set are assigned to Bidders' bids in the order of the bid ranking until no more Units in the set remain to be assigned to Bidders, with all bids to which Units are assigned being given the status of "Winning Bids" and all bids to which Units are not assigned being given the status of "Losing Bids" (wherein the Bidders who placed those bids will not receive Units as a result of placing them) (unless they are "Winning Bids" with respect to Units in another set); provided that this assignment process may be adjusted in accordance with different Packing schemes.

The Seller may determine which method or methods to use in deciding how to price Units assigned through an auction. For example, the Seller can specify or select, via a user interface provided to a Seller terminal over a network by the auction system, an auction type (e.g., pay-what-you-did pricing, uniform pricing, how many bid groups are to be provided, etc.). One such method is "Pay-What-You-Bid Pricing", in which the price to be paid through the auction for a Unit will be the price in the Winning Bid to which such Unit is assigned. In addition to the ticket price, optional additional service, shipping, and other fees and taxes may be charged as well.

Figure 2:

FIG. 2 provides an example of a user interface that can be used for a Pay-What-You-Bid Pricing (sometimes referred to as discriminatory pricing) auction via which a Bidder can bid for Units, in this example, tickets. An auction info rules area 210A informs the Bidder of the rules for the current auction. For example, the Bidder is informed that the Bidder can only submit one valid bid at a time and that once the bid is submitted, the Bidder cannot cancel the bid. The Bidder is also informed that the Bidder can increase the bid. In this example, the Bidder is informed that bids are ranked first by the amount bid per tickets, and that ties will be broken based on the bid times, wherein earlier bids receive priority over later received bids of the same amount. In addition, the Bidder is informed that higher ranked bids may bump the Bidder's bid into lower ticket groups or out of the auction. The Bidder is also informed of the operation of "Pay-What-You-Bid Pricing." In particular, the bidder is informed that if the Bidder has a valid winning bid when the auction ends, the Bidder will be charged a per ticket price corresponding to the amount the Bidder's bid in addition to applicable delivery and processing fees. Other rules can be applied as well.

In bidding area 201A, the Bidder can specify the number of tickets being bid on in field 202A and the maximum price the Bidder is willing to bid per ticket in field 204A. The user can also specify that the Bidder is to be notified if the Bidder is outbid via notification field 206A. The example user interface also includes an auction status area 208A that provides auction information, such as bidding information (e.g., the current low bid) for several categories or groups of seats (e.g., certain rows or groups of rows), auction starting bid per ticket, and the time remaining in the auction. In addition, a refresh button is provided which, when activated by a user, will cause the auction status information to be updated by the auction system.

FIG. 50 illustrates an optional example form used to specify seat or ticket quantities being bid on for selected ticket groups.

Another auction method utilizes "Uniform Pricing", in which the price to be paid through an auction for a Unit in a certain set or category of Units will be the same as the price to be paid for the other Units in that set (optionally minus and discounts or rebates, and plus any handling or shipping fees), where the "set" can either be all of the Units in the auction or a group of Units that does not consist of all Units in the auction. Optionally, even though bidders for a Unit in a certain set of Units may pay the same price, higher bidders can be allocated better or higher ranked Units (e.g., tickets for better seats) in the set as compared to relatively lower bidders. If there is more than one set of Units in an auction then the Seller can use "Pay-What-You-Bid Pricing" for Units in one or more sets, and may also use Uniform Pricing for Units in one or more other sets. Thus, there can be multiple auction types in a given auction.

FIG. 3 provides an example of a user interface that can be used for a Pay-What-You-Bid auction, where there is only one set of Units (General Admission tickets) in an auction. In this example, the seats being auctioned are general admission tickets, wherein a ticket holder is not assigned a specific reserved seat. A bidding area 201B is provided that is similar to bidding area 201A in FIG. 2A. The auction status area 208B does not list several ticket groups or categories as does auction status area 208A in FIG. 2A. Instead, one ticket group (e.g., General Admission) is listed. The auction info rules area 210B is similar to rules area 210A, except rather than specifying a "Pay-What-You-Bid Pricing" rule, the rules area 210B specifies a Uniform Pricing rule. In this example, the Uniform Pricing rule informs the Bidder that if the Bidder has a valid winning bid when the auction ends, the Bidder will be charged a per ticket price corresponding to the lowest winning bid at the auction close, in addition to applicable delivery and processing fees.

FIG. 4 provides an example of how Uniform Pricing can be used where there are multiple sets of Units in an auction. A bidding area 201C is provided that is similar to bidding area 201A in FIG. 2A. The user interface also includes an auction status area 208C similar to that illustrated in FIG. 2. The auction status area 208C provides auction information, such as bidding information (e.g., the current low bid) for several categories or groups of seats, such as for certain rows or groups of rows, auction starting bids per ticket, and the time remaining in the auction. The rules area 210C is similar to rules area 210B. In this example, the Uniform Pricing rule informs the Bidder that if the Bidder has a valid winning bid when the auction ends, the Bidder will be charged a per ticket price corresponding to the lowest winning bid for the ticket group corresponding to the Bidder's bid, in addition to applicable delivery and processing fees.

The auction system may enable the Seller to make one or more Units being auctioned available for purchase immediately at a fixed price (which the auction system may allow to change, or to be changed by the Seller over time), in which case the Units would be removed from the auction upon a Bidder submitting a "bid" or purchase price therefor (and consequently purchasing the Units). The auction system may also enable the Seller to make one or more Units available for purchase immediately at a fixed price that is a function of one or more current bid prices (e.g., 20% more than the current highest winning bid), and if a Bidder submitted a bid therefore (and consequently purchased the Units) the Units would either, at the Seller's discretion, be removed from the auction (e.g., other bidders cannot bid on those seats, other bids for those seats will not be successful, etc.) or be removed from an inventory pool of Units that was not being auctioned.

Bid ranking rules and/or criteria weightings can be provided, via a Web page or other communication mechanism to bidders, sellers, or others. Optionally, when bids are ranked, a ranking score based on the ranking criteria is displayed or accessible to the bidders, or just to the bidder who submitted the corresponding ranked bid. Further, the formula or calculation that generated the score can optionally be displayed to the bidder so that the bidder can better understand the ranking process and understand how to improve the bidder's future rankings. For example, once a bid is submitted using one of the user interfaces illustrated in FIGS. 2-4 or using a different user interface, the bid ranking can be presented to the Bidder via a Web page, email, instant messaging, SMS message, and/or otherwise.

The auction system may change the Unit that is assigned to a Winning Bid as higher ranked Winning Bids are subsequently placed or are disqualified. For example, if a Bidder ("Bidder A") had submitted a bid of $200 which caused the second highest ranked Unit to be assigned to that bid, and then a new Bidder ("Bidder B") were to submit a bid for $201 then the second highest ranked Unit would instead be assigned to Bidder B's bid and Bidder A's bid would be "bumped down" so that the Unit now assigned to Bidder A would be the third highest ranked Unit. Consequently, in this example, each lower ranked bid in the auction would then be bumped down so that a lower ranked Unit would instead be assigned to it.

The auction system may cause the opposite (i.e., a bid being "bumped up") to occur either during or after an auction when a higher ranked bid is disqualified. Disqualification may happen for many reasons, which may include, without limitation, the Seller or system operator determining that the Bidder violated the auction rules or the Bidder's credit card failing authorization procedures. One example of "bumping up" is as follows:

Bidder X has the third highest ranked Winning Bid and consequently the third highest ranked Unit assigned to his bid.

Bidder Y has the second highest ranked Winning Bid and consequently the second highest ranked Unit assigned to his bid.

Bidder Z has the highest ranked Winning Bid and consequently the highest ranked Unit assigned to his bid.

Bidder Z's bid is then disqualified and is no longer a Winning Bid. Consequently, Bidder X's bid is bumped up so that he now has the second highest Winning Bid and consequently the second highest ranked Unit assigned to his bid, and Bidder Y's bid is bumped up so that he now has the highest Winning Bid and consequently has the highest ranked Unit assigned to his bid.

Through the bumping down function the auction system may cause a bid to change status from a Winning Bid to a Losing Bid. One example of the bumping down function causing a Winning Bid to change into a Losing Bid is as follows:

There are 10 Units in an auction.

Bidder P has submitted the 10th highest ranked bid and consequently the 10th highest ranked Unit has been assigned to his bid.

Bidder Q then bids in that auction and submits a bid that is ranked slightly higher than Bidder P's bid. Consequently, Bidder P now has the 11th highest ranked bid, and, because there is not an 11th highest ranked Unit, Bidder P's bid has now converted from Winning Bid status to Losing Bid status.

Through the bumping up function the auction system may cause a bid to change status from a Losing Bid to a Winning Bid, either during or after an auction. One example of the bumping up function causing a Losing Bid to change into a Winning Bid is as follows:

There are 10 Units in an auction.

Bidder R has submitted the 11th highest ranked bid and consequently his bid is a Losing Bid.

Bidder S had submitted the 9th highest ranked bid and consequently his bid was a Winning Bid to which was assigned the 9th highest ranked Unit. However, Bidder S's bid is disqualified, so Bidder R's bid is bumped up to become the 10th highest ranked bid causing the 10th highest ranked Unit to be assigned to it and consequently causing it to have its status converted from Losing Bid status to Winning Bid status. Thus, upon close of auction, a seat assignment and packing process can be performed, then a credit card check (or other payment authorization check, such as for a debit card payment) can be performed, wherein the credit card check can be performed in bid or seat order, wherein the credit card authorization is performed first for the bidder with the highest bid, then the bidder with the second highest bid, etc. If a bidder's credit card check fails, then optionally the fulfillment process can be stalled pending bidder contact and receipt of an alternate method of payment. Optionally instead, the credit card check can be performed first for bidder assigned the highest ranked seat, then the bidder with the next highest ranked seats, etc. If a bidder's credit card check fails, then optionally a repacking process can be performed for all of the bidders in a given section or overall, or just for those bidders assigned seats of equal or lower ranking. Once the re-ranking process has been performed, then the credit card check process can continue, optionally starting with the bidder with the highest ranked seat whose credit card has not yet been checked.

As bids are bumped down and bumped up, the Units assigned to those bids may be of different categories. For example, if the 10th highest ranked Unit is in Category A and the 11th highest ranked Unit is in Category B, when a Bidder is bumped down from having the 10th highest ranked Winning Bid to having the 11th highest ranked Winning Bid, a Category A Unit will no longer be assigned to that bid and a Category B Unit will instead be assigned to that Winning Bid.

The auction system may allow a Bidder to indicate that he is not interested in acquiring Units in certain categories. If the Bidder indicates that he is not interested in acquiring Units in a certain category, then if that Bidder's bid is bumped down so that Units from that category would be assigned to it, the bid will be removed from the auction or converted to Losing Bid status rather than being assigned to a Unit in that certain category.

The auction system may optionally require that a bid be for a certain Unit price in order to qualify to be placed in an auction. Similarly, the auction system may optionally require that a bid be for a certain Unit price in order for a Unit in a certain category to be assigned to that bid.

The auction system may optionally cause the minimum price or quantity level for all Units or particular Units to decrease over time.

The auction system may send an email, instant message, or otherwise provide a notification to a Bidder when his bid is bumped down or bumped up, when his bid status changes from Winning Bid to Losing Bid or from Losing Bid to Winning Bid, or when his bid is bumped down or bumped up causing the Unit assigned to it to change from one category to another category. Optionally, if several email notifications are pending regarding an event type (e.g., 5 emails have not yet been sent out regarding 5 bid bumps for a given auction), the system can filter out or inhibit sending the older notifications, and just send the most current notification (e.g., providing the user's current bid).

If Units in an auction are tickets for assigned seats or seats at specific tables, or Units in an auction have other attributes causing them to be of greater value if they are sold or otherwise allocated along with other Units with the same or similar attributes (e.g., airplane tickets for seats in the same section, artwork by the same artist or in the same series of paintings), then the auction system may provide the Seller or Bidder with the ability to cause the Units to be assigned in a way that maximizes value to the Bidders (e.g., causing all tickets assigned to a particular bid to be for seats that are all next to each other at the same concert or within a predetermined grouping), maximizes the quantity of Units to be sold through an auction, or maximizes the aggregate amount of money received by the Seller from the sale of all Units. Assignment schemes are referred to as "Packing". The following are example Packing methods:

A lower ranked bid may be assigned Units that are ranked higher than Units assigned to a higher ranked bid if such lower ranked bid is for a quantity of tickets that either or both (a) enables all (or most) tickets for seats in the same vicinity to be sold through the auction while simultaneously ensuring that all tickets sold through the same bid are for seats that are next to each other or (b) maximizes the total aggregate dollar value of bids in the auction while simultaneously ensuring that all tickets sold through the same bid are for seats that are next to each other.

In an example embodiment, lower ranked bids will be assigned Units that are ranked lower than Units assigned to higher ranked bids, even if as a result tickets for some seats are not sold through the auction. Thus, in one embodiment, where there is a given quality group, such as a group of seats with the same ranking, the auction system optionally packs as many Bidders into the quality group (to reduce the number of unsold seats) while optionally fairness is preserved.

Several optional packing methods will now be described. The seat assignments are optionally performed by an auction system packing system that accesses and downloads a list of available seats and optionally including corresponding orderings, quality ratings or rankings from another computer system or other repository. Each quality rating can optionally be associated with a different price per seat, such as a different minimum required bid per seat. An example embodiment of the packing system will compare and rank or order bids and associate certain bids with seats based on one or more criteria, such as the bid amounts and the bid times. Thus, for example, the packing system can optionally sort inventory, such as seating inventory, in quality order, and then, as bids are received, slot auction winners into available inventory, that is already sorted in quality order.

By way of example, in one optional embodiment, the winning bids determination and seat assignment determination can be performed as follows.

Definition:
1) <Seat block> is a contiguous set of seats within the same X number or event section and the same row.
2) <bid guideline group> is specifically assigned to each seat block (where a seat block can include one or more seats, tables, etc.), such as by using a qualifier mask.
3) Each X number has its <quality offset> defined in seating chart.
4) <quality group> is calculated as ("row number" within an X number+<quality offset>).
   Thus, seats within one X number+row belongs to the same <quality group>.
   Each <quality group> includes rows from multiple X numbers.
5) Each row optionally has a <quality direction>. [L]eft to right or [R]ight to left or [C]enter to out.
   For [C]enter <quality direction>, <direction offset> is specified as 0-based offset from the first seat defined in each <seat block>.
6) <quality order> defines the quality of each seat. To calculate <quality order> seats are sorted by
   0) bid guideline group
   1) quality group
   2) x number
   3) seats in <quality direction>
7) System will assign seats in this <quality order>. One or more exceptions are optionally provided. For example, the system may <pack> bids within the same <bid guideline group>.

In another embodiment:
1) <Seat block> is a contiguous set of seats within an event section within the same row and may or may not include all seats in the row.
2) <bid guideline group> is specifically assigned to each seat block (where a seat block can include one or more seats, tables, etc.), such as by using a qualifier mask.
3) Each Seat block has a quality level defined in seating chart.
4) Each Seat block row optionally has a <quality direction>. [L]eft to right or [R]ight to left or [C]enter to out.
   For [C]enter <quality direction>, <direction offset> is specified as 0-based offset from the first seat defined in each <seat block>.
6) <quality order> defines the quality of each seat. To calculate <quality order> seats are sorted by
   0) bid guideline group
   1) quality level
   3) seats in <quality direction>
7) System will assign seats in this <quality order>. One or more exceptions are optionally provided. For example, the system may <pack> bids within the same <bid guideline group>.

Different packing methods can be used by the auction system. Thus, for example, one venue or event may use a different packing method than another venue or event. Further, different packing methods can be utilized for different sets of sets for the same event at the same venue. For example, one packing method described herein is referred to for convenience as "fair slotting". Another packing method is referred to for convenience as "full shuffling". Still other methods can be used. The packing process optionally ensures that seats allocated to a given user's bid are contiguous. Another embodiment of the packing process does not give primacy to ensuring that seats allocated to a given user's bid are contiguous, and instead, in order to have a tighter packing, the seats need not be contiguous.

For example, with respect to the fair slotting method, the highest bid is associated with the best available set in the current auction bid guideline group, the next highest bid is applied to the best available remaining seats within current bid guideline group, and so forth. Once no consecutive seats are available for next highest bid, within current particular bid guideline group, the bid guideline group is closed and the remaining bids will go to the next bid guideline group (excepting those bidders who indicated that they did not want their bids applied to other seating blocks or groups). The fail slotting method may tend to maximize the price paid for a given seat, but may result in relatively more unsold seats than the full shuffling method described below.

The full shuffling method is suitable for the uniform pricing model, and will tend to result in an increase in number of winners and decrease the number of unassigned, unsold seats, as compared to utilizing the fair slotting method alone. As a result, bidders are more tightly "packed" into the seats being auctioned. The packing can optionally be performed in substantially real-time as bids are received and evaluated, the packing can optionally be performed at a predetermined time or on a periodic basis (e.g. once every minute, hour, or day), or at a predetermined event e.g., close of auction). In one example embodiment, there is a group of winning bids that are, provisionally, assigned seats, and a group of losing bids whose bids were too low to be assigned a seat using the fair slotting method. For example, provisional bid-seat assignment can initially be made using the fair slotting method. Then the fully shuffling method is applied, wherein one or more of the highest, next highest, etc., losing bids may be assigned with seats by shuffling already winning bids. The shuffling process will end and the corresponding bid guideline group of seats will be closed for auction once no shuffling would make the seats available for next highest losing bid. After shuffling process, the higher price bid will show up ahead of lower price bid in the bid ranking and seat assignment, as long as both have the same quantity of seats.

Example applications of packing will now be described.

Assume section AUC1 has 3 X numbers X0, X1, X2.

In a section definition area of a corresponding seating chart, an event creator (such as a venue operator, ticket system operator, or other authorized entity) will define a <quality offset> number for each X number.

For example:
X0<quality offset>=0
X1<quality offset>=2
X2<quality offset>=3

Therefore:
3rd row in X0 is equal value to 1st row in X1.
4th row in X0 is equal value to 1st row in X2.

The list below is sorted by <quality order>, where "C" means the highest quality seats are in the center, "R"

means the highest quality seats begin on the right, and "L" means the highest quality seats begin on the left.

| Row | Seats | QualityOrder | Qualitygroup | Bid Guideline Group |
|---|---|---|---|---|
| X0 A | 1, 2, 3, 4, 5 | C (offset 3) | 1 (=1 + 0) | 1 |
| X0 B | 3, 4, 5, 6 | C (offset 1) | 2 (=2 + 0) | 1 |
| X0 C | 1, 2 | R | 3 (=3 + 0) | 1 |
| X0 C | 5, 6 | L | 3 (=3 + 0) | 1 |
| X1 AA | 4, 5, 6 | R | 3 (=1 + 2) | 1 |
| X0 D | 5, 6 | L | 4 (=4 + 0) | 2 |
| X1 BB | 4, 5, 6, 7 | R | 4 (=2 + 2) | 2 |
| X2 A | 4, 5 | L | 4 (=1 + 3) | 2 |
| X1 DD | 2, 3 | R | 6 (=4 + 2) | 2 |
| X2 C | 1, 2, 3 | L | 6 (=3 + 3) | 2 |
| X2 D | 1, 2 | L | 7 (=4 + 3) | 2 |
| X2 D | 5, 6, 7 | L | 7 (=4 + 3) | 2 |

Example:

| Bids Price | Qty | Fair Slot | Full Shuffling |
|---|---|---|---|
| $1000 | 2 | (1) X0-A-1, 2 | (1) X0-A-1, 2 |
| $980 | 4 | (1) X0-B-3, 4, 5, 6 | (1) X0-B-3, 4, 5, 6 |
| $960 | 2 | (1) X0-A-3, 4 | (1) X0-C-1, 2 |
| $940 | 3 | (1) X1-AA-4, 5, 6 | (1) X0-A-3, 4, 5 |
| $920 | 2 | (1) X0-C-1, 2 | (1) X0-C-5, 6 |
| $900 | 3 | (2) X1-BB-4, 5, 6 | (1) X1-AA-4, 5, 6 |
| $890 | 2 | (2) X0-D-5, 6 | (2) X0-D-5, 6 |
| $880 | 3 | (2) X2-C-1, 2, 3 | (2) X2-C-1, 2, 3 |
| $870 | 2 | (2) X2-A-4, 5 | (2) X2-A-4, 5 |
| $860 | 1 | (2) X1-BB-7 | (2) X1-DD-2 |
| $850 | 2 | (2) X1-DD-2, 3 | (2) X2-D-1, 2 |
| $840 | 4 | (loser) | (2) X1-BB-4, 5, 6, 7 |
| $830 | 3 | (loser) | (2) X2-D-5, 6, 7 |
| $820 | 2 | (loser) | (loser) |
| $810 | 3 | (loser) | (loser) |
| $800 | 2 | (loser) | (loser) |
| $790 | 3 | (loser) | (loser) |
| $780 | 1 | (loser) | (loser) |
| Unassigned | | (1) X0-A-5 | (2) X1-DD-3 |
| Unassigned | | (1) X0-C-5, 6 | |
| Unassigned | | (2) X2-D-1, 2 | |
| Unassigned | | (2) X2-D-5, 6, 7 | |

As illustrated by the above example, with the same number of bids and the same bid amounts, the full shuffling method results in more seats assigned and two fewer losers.

Thus, packing can optionally include iteratively moving seats associated with one purchaser or with multiple purchasers in order to fill one or more empty seats. Optionally, winning bidders can have their seats moved within a row or across one or more rows or sections in order to fill one or more empty seats. Optionally, a bidder bidding for a seat in a specific row(s) or section(s) can specify that the bidder does not want to be moved into another portion of a row and/or to another section, even if such a move would be necessary in order from the bid to be a winning bid. In such a case, the auction system may optionally designate the bidder's bid as losing in order to fill or pack an empty seat, if such a move is needed or desirable to fill or pack the empty seat. The bidder can optionally be informed of the foregoing possibility.

The auction system may display via a user interface the lowest Winning Bid in each Unit category, certain attributes of the lowest Winning Bid (which may include, without limitation, Unit price, Unit quantity or the time at which the bid was placed), the highest, mean, median or other type of bid in an auction or category, the minimum bid Unit quantity or price needed to be assigned a Unit in a particular category, whether a particular Bidder has a Winning Bid, the category applicable to the Unit assigned to a winning bidder, and other information pertaining to the bid placed by the Bidder (e.g., quantity or price of Units in bid, time of bid, winning/losing status of bid).

The auction system can allow one or more Bidders to submit a Unit description, and Unit price and quantity (e.g., "Seats 20 and 21, in Row 3 of Section 5"), and then allow the Seller to determine whether or not to accept the Bidder's submission. In such a scenario, bids placed by Bidders may be hidden from other Bidders or may be shown to other Bidders so that they can compete with the other Bidders to make their submissions more attractive to the Seller.

An auction can end at a specific pre-determined time (e.g., an actual date and time or an amount of time after the commencement of an auction) or at a time that is based on one or more intervening variables (e.g., five minutes after the final received bid, after the 100th bid is placed, after the first bidder submits a bid for $1,000, or instead at an actual date and time unless a bid is received within several minutes of the end of an auction, in which case, five minutes after the final received bid). Also, the ability to bid on certain Units (or sets of Units) may end at different pre-determined or variable times (e.g., bidders cannot bid on front-row seats after Monday but can bid on second row seats until Wednesday).

The following descriptions and documents are sample embodiments of the auction systems and processes. However, the auction systems and processes are not restricted to the following sample embodiments. Further, the language on the example user interfaces are provided as example guidance to the user, and other language can be used.

Many of the example figures and Web pages that will now be described relate to ticket auctions. However, the same or similar figures and Web pages can be applied to auctions of other types of Units.

Figure 5:
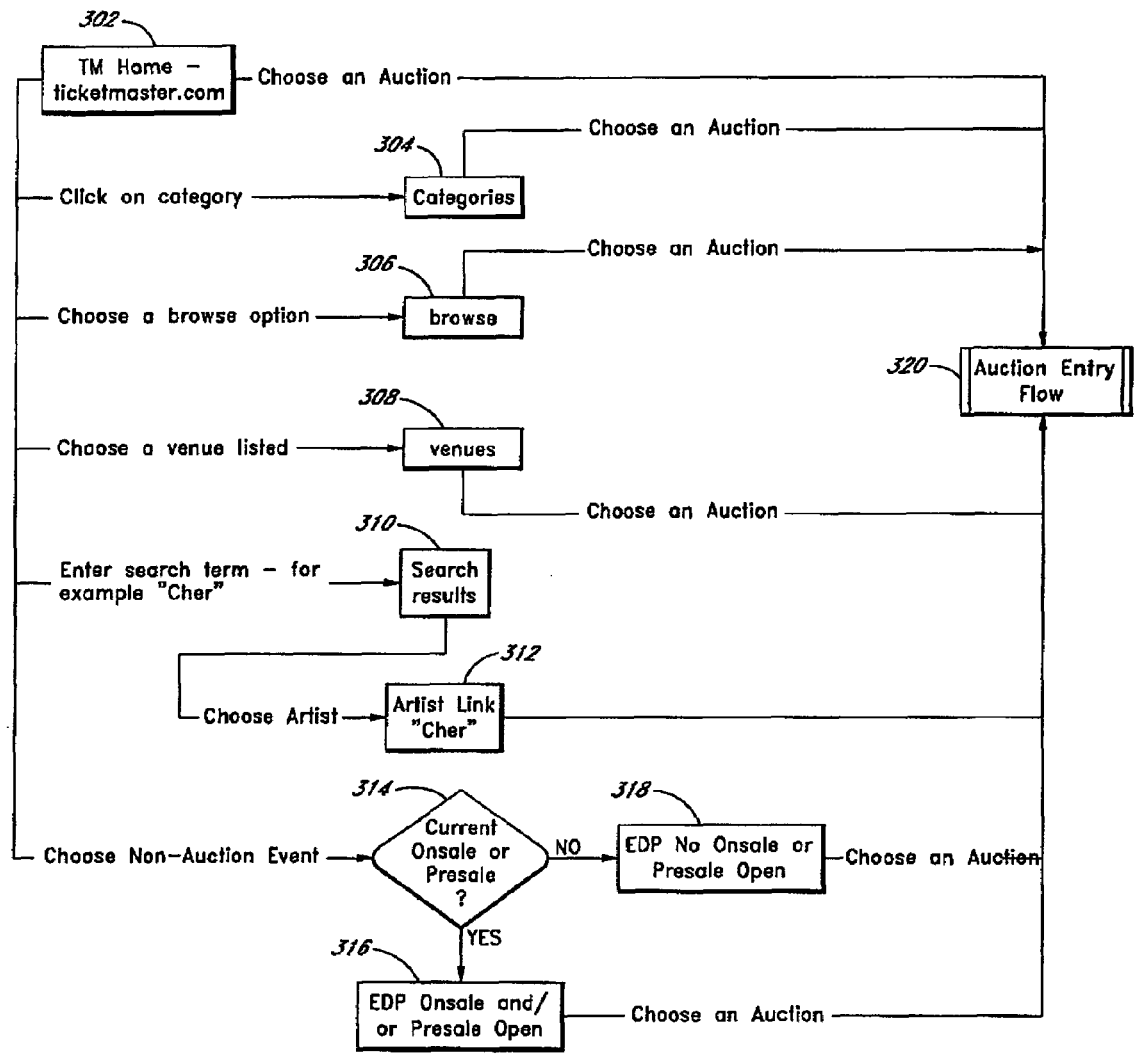

FIGS. 5-6 illustrate example auction site navigation, example navigation naming conventions, and example navigation flows and links. FIG. 5 illustrates an example navigation flow. Beginning at state 302, a user accesses a Web site home page for an entity that offers Unit auctions. In this example, the Units are for event tickets. Several links are provided to other user interfaces, including, for example, a categories Web page, a browse Web page, a venues Web page, a search Web page, a non-auction event Web page, and so on. The various pages can include search fields and links that enable the user to search for or otherwise locate events of interest. Some or all of the fields and information provided on the foregoing linked pages can optionally be provided on the home page or other pages.

If the user clicks on the category link, the process proceeds to state 304, wherein a Web page is presented that displays one or more categories, which can include an auction category, a music category, a sports category, a theater category, and so on. The categories may also be listed on the home page. The user can select a category of interest and is presented with events, including events having auctioned tickets, corresponding to the selected category. If the user selects the auction category, the process proceeds to state 320. If, at state 302, the user selected the browse link, the user is presented with a browse Web page at state 306, which allows the user to browse by city or geographical location, by category, and/or by date, or otherwise. For example, dropdown menus or other data fields can be provided via which the user can select the city, category, and date that the user is interested in, and the auction system locates and displays to the user events, such as events having auctioned tickets, that meet the user's selected criteria.

If, at state 302, the user selected the venue link, the user is presented with one or more venues, optionally within the same city and/or general geographic location as the user. The user can select a venue and is then presented with events, including events having auctioned tickets, which are taking place at the selected venue within a predetermined time period. If, at state 302, the user selected the search link, the user is presented with a search Web page at state 310, which allows the user to search for events using certain key words, including for example, artist name, sports team name, venue name, and so on. If, for example, the user enters an artist name, the process proceeds to state 312, and events (e.g., concerts) by the artist will be presented in the search results. The listed events can include those having auctioned tickets.

If, at state 302, the user selects an event link on the home page that does not have associated auctioned tickets, the process proceeds to state 314. At state 314 a determination is made as to whether there are currently tickets on sale to the general public, or presale tickets being offered to a certain category of people (such as registered users of the auction system or auction system operator). If there are available on sale or presale tickets, the process proceeds to state 316, otherwise, the process proceeds to state 318.

Figure 14:
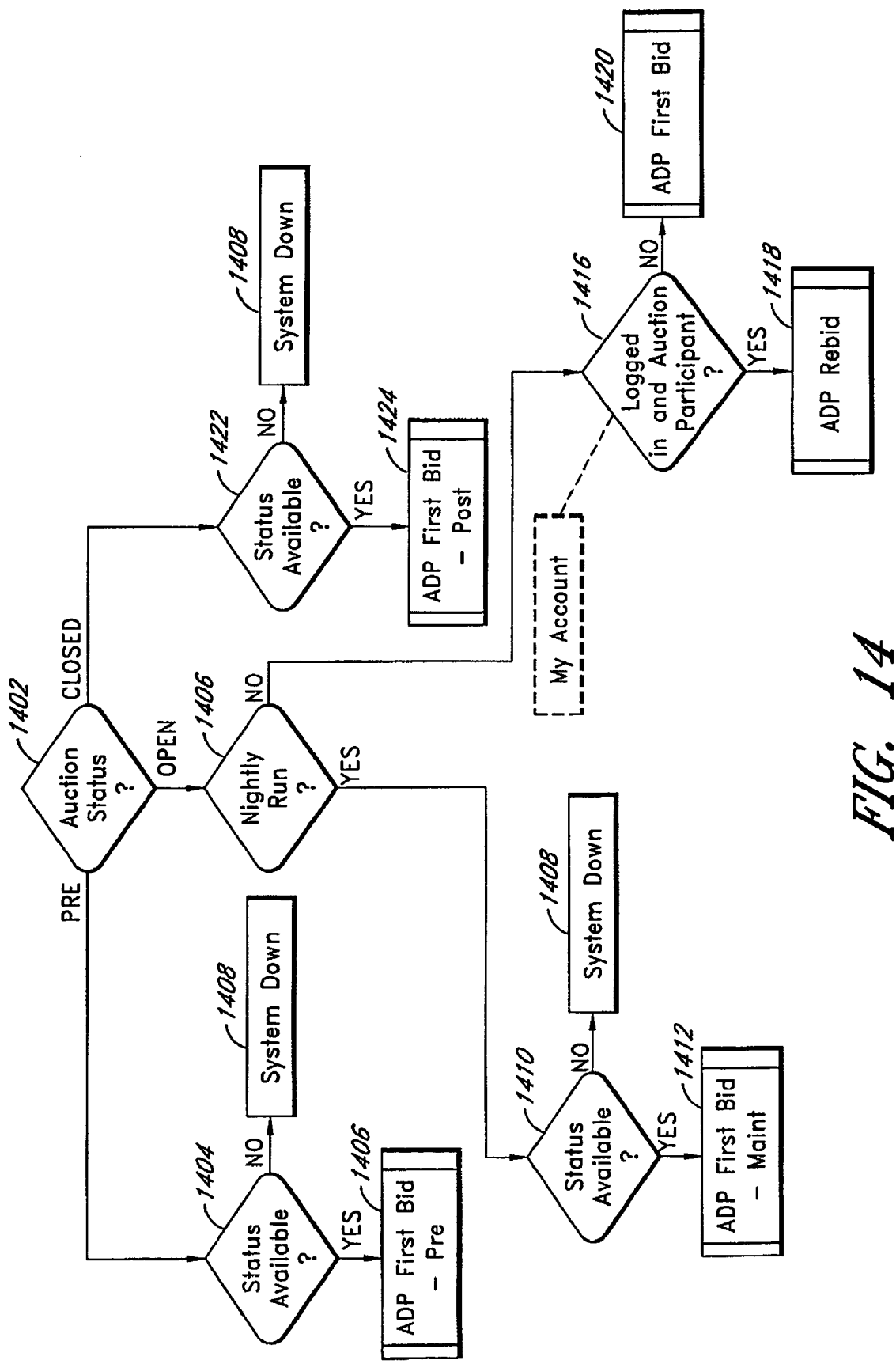
FIG. 14 illustrates an example auction entry process.

If a user selects an auction at the foregoing states, the process proceeds to state 1320, and the auction flow process begins. FIG. 14 illustrates an auction entry process, which will be discussed in greater detail below.

With reference to FIG. 6, a user can navigate from an auction site home page, an event category listing or page, or other user interface having the appropriate links to an appropriate user interface providing event details. The event details user interface can be different depending on the auction state. For example, when activating a link with respect to a Cher concert event during a pre-auction state, the event artist ("Cher") is listed in association with an auction inventory group ("Charity Auction"), an event venue ("STAPLES Center"), an auction start date ("Saturday Aug. 13, 2003" or "Auction Opens Aug. 13, 2003"). By way of further example, when activating a link with respect to a Cher concert event during an auction open state, the event artist ("Cher") is listed in association with an auction inventory group ("Charity Auction"), an event venue ("STAPLES Center"), an auction open status ("Auction Open") and an auction close date ("Aug. 20, 2003"). Optionally, an auction can be identified by auction type (e.g., pay-what-you-bid, uniform pricing, etc.) Optionally, once the auction has closed, the auction will not be listed on one or more user interfaces where it had previously been listed, such as the auction site home page or in the categories listing or page. Optionally, instead, once the auction has closed, the auction will be listed on one or more user interfaces as closed ("Auction Closed Ended Aug. 20, 2003"). Further, if a user accesses, via a link or otherwise, a calendar of events, the auction status is optionally provided more succinctly (e.g., pre-auction status can be in the form of an "auction info" link, auction open status can be in the form of an "auction open" link).

FIG. 14 illustrates an auction entry process. The auction status is checked at state 1402 to determine if the auction is: in a pre-auction state, is open (in process), or has closed. If the auction is in the pre-auction state the process proceeds to state 1404, and a determination is made as to whether further auction status is available. If no further status is available because the system is down or malfunctioning, the process proceeds to state 1408. If additional status is available, the process proceeds to auction detail page (ADP) first bid pre-auction state 1406.

If, at state 1402, a determination is made that the auction is open, the process proceeds to state 1408, wherein a determination is made as to whether a nightly run (e.g., where the auction system is down or has reduced functionality because a system maintenance process is in progress) is in process. If the nightly run is in process, the process proceeds to state 1410, where a determination is made as to whether auction status is available. If no further status is available because the system is down or malfunctioning, the process proceeds to state 1408. If additional status is available, the process proceeds to auction detail page (ADP) first bid state 1412. By way of example, the system may optionally present the user with a notification informing the user that while the auction is still open, bids are currently not being accepted due to system maintenance. The notification may also provide a time or an estimated time at which bids will be accepted again. If, at state 1408, a determination is made that a nightly run is not being conducted, the process proceeds to state 1416, and a determination is made as to whether the user is logged in and is an auction participant (e.g., has already submitted a bid). If the user is already an auction participant, the user proceeds to auction detail page (ADP) rebid state 1418, wherein the user can raise the user's bid and the number of tickets being bid on. If the user is not already an auction participant, the user proceeds to first bid state 1420, wherein the user can submit their first bid in the auction.

If, at state 1402, a determination is made that the auction is open, the process proceeds to state 1422, wherein a determination is made as to whether additional status is available. If no further status is available because the system is down or malfunctioning, the process proceeds to state 1408. If additional status is available, the process proceeds to auction detail page (ADP) first bid post-auction state 1424.

Figure 15B:
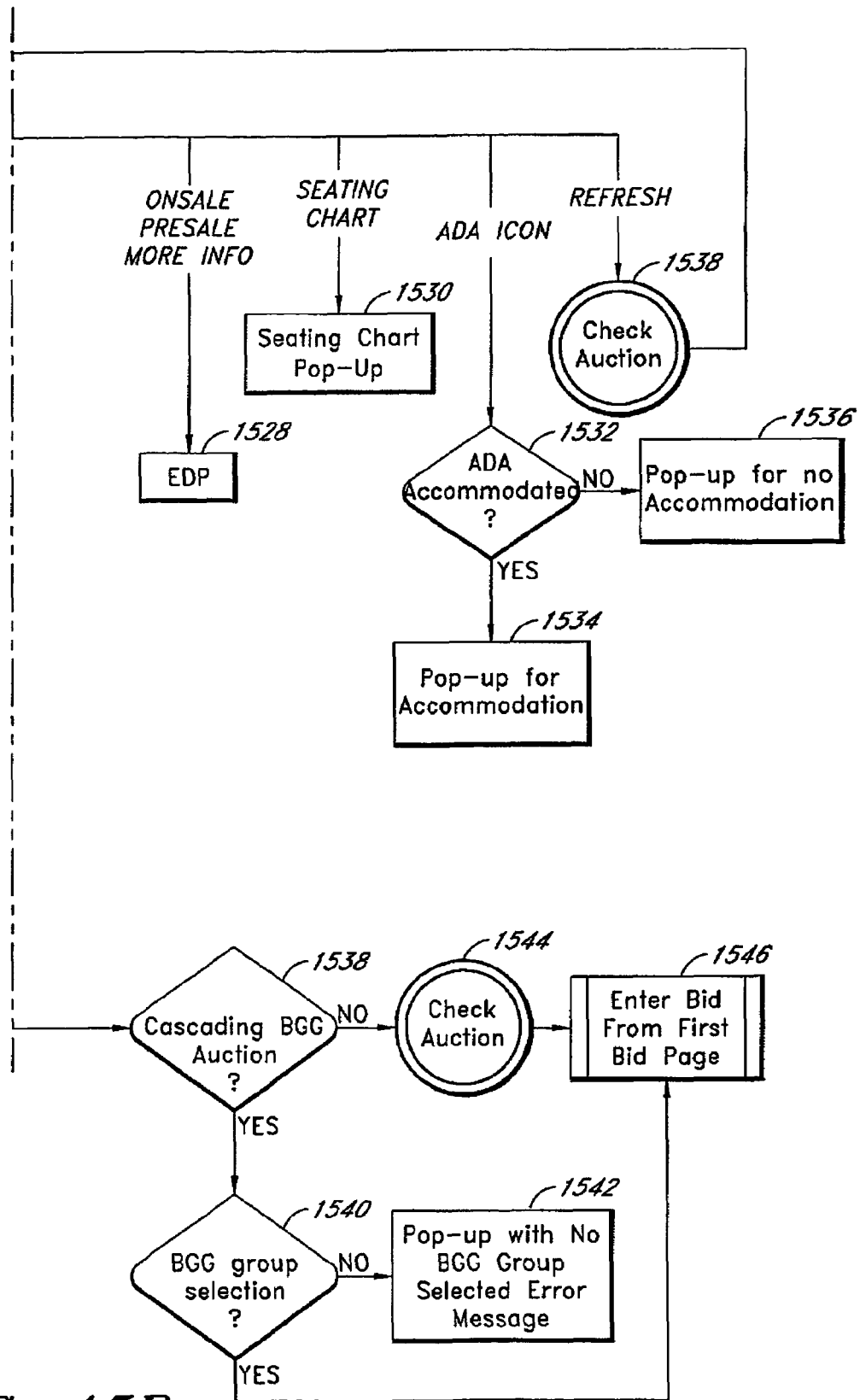
Figure 16:
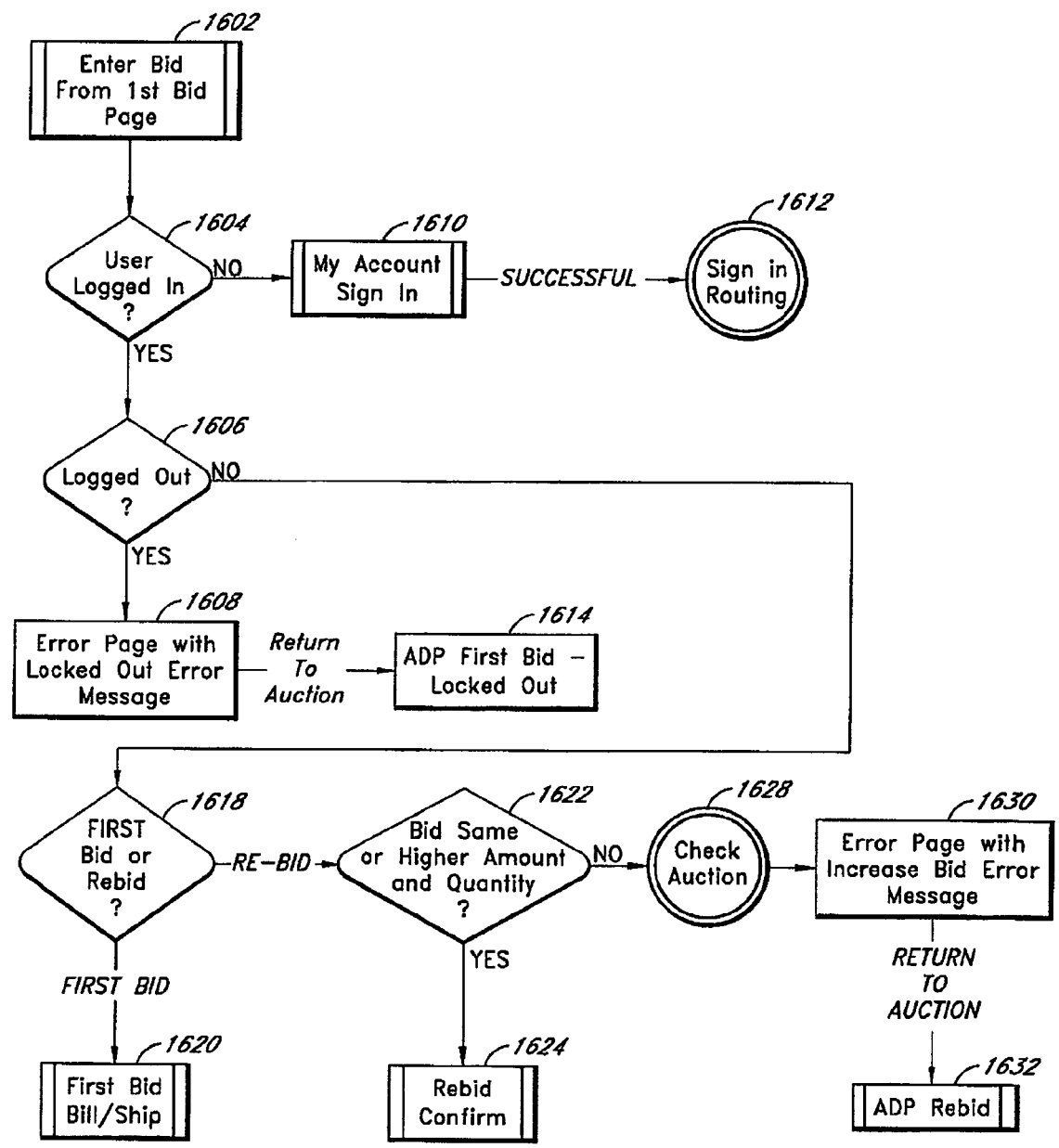
FIG. 16 illustrates an example bid entry process.

FIGS. 15 and 16 illustrate an example first bid processing flow. Referring to FIG. 15, if the user has previously submitted a bid, the process proceeds from initial state 1502 to state 1504, where a determination is made as to whether the user is logged in. If the user has logged in, the process proceeds to state 1506, where the process performs a sign-in routing process. If the user has not logged in yet, the process proceeds from state 1504 to state 1524, where an account sign-in process is performed. Once the sign-in process is successfully completed, the process proceeds to state 1506.

If the first bid process was entered via state 1420 in FIG. 14, and the user indicates (e.g., by selecting a corresponding link and/or by filling in a bid field, or otherwise) that the user is submitting a bid, the process proceeds from state 1502 to state 1508. Optionally, the process does not reach state 1508 if the auction status is pre-auction or post-auction. At state 1508, a determination is made as to whether the user submitted a greater than 0. If the user submitted a 0 or negative bid value, the process proceeds to state 1516 and a bid amount error message is presented informing the user that the bid amount is in error. If the bid is greater than 0, the process proceeds to state 1510, and a determination is made as to whether the user bid was in the correct increment. If the bid was not in the correct increment, the process proceeds from state 1510 to state 1518 and a bid increment error message is presented informing the user that the bid increment is in error.

If the bid increment is correct, the process proceeds to state 1512, and a determination is made as to whether the user bid meets or exceeds the auction bid minimum. If the bid does not meet or exceed the auction bid minimum, the process proceeds from state 1512 to state 1520 and a minimum bid error message is presented informing the user that the bid does not meet the minimum bid requirement. If the bid meets the minimum bid requirement, the process proceeds from state

1512 to state 1514. At state 1514 if the user submitted a 0, negative, or otherwise improper ticket quantity, the process proceeds to state 1522 and a quantity error message is presented informing the user that the requested ticket quantity is in error.

If the ticket quantity is proper, the process proceeds from state 1514 to state 1538. A determination is made as to whether the auction is a cascading BGG (bid guideline group) auction. For example, in a cascading BGG auction different seating sections are optionally divided into different groups. The groups may be ranked. For example, the bid guideline groups may be ranked for from best to worst (e.g., BGG #1=first row; BGG#2=second and third rows; BGG#3=fourth, fifth and sixth row). As discussed elsewhere herein, the auction system can cause the lowest winning bid in each BGG to be displayed or otherwise presented to a user, so that if a user wants to see how much the user has to bid in order to get into the first row (BGG #1 in this example) the information will be available. Optionally, a bidder can be displaced from one BGG into another BGG (for example, a lower ranked BGG) if someone subsequently bids a higher amount then the bidder. If the auction is a cascading BGG auction, the process proceeds to state 1540, where a determination is made as to whether a BGG group is selected by the user, and if so, the process proceeds to state 1546. If, at state 1540, a determination is made that a BGG group is not selected, the process proceeds to state 1542, where a "no BGG group selected" error message is presented. If the auction is not a cascading BGG auction, the process proceeds from state 1538 to state 1544, where a check auction process is run, and then the process proceeds to state 1546, where an enter bid from the bid page process is run.

At state 1502, a user can also access auction help information by clicking on a help link, and the process proceeds to state 1526 where auction help information is presented in a window or otherwise. At state 1502, a user can also select a link in order to be presented with additional on sale and/or presale information at state 1528. At state 1502, a user can select a link in order to be presented with one or more seating charts for the venue at which the event is to take place. At state 1502, a user can also select a link to request a seat or other accommodation for a disabled person. The link can be in the form of an ADA (American with Disabilities Act) ICON. If the user selects such a link, the process proceeds to state 1532, where a determination is made as to whether special accommodations (e.g., access or seats) are available for disabled persons at the venue/event. If such special accommodations are available, the process proceeds to state 1534, wherein a pop-up window or other user interface is provided that includes information regarding the available special accommodations and/or that requests the user to fill in a form regarding the disabled person (which may be the user). If there are no special accommodations for the disabled, the process proceeds to state 1536 and the user is so notified.

The user can also select a refresh button or link at state 1502, and if such a link or button is selected, the process proceeds to state 1538 and the latest available auction status is checked (e.g., current lowest winning bid, number of bids, ticket availability, etc.) and provided to the user.

FIG. 16 illustrates an example "enter bid from first bid page" process which can be used, by way of example, at state 1546 in FIG. 15. At 1602, the bid from the first bid page is entered. At state 1604, a determination is made as to whether the user is logged in. If the user is not logged in, the process proceeds to state 1610, where the user is prompted to sign into their account. If the user signs in successfully, a sign in routing process is performed at state 1612.

If, at state 1604, a determination is made that the user is logged in, the process proceeds to state 1606, where a determination is made as to whether the user is locked out. For example, a user can be locked out if the user has previously engaged in fraud, has violated user terms, uses a software robot to automate bid submissions, or has a credit card that has failed to authorize. If the user is locked out, the process proceeds to state 1608, where a "locked out" error message is selected. The process then proceeds to state 1614, where the "locked out" error message is transmitted for display to the user terminal via an ADP. If, at state 1606, a determination is made that the user is not locked out, the process proceeds to state 1618 where a determination is made as to whether the user bid is a first bid or a rebid. If the bid is a rebid, the process proceeds to from state 1618 to state 1620, where a first bid bill/ship process is performed for a winning bid. For example, the bill/ship process optionally checks credit card expiration dates, authorizations, delivery type selected, whether the user is locked out of purchasing tickets, and so on.

If the bid is a first bid, the process proceeds from state 1618 to state 1622, where a determination is made as to whether the bid is the same as the prior bid, or whether the bid amount and/or quantity is higher than the prior user's bid. If the bid amount and/or quantity is higher, the process proceeds to state 1624, and a rebid confirmation process is performed. Otherwise, the process proceeds from state 1622 to state 1628 where a check auction process is performed, and an error page is presented to the user indicating that the user needs to increase the bid in order to submit a valid rebid. The process then proceeds back to the auction at state 1632 and the user can submit a new rebid.

Figure 17:
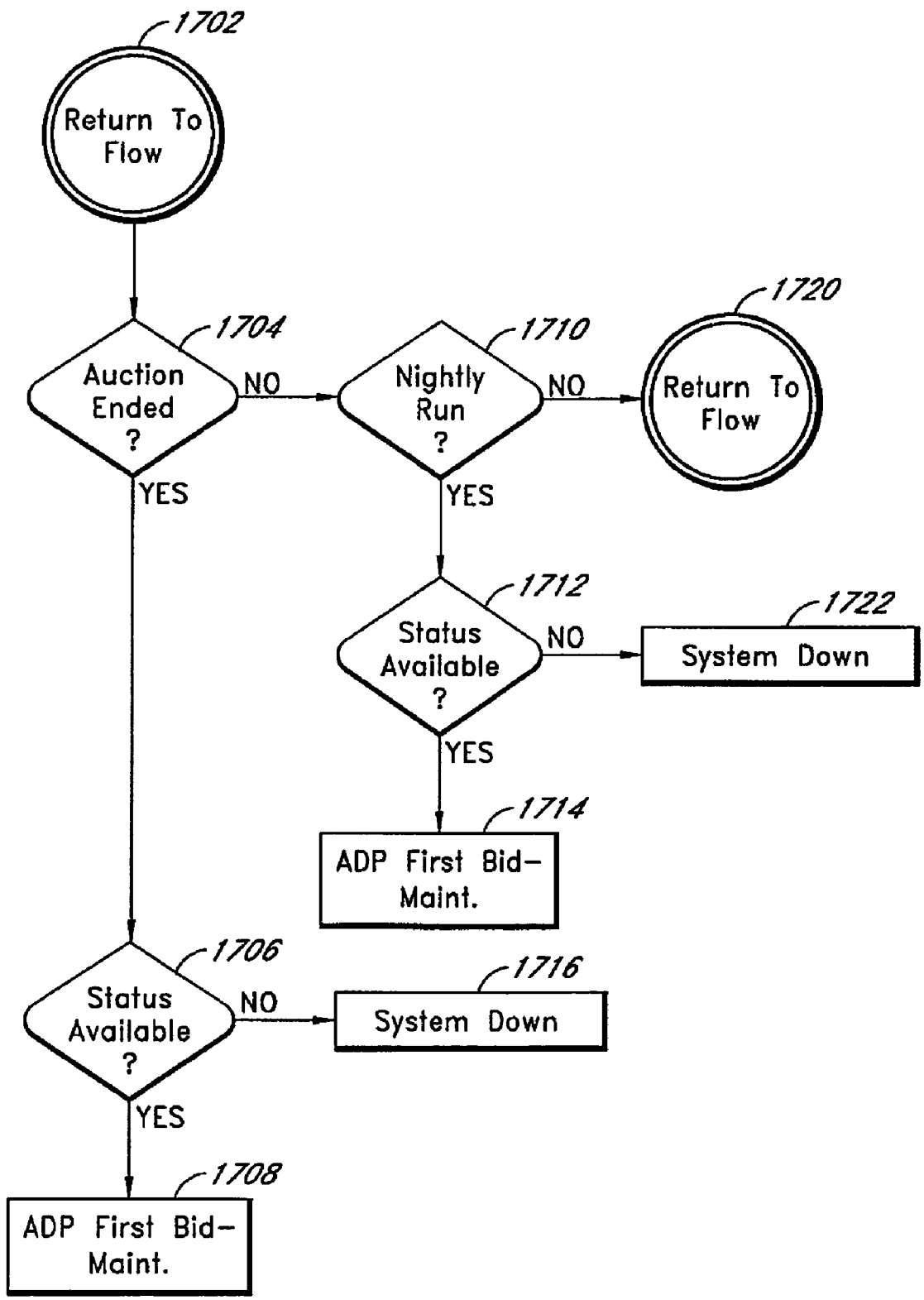
FIG. 17 illustrates an example auction check process.

FIG. 17 illustrates a check auction process, which can be performed, for example at state 1628 illustrated in FIG. 16. The auction check process can be used to determine whether an auction has ended, whether there is auction status available, whether the ticketing system is down, and so on. Proceeding from state 1702 to state 1704, a determination is made as to whether the auction has ended. If the auction has ended, the process proceeds to state 1706 where a determination is made as to whether auction status is available. If status is available, the process proceeds to state 1708, and an ADP first bid maintenance page is presented. If the status is not available, at state 1716 the user is notified that the auction system is down or malfunctioning.

If, at state 1704, a determination is made that the auction has not ended, the process proceeds to state 1710, where a determination is made as to whether a nightly run (e.g., where the auction system is down or has reduced functionality because a system maintenance process is in progress). If a nightly run is in progress, the process proceeds to state 1712, and determination is made as to whether auction status is available. If status is available, the process proceeds to state 1714, and an ADP first bid maintenance page is presented. If the status is not available, at state 1722 the user is notified that the auction system is down or malfunctioning.

Figure 18B:
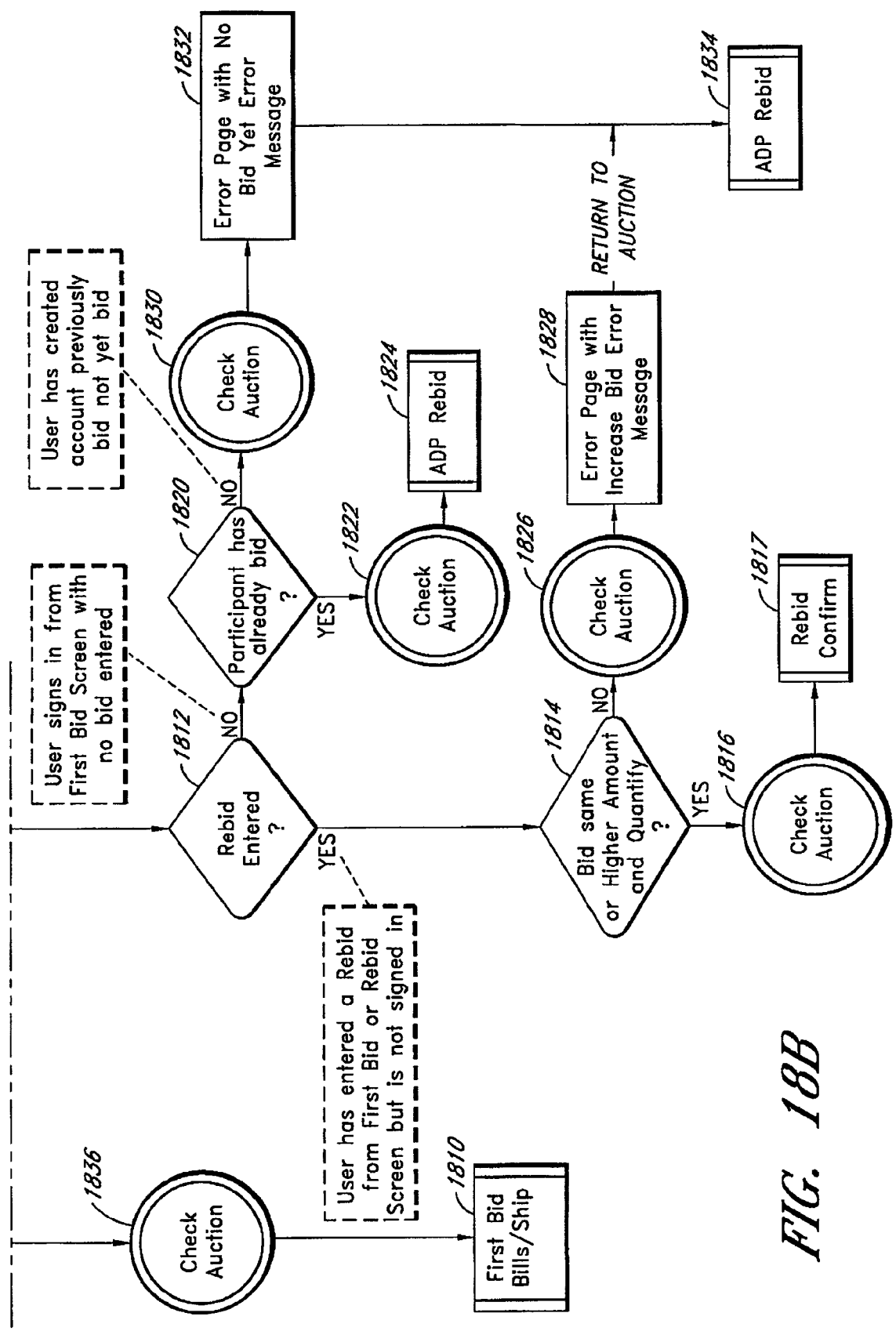

FIGS. 18A-B illustrates an example sign-in routing process which determines if a user is locked out of an auction, whether a bid has been entered, whether a rebid has been entered, whether the bid amount is acceptable, and so on. The process proceeds from state 1802 to state 1804 where a determination is made as to whether the user is locked out of the auction. If the user is locked out, the process proceeds to state 1836, where a check auction process is performed, and a "locked out" error message is displayed at state 1838. An ADP first bid—locked out page is then displayed at state 1840.

If the user is not locked out of the auction, the process proceeds to state 1806 where a determination is made as to whether the first bid is entered, wherein the user has entered a bid into a bid field. If the first bid has been entered, the process proceeds to state 1808 and a check auction process is performed. At state 1810, a first bid bill/ship process is performed.

If the first bid has not been entered, the process proceeds from state 1806 to state 1812, and a determination is made as to whether a rebid has been entered. If a rebid has been entered, the process proceeds to state 1814, where a determination is made as to whether the bid is the same as the prior bid, or whether the bid amount and/or quantity is higher than the prior user's bid. If the bid is higher, the process proceeds to state 1816, where a check auction process is performed, and a rebid confirmation process is performed at state 1817. If, at state 1814, a determination is made that the bid amount and/or quantity is not higher than the prior user's bid, the process proceeds to state 1826, where a check auction process is performed, an error message is presented at state 1828, informing the user of the need to increase the bid, and the user is then returned to the auction at state 1834.

If, at state 1812, a determination is made that the user has not entered a rebid, the process proceeds to state 1820. At state 1820, a determination is made as to whether the user has already entered a bid, and if the user has, the process proceeds to state 1822. At state 1822, a check auction process is performed, and then a rebid process is performed at state 1824. If a determination is made that the user has not already entered a bid, the process proceeds from state 1820 to state 1830, where an auction check process is run. The process then proceeds to state 1832, and an error message is presented informing the user the no bid has been entered by the user. The process then proceeds from state 1832 to state 1834.

Figure 19:
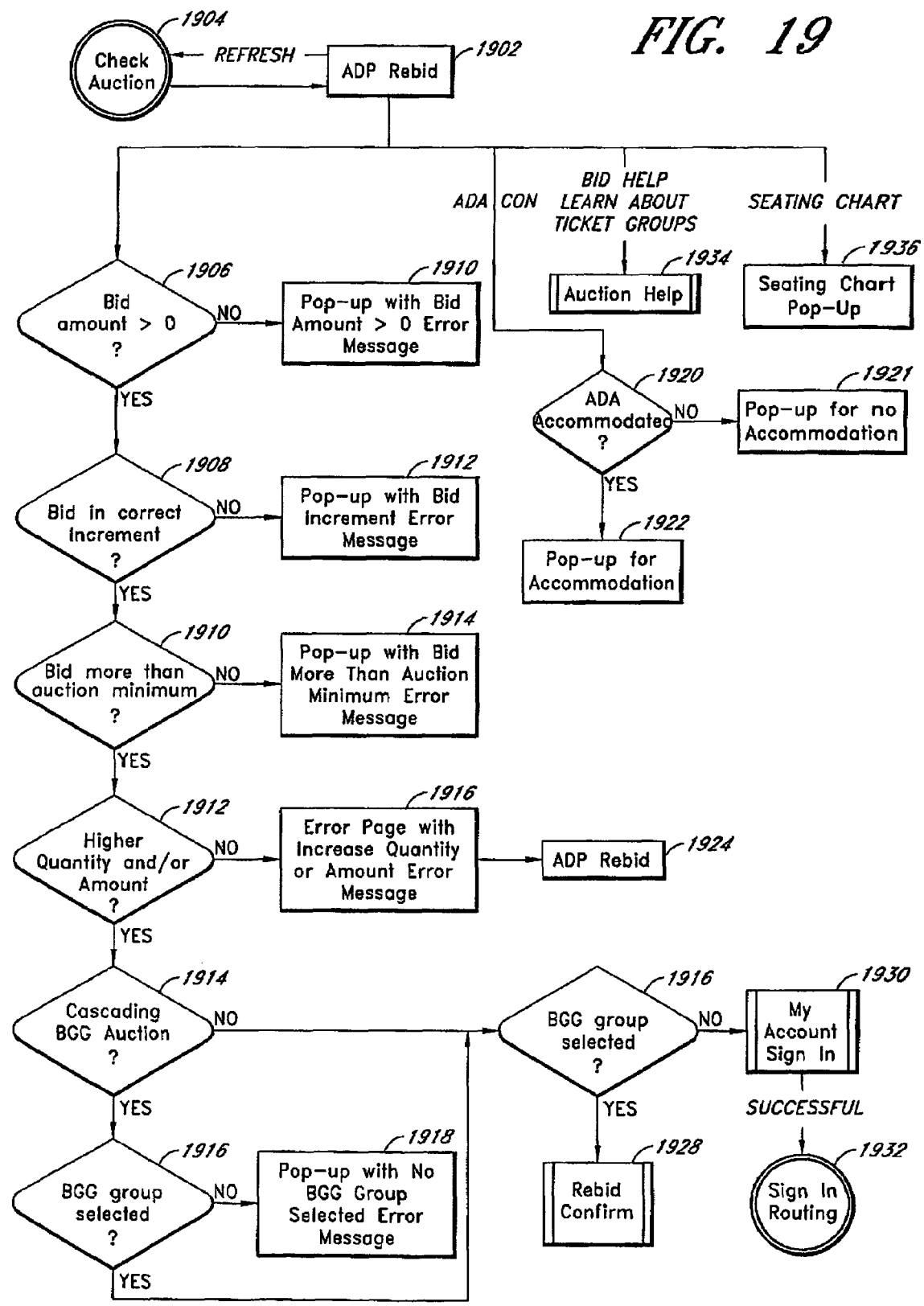
FIG. 19 illustrates an example rebid process.

FIG. 19 illustrates an example ADP rebid process which can optionally be used to perform the ADP rebid process illustrated in other flow diagrams herein. For example, the amount of the bid is inspected to determine whether it is greater than zero and greater than the auction minimum, that the bid increment is in keeping with the auction rules, and/or that the bidder has bid on at least the minimum number of tickets specified for the auction. In addition, a determination is made as to whether the user selected or specified the ticket group being bid for. The process also optionally provides the user with a seating chart in response to a user request or independently. In particular, at state 1902, the user can request a refresh of the ADP information, and the process proceeds to state 1904, where a check auction process is performed and the updated auction information (e.g., the current low "winning" bid for the relevant ticket groups, the minimum acceptable bid, etc.) is presented to the user via an ADP. The refresh function may optionally not function or be available during certain system maintenance operations.

If, at state 1902, if the user has entered a rebid, the process proceeds to state 1906. At state 1906 a determination is made as to whether the user submitted a greater than 0. If the user submitted a 0 or negative bid value, the process proceeds to state 1910 and a bid amount error message is presented informing the user that the bid amount is in error. If the bid is greater than 0, the process proceeds to state 1908, and a determination is made as to whether the user bid was in the correct increment. If the bid was not in the correct increment, the process proceeds from state 1908 to state 1912 and a bid increment error message is presented informing the user that the bid increment is in error.

If the bid increment is correct, the process proceeds to state 1910, and a determination is made as to whether the user bid meets or exceeds the auction bid minimum. If the bid does not meet or exceed the auction bid minimum, the process proceeds from state 1910 to state 1914 and a minimum bid error message is presented informing the user that the bid does not meet the minimum bid requirement. If the bid meets the minimum bid requirement, the process proceeds from state 1910 to state 1912. At state 1912, a determination is made as to whether the rebid is for a quantity or bid amount that is higher than the user's previous bid, and if not, the process proceeds to state 1916 and a quantity or amount error message is presented informing the user that the bid amount or ticket quantity is in error.

If the bid amount and/or ticket quantity are proper, the process proceeds from state 1912 to state 1914. A determination is made as to whether the auction is a cascading BGG (bid guideline group) auction. If the auction is a cascading BGG auction, the process proceeds to state 1916, where a determination is made as to whether a BGG group is selected, and if so, the process proceeds to state 1926. If, at state 1916, a determination is made that a BGG group is not selected, the process proceeds to state 1918, where a "no BGG group selected" error message is presented.

If the auction is not a cascading BGG auction, the process proceeds from state 1914 to state 1926, where a check auction process is run, and then the process proceeds to state 1926, and a determination is made as to whether the user is logged in. If the user is logged in the process proceeds from state 1926 to 1928. If the user is not logged in, the process proceeds from state 1926 to state 1930, a sign in process is performed, and the process proceeds to state 1932 and a sign in routing process is performed.

At state 1902, a user can also access auction help information by activating a help link, and the process proceeds to state 1934 where auction help information is presented in a new window or otherwise. At state 1902, a user can also select a link to request a seat or other accommodation for a disabled person. The link can be in the form of an ADA (American with Disabilities Act) icon. If the user selects such a link, the process proceeds to state 1920, where a determination is made as to whether special accommodations (e.g., access or seats) are available for disabled persons at the venue/event. If such special accommodations are available, the process proceeds to state 1922, wherein a pop-up window or other user interface is provided that includes information regarding the available special accommodations and/or that requests the user to fill in a form regarding the disabled person (which may be the user). If there are no special accommodations for the disabled, the process proceeds to state 1921 and the user is so notified. A user can select a link at state 1902 in order to be presented with one or more seating charts at state 1936 for the venue at which the event is to take place.

Figure 20:
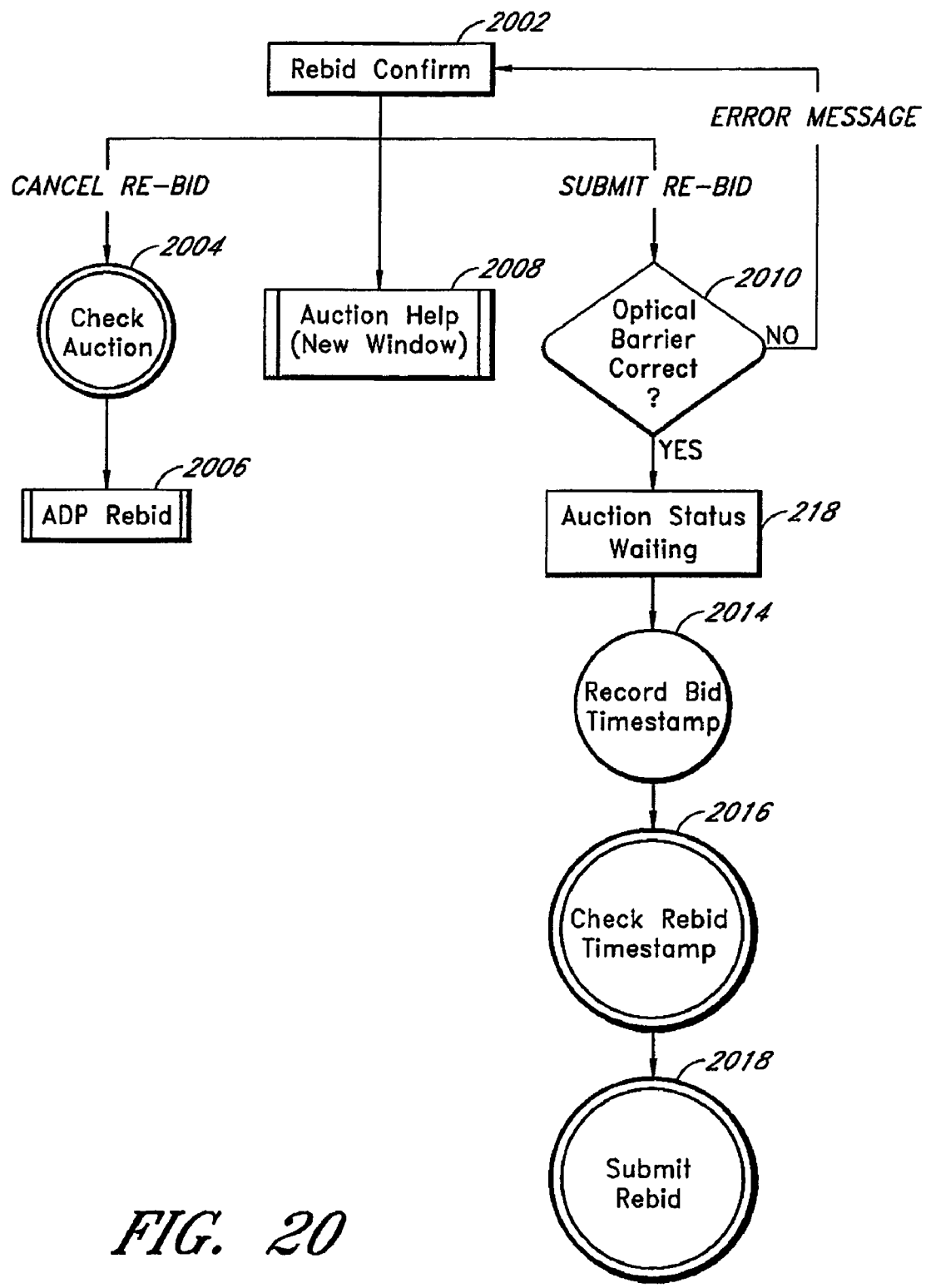
FIG. 20 illustrates an example rebid confirmation process.

FIG. 20 illustrates an example rebid confirmation process, such as can be optionally used at state 1928 in FIG. 19. The user can be asked to select between canceling the rebid and approving the submission of the rebid. If the user selects a cancel rebid link or button, the process proceeds to state 2004, a check option process is performed, and the process then proceeds to state 2006. If the user selects a submit rebid link or button, the process proceeds to state 2010. A random or selected word may be displayed to the user, optionally, in a visually distorted form. The user may be requested to type the displayed word into a field within a specified time in order to confirm the rebid. This procedure, sometimes referred to as an optical barrier, helps prevent the use of automated software robots from automatically submitting a rebid, which could be unfair to other bidders. If the user fails to correctly enter the word within the predetermined time, the process proceeds back to state 2002, otherwise, the process proceeds to state 2012.

At state 2012, auction waiting status is presented to the user. At state 2014 a timestamp associated with the rebid is recorded in a system database. At state 2016, a check rebid timestamp process is performed, wherein the timestamp is checked to make sure that the bid was received within the allowed period, such as before the auction close or other specified time. If the bid is not received in time, an error message is presented to the user and the user can be returned to a post-auction ADP. At state 2018, a submit rebid process is performed. The user can also access auction help information via state 2008.

Figure 21:
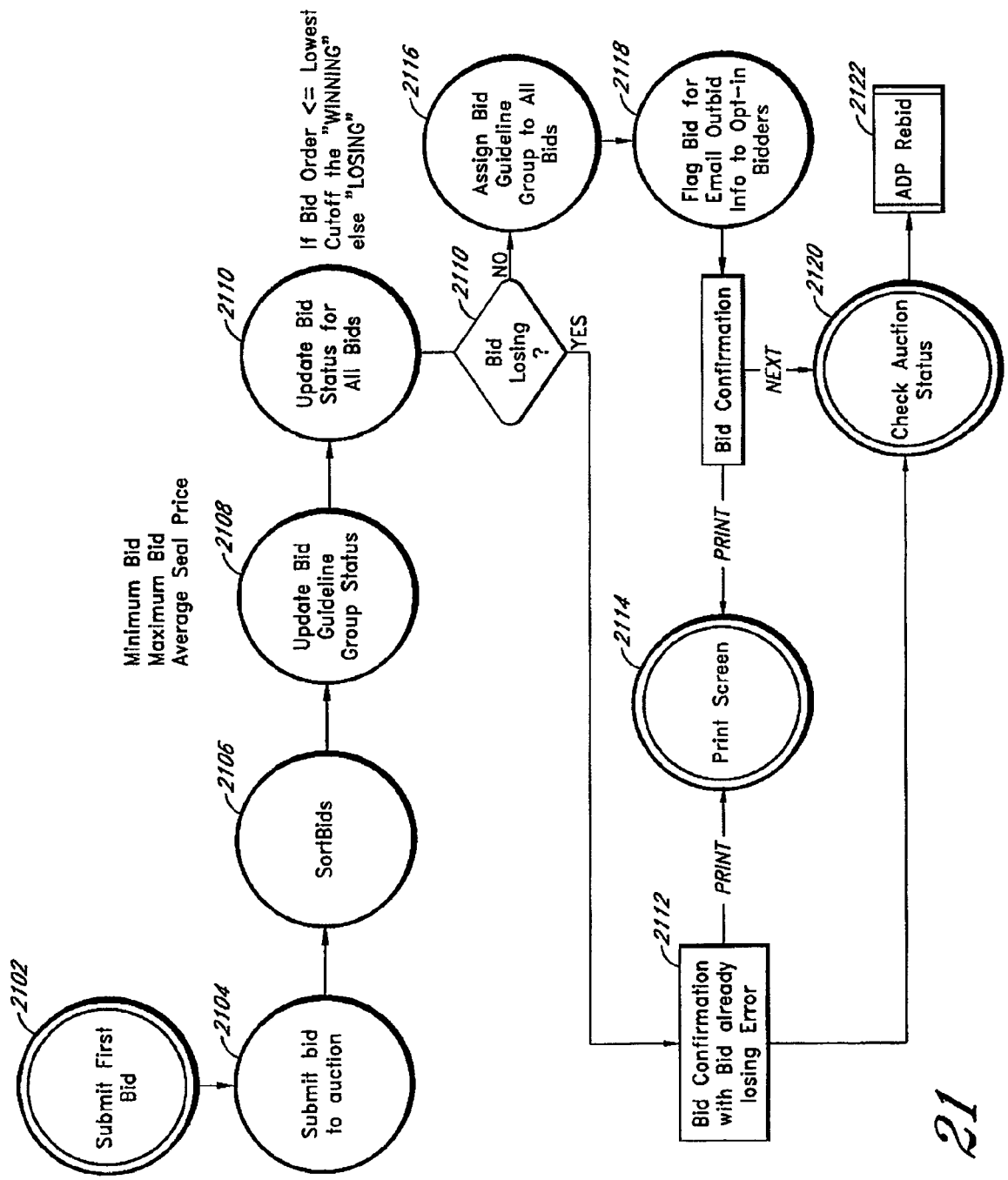
FIG. 21 illustrates an example processing of a first bid.

FIG. 21 illustrates an example processing of a first bid. The bids are resorted as a new bid is placed, the ticket group minimum bid, maximum bid, and average seat prices are determined, and the bid status for some or all of the bids is updated to determine which bids are currently "winning" bids, and which bids are currently "losing bids." The ticket group minimum bid, maximum bid, and/or average seat price are optionally displayed on a corresponding auction Web page, emailed, or otherwise communicated to bidders. As discussed herein, the bid status can change as new bids are received and/or as old bids are invalidated. If the new bid is a "winning" bid, then those preexisting bids whose status has changed to "losing" bids will be automatically increased where the corresponding bidders have previously indicated that they want to automatically have their bid increased by a certain amount or level and/or to a certain amount or level if their status has changed to ensure they have a winning bid. These bidders may be sent an email or other communication notifying them of the bid increase. If one or more "losing" bidders did not indicate that they wanted to have their bids automatically increased, then those losing bidders are optionally informed via email, instant messaging, or the like, of the change of status, and are optionally provided the option to manually increase their bid.

Referring to FIG. 21, beginning at state 2102, the process proceeds to state 2104, and the system submits the user's bid to the auction. The bids are then sorted at state 2106. For example, the bids can optionally be ordered in ascending (or descending if desired) order according to the bid amount. If two bids are received for the same amount, the bids can further be ordered based on other criteria, such as time of the bids, the numbers of tickets, and so on. For example, if two bids for the same amount are received at different times, the first received bid can be sorted so as to be before the later bid. The process then proceeds to state 2108, and the bid guidelines group status is updated (e.g., minimum winning bid, maximum bid, average winning bid, or the like).

At state 2110, the bid statuses for outstanding bids are updated. For example, some bids that were designated as winning may now be designated as losing. In an optional implementation, if the bid order of a given bid is less than or equal to the lowest cutoff, then the bid is designated as winning, otherwise the bid is designated as losing. At state 2110, a determination is made as to whether the bid is a losing bid. If the bid is a losing bid, the process proceeds to state 2112, and a bid receiving confirmation notice is provided to the user, in addition to a notice that the bid is a losing bid. At state 2120, a check auction status is performed, and at state 2122, a rebid process is performed. If the user requests a printed version of the notice, the notice is provided at state 2112. Then at state 2114 a print screen process is performed, enabling the user to print the notice.

If, at state 2110, a determination is made that the bid is not a losing bid, the process proceeds to state 2216, and a bid guideline group is associated with the current non-losing bids. At state 2118, if the new bid is a "winning" bid, than those preexisting bids whose status has changed to "losing" bids will be automatically increased where the corresponding bidders have previously indicated that they want to automatically have their bid increased by a certain amount or level and/or to a certain amount or level if their status has changed to ensure they have a winning bid. These bidders may be sent an email or other communication notifying them of the bid increase. A bid confirmation is provided to the user, and the process proceeds to state 2114 if the user asked for a print out of the confirmation notification.

Figure 22:
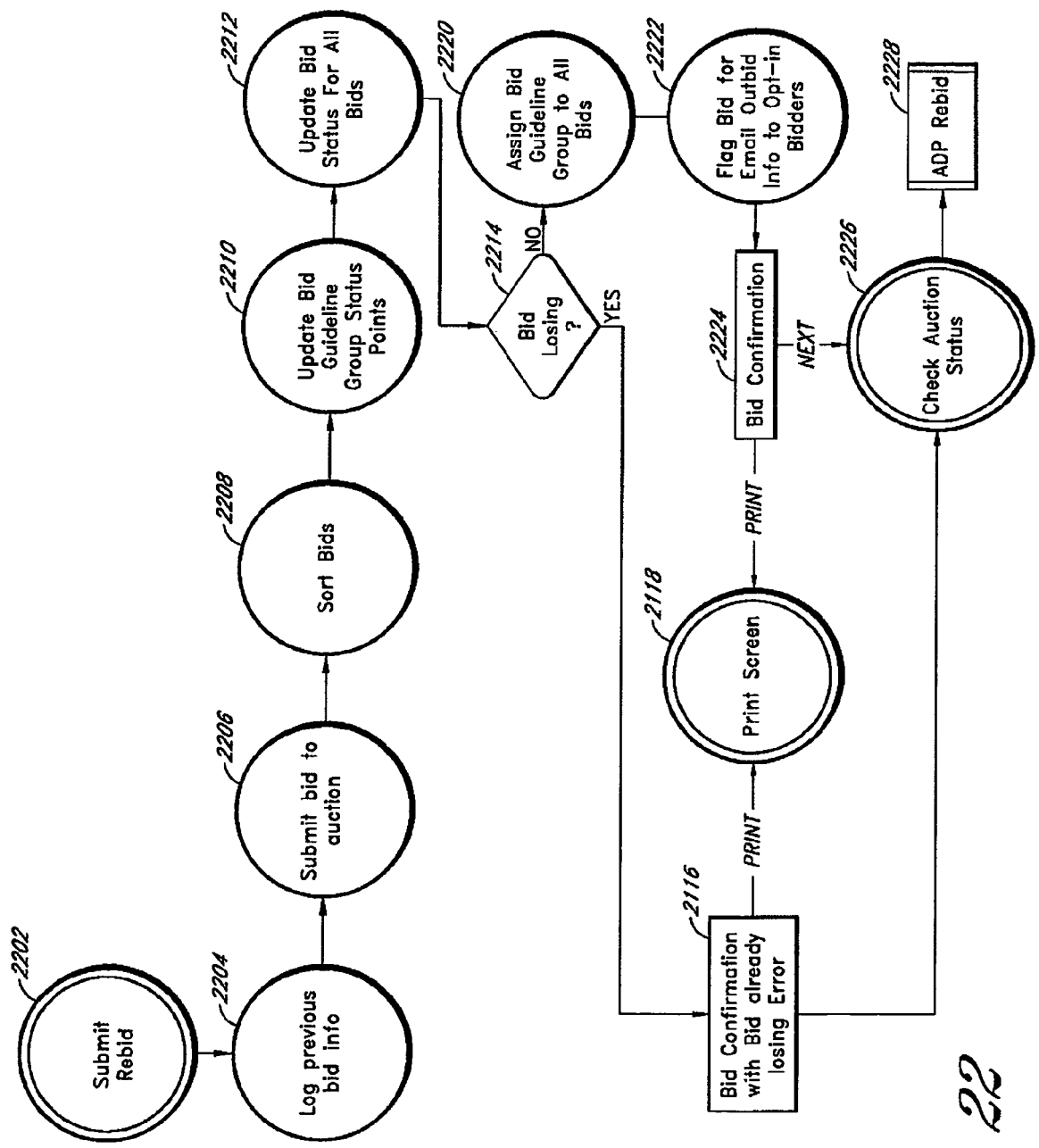
FIG. 22 illustrates an example processing of a rebid.

FIG. 22 illustrates an example rebid process that can be used as appropriate with other processes described herein. The example process retrieves previous bid information, submits the bid to the auction, determines the ticket group minimum bid, maximum bid, and average seat price, and updates the bid status for some or all of the bids to determine which bids are currently "winning" bids, and which bids are currently "losing bids." The ticket group minimum bid, maximum bid, and/or average seat price are optionally displayed on a corresponding auction Web page, emailed, or otherwise communicated to bidders. As discussed herein, the bid status can change as new bids are received and/or as old bids are invalidated. If the new bid is a "winning" bid, than those preexisting bids whose status has changed to "losing" bids will be automatically increased where the corresponding bidders have previously indicated that they want to automatically have their bid increased by a certain amount or level and/or to a certain amount or level if their status has changed to ensure they have a winning bid. These bidders may be sent an email or other communication notifying them of the bid increase. If one or more "losing" bidders did not indicate that they wanted to have their bids automatically increased, then those losing bidders are optionally informed via email, instant messaging, or the like, of the change of status, and are optionally provided the option to manually increase their bid.

Referring to FIG. 22, beginning at state 2202, the process proceeds to state 2204, and the user's previous bid information is retrieved. At state 2206, the system submits the user's bid to the auction. The bids are then sorted at state 2208. For example, the bids can optionally be ordered in ascending (or descending) order according to the bid amount. If two bids are received for the same amount, the bids can further be ordered based on other criteria, such as time of the bids, the numbers of tickets, and so on, as similarly described with respect to FIG. 21. The sorted bids can be used to determine which bids are currently winning bids and which bids are currently losing bids.

The process then proceeds to state 2210, and the bid guidelines group status is updated (e.g., minimum winning bid, maximum bid, average winning bid, or the like). At state 2212, the bid status for outstanding bids are updated. For example, some bids that were designated as winning may now be designated as losing. In an optional implementation, if the bid order of a given bid is less than or equal to the lowest cutoff, then the bid is designated as winning, otherwise the bid is designated as losing. At state 2214, a determination is made as to whether the bid is a losing bid. If the bid is a losing bid, the process proceeds to state 2216, and a bid confirmation notice is provided to the user, in addition to a notice that the bid is a losing bid. At state 2226, a check auction status is performed, and at state 2228 a rebid process is performed. If the user requests a printed version of the notice provided at state 2216, then at state 2218 a print screen process is performed, enabling the user to print the notice.

If, at state 2214, a determination is made that the bid is not a losing bid, the process proceeds to state 2220, and a bid guideline group is associated with the current non-losing bids. At state 2222, bids are flagged to indicate that those preexisting bids whose status has changed to "losing" bids, and whose bids will be automatically increased if the corresponding bidders have previously indicated that they want to automatically have their bid increased by a certain amount or level and/or to a certain amount or level if their status has changed to ensure they have a winning bid, will be sent an email or other communication notifying them of the bid increase. A bid confirmation is provided to the user at state 2224, and the process proceeds to state 2218 if the user requested a print out of the confirmation notification (e.g., by activating a print button or link).

Figure 23:
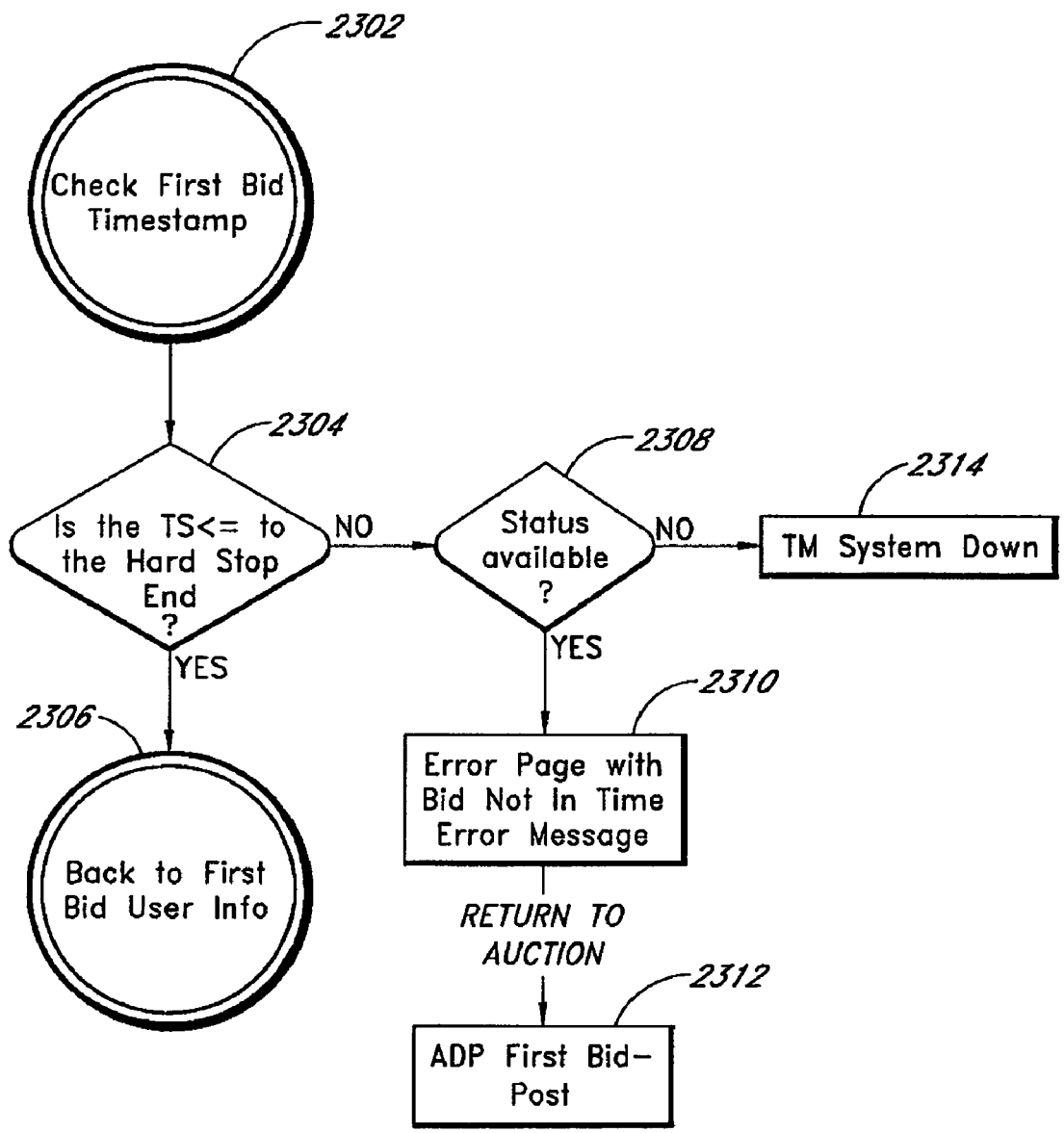
FIG. 23 illustrates an example check timestamp process.

FIG. 23 illustrates an example timestamp check process that can be optionally used to check a first bid or a rebid by a user in an auction. Beginning at state 2302, the process proceeds to state 2304 where a timestamp associated with a bid is compared with an auction stop time. If the timestamp indicated that the bid was received before or up to the auction close, the process proceeds to state 2306, and returns to a first bid (or rebid as appropriate) user info state, and further processing of the bid is performed. If, at state 2304, a determination is made that the bid was received outside of an allowed period of time (e.g., after the auction stop date and time), the process proceeds to state 2308. At state 2308, a determination is made as to whether auction status information is available, and if not, the process proceeds to state 2314, where an "auction system is down" (e.g., not sufficiently operational to accept or process bids) process can be performed. If auction status is available, the process proceeds to state 2310, and an error page is transmitted to the user terminal informing the user that the bid was not placed in time, and at state 2312, the process causes an ADP post-auction page (e.g., first bid or rebid) to be displayed to the user.

Figure 24:
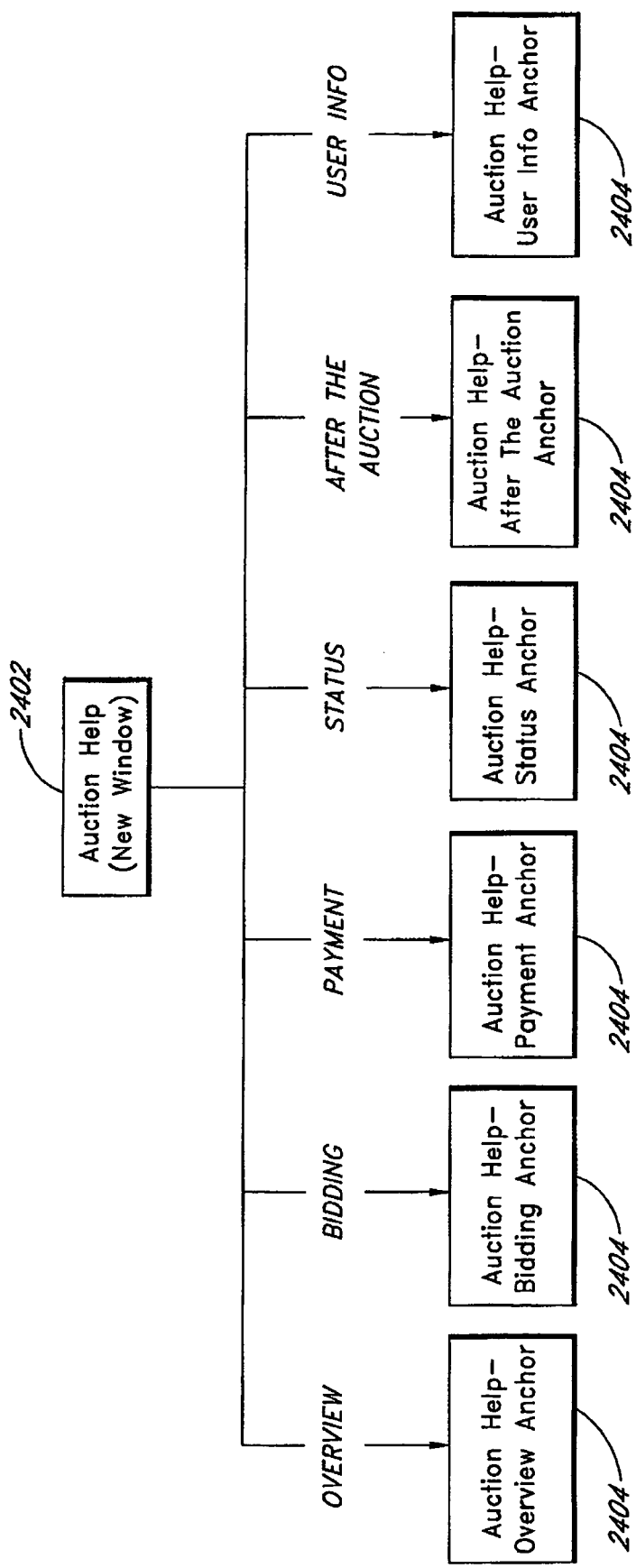
FIG. 24 illustrates an example help process.

FIG. 24 illustrates an example help flow. When a user activates a help link or button, the auction locates and retrieves from an auction system data store appropriate help data to be transmitted for display to the user terminal. The help links can be displayed at the same time on a help page, or can be individually displayed on one or more appropriate user interfaces. For example, if at state 2402 the user activates a link for help with respect to an overview of the auctions, an overview help page is displayed to the user at state 2404 providing an overview of the auction. The overview help page optionally includes links to additional help pages. Similarly, the other help pages about to be described optionally include links to still additional help pages that can offer more extensive or detailed help. If, at state 2402, the user activates a link for help with respect to auction bidding, an auction bidding help page is displayed to the user at state 2406 providing a description of the auction bidding process. Similarly, upon activation of a payment help link, at state 2408 an auction payment help page is displayed. Upon activation of a status help link, at state 2410 an auction status help page is displayed. Upon activation of an "after the auction" help link, at state 2412 an after auction help page is displayed. Similarly, upon activation of a user info link, at state 2414 a user info help page is displayed.

Figure 24A:
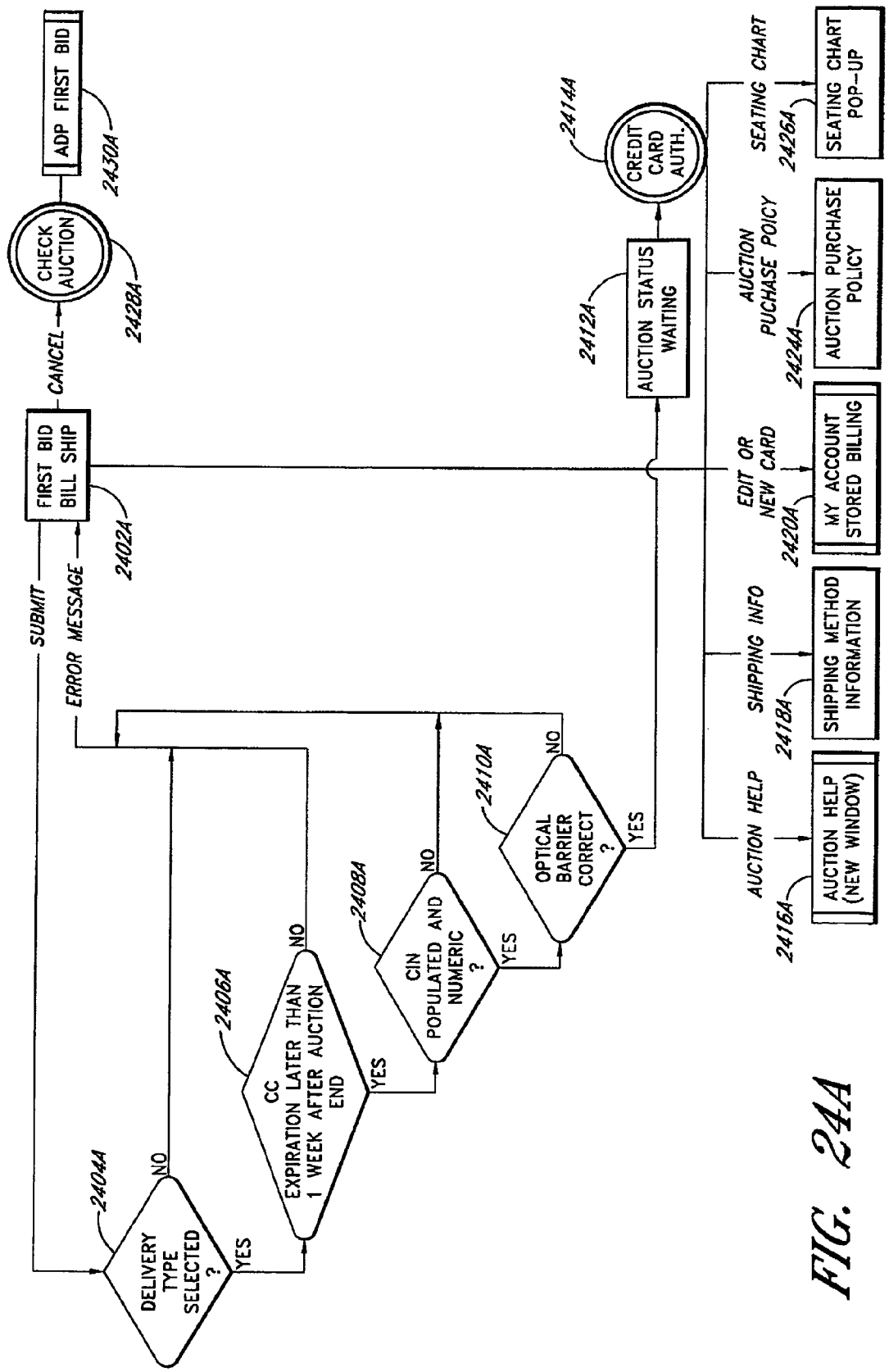
FIG. 24A illustrates an example billing and shipping process.

FIG. 24A illustrates an example bill and ship process which can be used for a first bid submission or similarly with a rebid submission. Beginning at start 2402A the process proceeds to state 2404A, where a determination is made as to whether the user has selected a delivery type. If the bidder has selected a delivery type, a determination is made as to whether the credit card being used to pay for tickets being bid on has an acceptable expiration date (e.g., an expiration date more than one week after the auction end, although other criteria can be used as well). If the expiration date is acceptable, the process proceeds to state 2408A wherein a determination is made that a credit card identifier (CIN) is entered and numeric. At state 2410A, a determination is made as to whether the optical barrier entry is correct. If the optical barrier entry is correct, the process proceeds to state 2412A and an auction status waiting page is displayed to the bidder. At state 2414A a credit card authorization process is performed. If, the delivery type was not selected, if the credit card expiration date is unacceptable, if the CIN is not correctly populated, or if the optical barrier entry is not correct, a corresponding error message is transmitted to the bidder. If the bidder provides a cancel instruction, the process proceeds to state 2428A, where a check auction process is performed, and the auction status is provided to the bidder if an ADP first bid page.

Figure 25B:
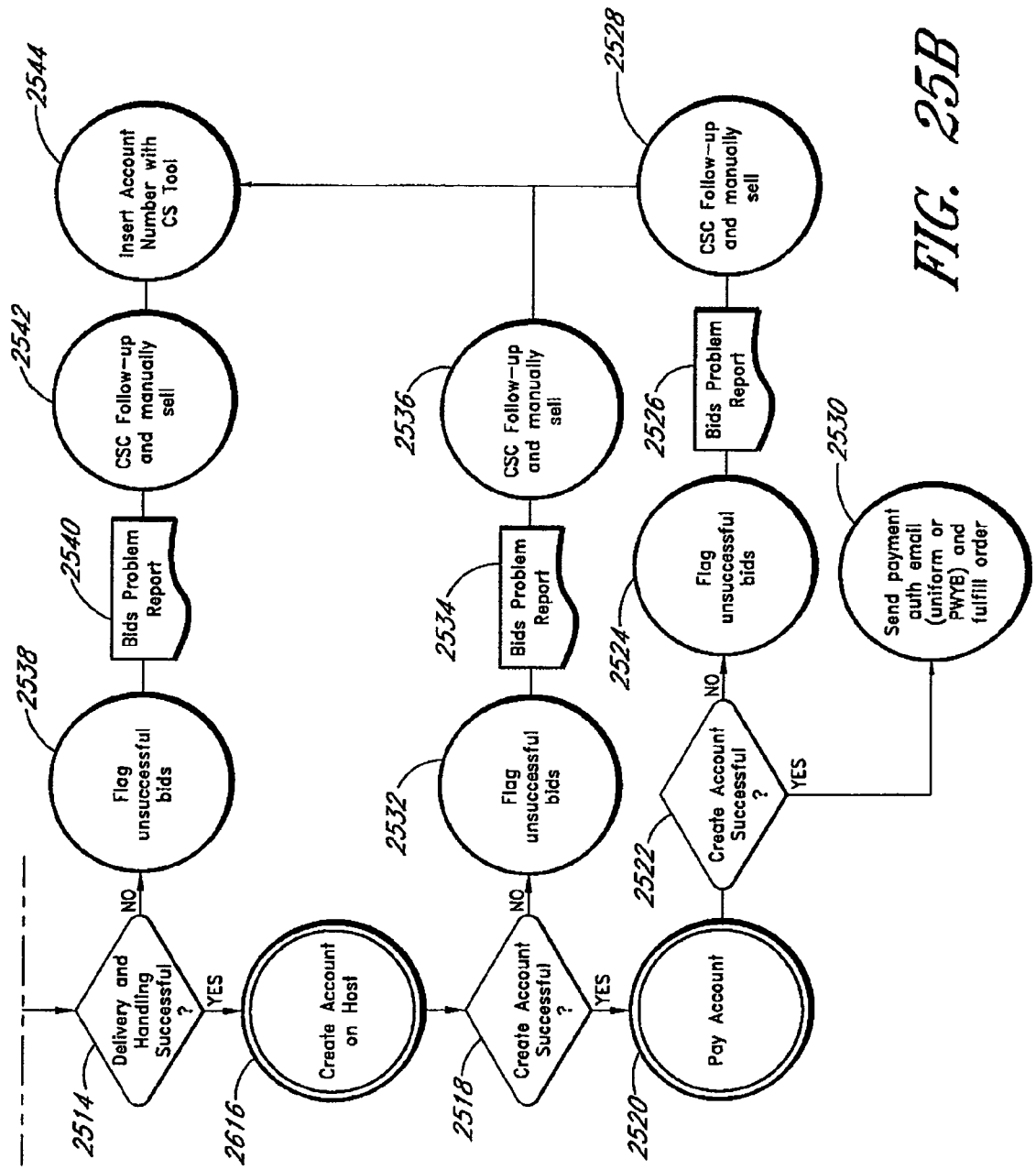

FIGS. 25A-B illustrates an example batch processing of a plurality of winning bids for event seats. Beginning at state 2502, winning bids are submitted by the auction system to batch processing software executing on the auction system. At state 2504, winning bids are assigned reserved seats (assuming the auction is a reserved seat auction, as opposed to a general admission/festival seating auction). At state 2506, a determination is made as to whether the seat reservation was successfully performed (e.g., each winning bid is associated with a reserved seat). If the seat reservation was successfully performed, the process proceeds to a delivery and handling process at state 2508, where the tickets are delivered to the winning bidders (e.g., by email, via an HTML page, by regular mail, by expedited delivery, etc.). At state 2514, a determination is made as to whether the delivery and handling process was successfully completed. If the delivery and handling process was successfully completed, the process proceeds to a create account process 2516 that is an event specific account (optionally in addition to a general account with the auction system. At state 2518, a determination is made as to whether the create account process was successfully completed. If the create account process was successfully completed, the process proceeds to state 2520, and a pay account process is performed. At state 2522, a determination is made as to whether the pay account process was successfully completed. If it was successful, the process proceeds to state 2530, and a send payment authorization email (or other form of selected communication) is sent and the order is fulfilled.

If, at state 2506, a determination is made that the reservation process was not successfully performed, the process proceeds to state 2510, and those bids that were not successfully associated with a reserved seat are flagged, a bid problem report is generated at state 2512 listing the problem bids and identifying the problem, and at state 2514, a customer service (CS) follow-up is performed and the bids are resubmitted to the batch process, beginning at state 2502.

If, at state 2514, a determination is made that the delivery and handling process was not successfully performed, the process proceeds to state 2538, and those bids that were not successfully associated with a reserved seat are flagged, a bid problem report is generated at state 2540 listing the problem bids and identifying the problem, and at state 2542, a CS follow-up is performed, and a service person manually completes the sale (e.g., via email, instant messaging, or phone). At state 2544 the account number is manually or automatically inserted.

If, at state 2518, a determination is made that the account creation process was not successfully performed, the process proceeds to state 2532, and those bids that did not make it successfully through the account creation process are flagged, a bid problem report is generated at state 2534 listing the problem bids and identifying the problem, and at state 2536, a CS follow-up is performed, and a service person manually completes the sale (e.g., via email, instant messaging, or phone). At state 2544, the account number is manually or automatically inserted.

If, at state 2522, a determination is made that the pay account process was not successfully performed, the process proceeds to state 2524, and those bids that were not successfully processed are flagged, a bid problem report is generated at state 2526 listing the problem bids and identifying the problem, and at state 2528 a CS follow-up is performed, and a service person manually completes the sale (e.g., via email, instant messaging, or phone). At state 2544, the account number is manually or automatically inserted.

FIG. 26 illustrates a table of example alternative auction formats. For example, an auction can be a PWYB (pay what you bid) auction or a uniform pricing auction. In addition, an auction can have a single ticket group or multiple ticket groups. If an auction has multiple ticket groups, the auction either have subset bidding (e.g., multiple bid guideline groups) or not have subset bidding. An auction can be for an event/venue that has accommodations for disabled persons, or does not have such accommodations. An auction can have a standard ADP or optionally, for auctions with subset bidding, an ADP that provides information and fields for subset bid guideline groups (BGG). The auction help information for a given auction will correspond to the auction configuration. A Seller or system operator can optionally select from among the alternative auction forms, and the selection is stored in auction memory for later retrieval and auction set-up.

Additional example user interfaces that can optionally be stored in an auction system data store, retrieved and transmitted for display to a user terminal (e.g., personal computer, wireless phone, personal digital assistant, etc.) will now be described. By way of example, certain of the user interfaces can be used to search or browse for events, provide auction status, submit bids, submit increase in bids (rebids), provide status on the user's bid, to invite other users to attend events, and so on.

FIG. 7 illustrates an auction Web page user interface that that can be used by the auction system to notify the user when an auction the user requested has closed. In this example, the auction closed Web page notifies the user of the date, time, artist, venue of the concert for which the auction is closed, as well as the date on which the auction closed. If the system determines that the auction has closed, the system can also determine, by examining the auction database, if other channels are available for purchasing tickets to the event (e.g. standard non-auction purchase of ticket). For example, the user interface can provide an "onsale" area listing tickets that can be purchased at a set price, and an auction area listing other auctions for the event artist, wherein such information has been authorized for display, and wherein the auctions have not yet closed.

Figure 8:
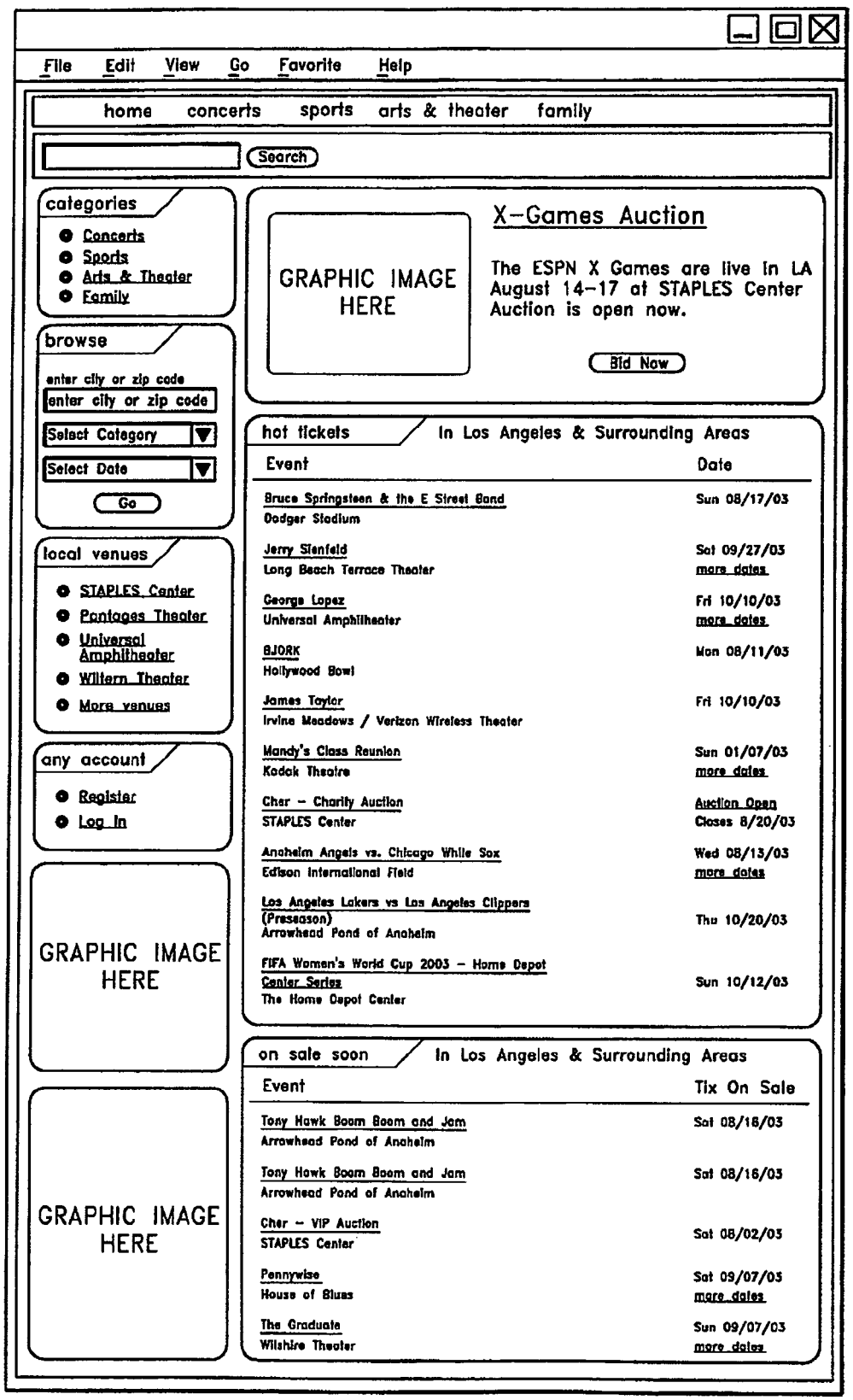
FIG. 8 illustrates an example auction home page, wherein a user can search for events for which tickets are being auctioned.

FIG. 8 illustrates an example auction home page, wherein a user can search for events for which tickets are being auctioned, as well as for events for which tickets can be purchased at a set price. The home page information can be based at least in part on user information, such as the user's geographical location, city, state, zip code, event preferences, or the like. For example, the Web page can present information on event auctions for venues within a certain distance from the user or within the same city as the user's. The user can search based on categories, venues, dates, and/or location. The home page also lists, optionally using links to other user interfaces, and popular upcoming events in the user's area for which auctions are in progress. For example, if the user clicks on an event name ("Cher Charity Auction") the user will be presented with another page providing information on the event. The event listing can include one or more of dates corresponding to the event, an indication as to whether there is an auction associated with the event, and the auction status ("Auction Open"). Thus, the home page can list upcoming auctions, as well as the auction start dates.

Figure 9:
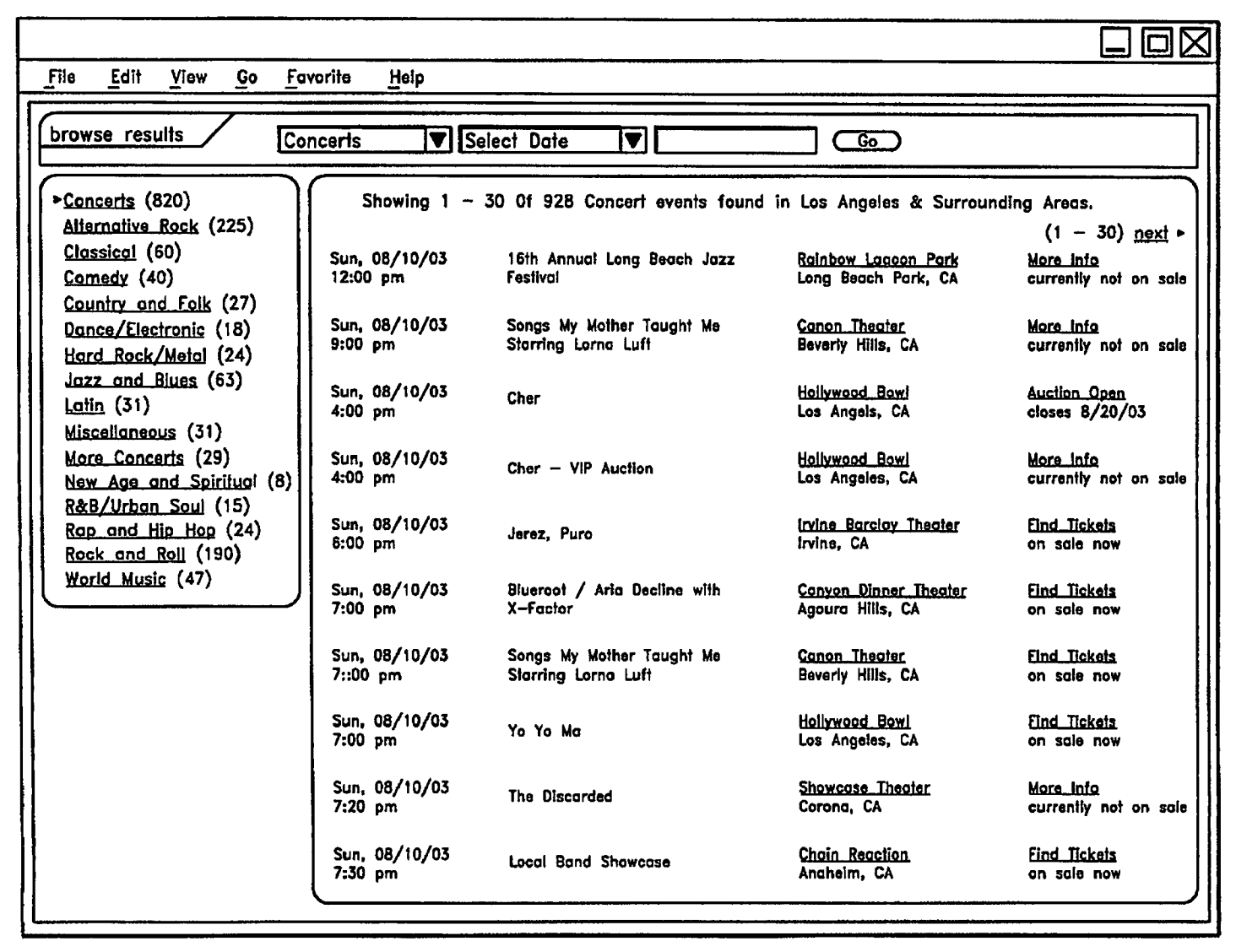

FIG. 9 illustrates an example event browse page for concert events in a selected area ("Los Angeles & Surrounding Areas"). The event browse page lists the dates, times, event name or identifier, venue, venue location, auction status, and auction close date. Optionally, for events wherein auctions are closed or not yet opened (pre-auction), the event name and/or other event information are faded, or otherwise visibly identified and the "find tickets" link is not active. The example page includes event links which the user can activate, and in response, the auction system will cause an event detail page, providing additional information regarding the event, to be presented on the user's terminal.

FIG. 10 illustrates another example auction browse page, wherein the user had selected, via a link or otherwise, a particular venue ("STAPLES Center"). The example page lists events occurring at the selected venue. In this example, an "auction open" is listed in association with the Cher—VIP auction listing.

FIG. 11 illustrates an example auction search results page. For example, the user can search based on an artist name, a team, a venue, a location, and/or a date. In this example, the user searched for events corresponding to the artist "Cher". The search results include a listing of events that meet the user's criteria, and identify an event category (e.g., "rock and roll") and scheduled dates.

Figure 12:
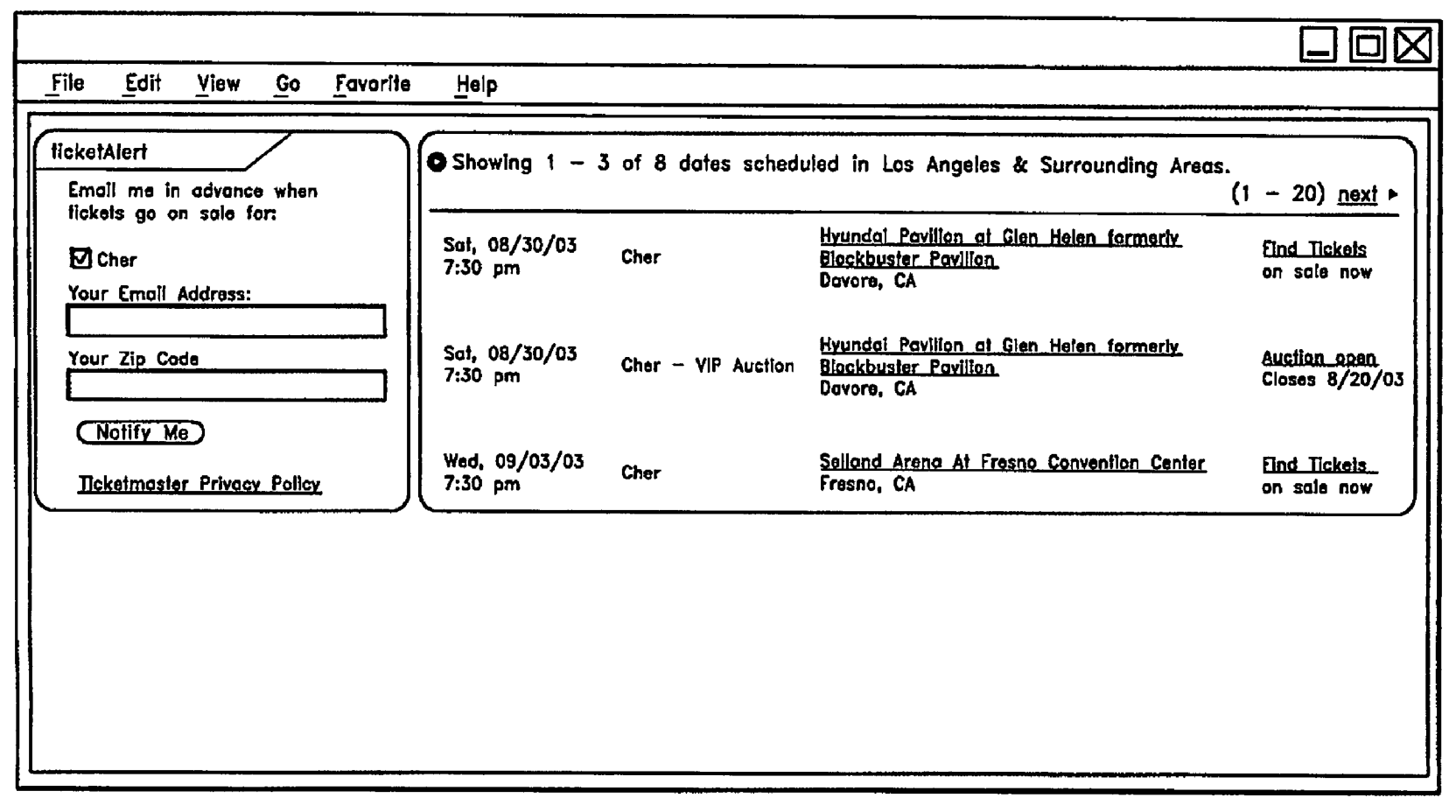

FIG. 12 lists auctions and standard ticket sales for events in the user's area that correspond to the searched for or selected artist. In this example, the same Cher event is listed three times, first as a standard ticket sale event at a first venue at a first date, second as ticket auction ("Cher—VIP Auction") at the same first venue and first date, and third, as a standard ticket sale event at a second venue on a second date. The first listing includes a "find tickets" link, which, if activated by the user will bring up a standard ticket request page, including a ticket quantity field and optionally a selection of different seat price groups from which the user can select. The section listing includes an "Auction Open" link, which when activated by the user, causes the auction system to transmit an auction page to the user terminal for display. Thus, advantageously, optionally a user can access a common inventory of tickets for auctions and set price ticket sales via the same user interface.

FIG. 13 illustrates an example auction selection page for a selected artist (e.g., Cher) at a selected venue (e.g., Hollywood Bowl) for event tickets which allows the user to search for or select either tickets on sale for a fixed price and/or event tickets being auctioned. The page optionally informs the user if the auction has begun, if any tickets are available, if the auction has closed, when the auction opens, when the auction closes, the amount of time or days until the auction opens, and so on. In this example, the page provides Internet onsale information, such as when the sale to the public begins over the Internet, Internet presale information, such as when the sale to a selected group (e.g., "getAccess" group members), and Internet presale information for a second selected group (e.g., "cc.com") begins over the Internet. In this example, different selected groups have different presale start dates. The page optionally provides one or more reasons as to why on sale and presale tickets are not available. The example page further provides information on ticket limits (e.g., 8 ticket limit) in a ticket limit area.

FIG. 13A illustrates yet another example event page for event tickets which allows the user to search for or select either tickets on sale for a fixed price and/or event tickets being auctioned. The user can optionally specify: the number of desired tickets; the desired price or price range; the desired section (optionally including the choice of "best available" section); the desired location, and so on. The page optionally informs the user if the auction has begun, if any tickets are available, if the auction has closed, when the auction opened, when the auction closes, the amount of time or days until the auction closes, and so on. Optionally, an event is listed or visible if the current date is greater or equal to the release date and less than or equal to the event date. The page optionally further provides ticket pricing for one or more seating areas.

FIG. 27 illustrates an auction bid page. The page provides information on the event, such as the event artist, venue, city, date, time. The page further indicates if there is a limit on the number of tickets a given user can bid on, and the minimum bid increment. The page further provides information on the current low or minimum bid needed to be eligible to potentially win the auction for seats in selected areas. For example, the page lists the current minimum bid for the first row, the second row, rows 3 to 5, and so on. The user can enter the number of desired tickets, the maximum bid per ticket, and a request for notification to be provided if the user is outbid. Auction rules can also be provided as similarly described elsewhere herein.

FIG. 27A illustrates a Web page that notifies the user that there are no tickets available at a fixed price for a desired event and provides links to ticket auctions for the event. In addition, relevant ticket auction information is provided, such as the event name, the opening date of the auction, the closing date of the auction, the auction status, and so on. Optionally, this page will not display closed auctions.

FIG. 28 illustrates an example Web page user interface form used to submit a user's first bid for an item, such as for event seats. The page provides information on the event, such as the event artist, venue, city, date, time. The page additionally lists an auction start date and time, an auction end time, a presale start (e.g., such as for sales to certain qualified users that takes place before ticket sales to the general public), and an on sale start date and time (e.g., for ticket sales to the general public). The page also includes a "bid on tickets" area that can optionally further indicate if there is a limit on the number of tickets a given user can bid on, whether there is a minimum number of seats the user needs to bid on, and/or the minimum bid increment.

The user interface illustrated in FIG. 28 further provides information in an auction status field on the current low or minimum bid needed to be eligible to potentially win the auction for seats in the entire venue or for selected available areas or groups of seats. If there are no losing bids, then the auction starting bid will be listed. If there is a losing bid, then the minimum bid amount needed so that the bid will be currently designated as a winning bid will be listed. If there are no groups (e.g., if the event is a general admission event without reserved seats) then the groups will not be displayed in this example. The page further provides the amount of time left in the auction (e.g., days, hours, and/or minutes). A help link, "learn about ticket groups" is provided, and if activated by a user, a description of ticket groups and auction status is provided.

With reference to FIG. 28, the groups can be in the form one or more rows or sections. The groups can also be in the form of seats within a row, or within one or more rows. The user can enter the number of desired tickets, the maximum amount the user is willing to bid per ticket, and a request for an email communication if the user is outbid. The user can optionally select which ticket group the user wants to bid on. For example, in the "bid on tickets" area, clicking on the ticket group link optionally causes a drop-down menu or other user interface to be displayed, listing available groups that the user can bid on. By way of example, the menu can default to none, and list the ticket groups that the user can select via numbers or names.

The user interface illustrated in FIG. 28 further includes an "already bid in this auction" link in the "bid on tickets" area that the user can activate if the user had previously submitted an auction bid. If the user activates the link, the status (e.g., whether the bid is currently a winning bid or losing bid, the current amount of the user's bid, the seat(s), row(s), section(s) currently assigned to the user's bid, the current low winning bid, and/or the auction end time and date) of the user's previous bid will be presented.

FIG. 28 further includes an optional link in the form of a wheelchair icon, or otherwise. If the user activates the link the user will be presented with information regarding accommodations for disabled or handicapped persons at the venue and/or event. The user interface illustrated in FIG. 28 also includes a link to a seating chart for the venue. In addition, a "see onsale info" The user interface can further optionally list auction rules (e.g., pay what you bid rules or uniform pricing rules), such as discussed above.

For an auction with multiple bid guideline groups, the initial minimum bid needed for a given group can initially be the same as for other groups, or optionally the initial minimum needed bid can be different from group to group. The minimum needed bids can change for the different ticket groups during the course of an auction. In addition, the minimum bid to enter the auction can change over the course of an auction.

Figure 29A:
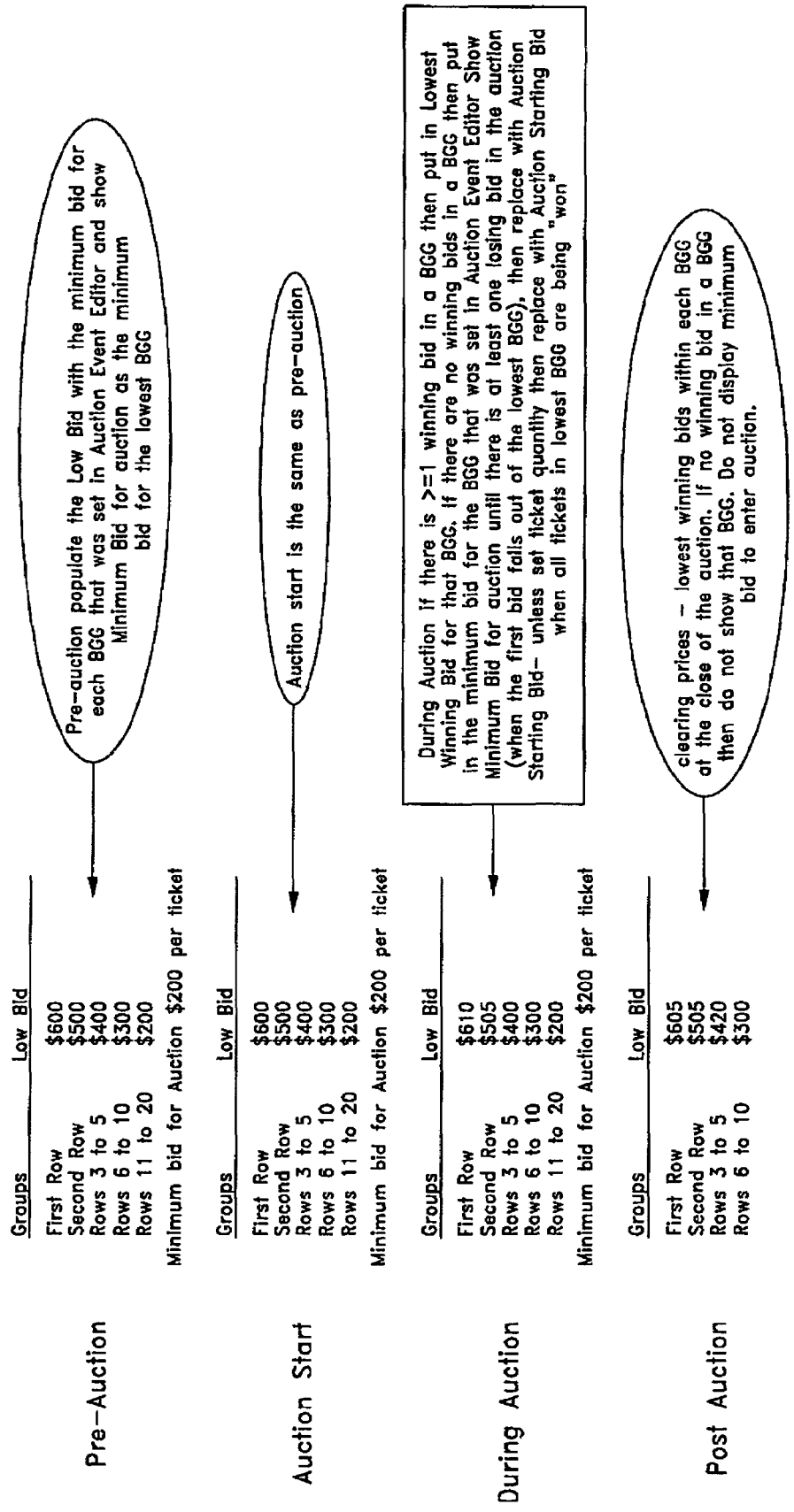

FIG. 29A illustrates example changes in lowest winning bids for selected groupings of seats at different points in an example auction with bid group guidelines, where different bid group guidelines are associated with different initial bid minimums (low bids). Initially, pre-auction and before bids are received, the auction status displayed to the user will list a description of the groups (first row, second row, etc.) a predetermined minimum bid as the lowest bid for a corresponding group (e.g., first row low bid=$600, second row low bid=$500, etc.) and will optionally display the minimum bid for the auction as the minimum bid for the lowest or least desirable bid group guideline. In this example, $200 is minimum bid in the pre-auction state, and is listed as the low bid for rows 11 to 20. In this example, the low and minimum bids are the same at the auction start, before bids are received, as during the pre-auction. During the auction, once a first bid designated as winning is received for a given seating group, then the lowest winning bid is set equal to the value of the winning bid. If no winning bids are received for a given group, then the low bid optionally remains the same as in the pre-auction and auction periods. The minimum bid will be displayed as the low bid for a given group, until there is at least one losing bid, such as when a first bid is received that fails to be a winning bid for the seating group that has the lowest low bid. Once a first losing bid is received, then replace the Auction Starting Bid with the highest losing bid. Optionally, if there is a set ticket quantity that needs to be purchased, then the Auction Starting Bid is replaced with the highest losing bid when all the tickets in the lowest group are "won" (e.g., associated with bids).

During the post auction state, the low bid for each group is set equal to the lowest winning bid in each group. Optionally, if there are no winning bids in a given group, the group will not be displayed in the auction status once the auction is over. Because the auction is over, the minimum bid needed to enter the auction (the auction starting bid) is optionally not displayed.

FIG. 29B illustrates example changes in lowest winning bids for selected groupings of seats at different points in an example auction with bid group guidelines, where different bid group guidelines are associated with equal initial bid minimums (low bids). Optionally, in the pre-auction state, a description is provided for the bid guideline groups (e.g., first row, second row, rows 3 to 5, etc.), with the low bid left blank or with a placeholder. A minimum bid needed to enter the auction as a whole (e.g., $100 per ticket) is optionally displayed. At the auction start, the low bid for the best or highest ranked group is set equal to the minimum bid needed to enter the auction as a whole (e.g., $100 per ticket), and the low bid for the other groups are optionally left blank or with a place holder. The minimum bid needed to enter the auction as a whole is still displayed. During the auction, the low bids are filled in for groups that have an associated winning bid with the lowest winning bid for a corresponding group. Once a first losing bid is received then replace the Auction Starting Bid with the highest losing bid. Optionally, if there is a set ticket quantity that needs to be purchased, then the Auction Starting Bid is replaced with the highest losing bid when all the tickets in the lowest group are "won" (e.g., associated with bids).

During the auction, if all the groups have at least one winning bid, and if there is at least one losing bid for the last or lowest ranked group, then each group will have an associated low bid displayed. Optionally, the minimum bid needed to enter the auction field is removed or not displayed when there is a losing bid for the last or lowest ranked bid. Optionally, if there is a set ticket quantity that needs to be purchased, then the Auction Starting Bid is displayed when all the tickets in the lowest ranked group are "won."

During the post auction state, the lowest winning bid is displayed in the low bid field for those groups that have one or more winning bids. The minimum bid needed to enter the auction field is removed or not displayed.

FIGS. 30A-B illustrates example sets of auction rules with example optional restrictions. As previously discussed, usage of the words "must", "require", "only", "all" and the like are optional guidance and/or restrictions on example users and are not required. For example, there can be a set of rules for pay what you bid (discriminatory pricing) auctions with one bid guideline group 2602, a set of rules for pay what you bid (discriminatory pricing) auctions with more than one bid guideline group 2604, a set of rules for uniform pricing auctions with one bid guideline group 2606, and a set of rules for uniform pricing auctions with more than one bid guideline group 2608. The auction system can selectively retrieve the appropriate rules for display to the user based on the auction type.

For example, the rules for pay what you bid (discriminatory pricing) auctions with one bid guideline group 3002 informs the user that the user will be charged a per ticket price equal to the amount the user bid, plus a delivery price, if applicable, and a processing fee. In addition, the user is informed that the user can only submit one valid bid at a time and that once the bid is submitted, the user cannot cancel the bid. The user is also informed that the user can increase the bid, and the previous bid will no longer be valid. In this example, the user is informed that bids are ranked first by the amount bid per tickets, and that ties will be broken based on the bid times, wherein earlier bids receive priority.

By way of further example, the rules for pay what you bid (discriminatory pricing) auctions with more than one bid guideline group 3004 informs the user that the user will be charged a per ticket price equal to the amount the user bid, plus a delivery price, if applicable, and a processing fee. In addition, the user is informed that the user can only submit one valid bid at a time and that once the bid is submitted, the user cannot cancel the bid. The user is also informed that the user can increase the bid. In this example, the user is informed that bids are ranked first by the amount bid per tickets, and that ties will be broken based on the bid times, wherein earlier bids receive priority. In addition, the user is informed that higher ranked bids may bump the user's bid into lower ticket groups or out of the auction.

The rules for uniform pricing auctions with one bid guideline group 3006 informs the user that the user will be charged a per ticket price equal to the amount the lowest winning bid at the close of auction, plus a delivery price, if applicable, and a processing fee. In addition, the user is informed that the user can only submit one valid bid at a time and that once the bid is submitted, the user cannot cancel the bid. The user is also informed that the user can increase the bid, and the previous bid will no longer be valid. In this example, the user is informed that bids are ranked first by the amount bid per tickets, and that ties will be broken based on the bid times, wherein earlier bids receive priority. In addition, the user is informed that higher ranked bids may bump the user's bid into lower ticket groups or out of the auction.

The rules for uniform pricing auctions with more than one bid guideline group 3008 informs the user that the user will be charged a per ticket price equal to the amount the lowest winning bid for the group the user's bid is in, plus a delivery price, if applicable, and a processing fee. In addition, the user is informed that the user can only submit one valid bid at a time and that once the bid is submitted, the user cannot cancel the bid. The user is also informed that the user can increase the bid, and the previous bid will no longer be valid. In this example, the user is informed that bids are ranked first by the amount bid per tickets, and that ties will be broken based on the bid times, wherein earlier bids receive priority. In addition, the user is informed that higher ranked bids may bump the user's bid into lower ticket groups or out of the auction.

FIG. 31 illustrates example conditions optionally used to select versions of the first bid page (sometimes referred to as an auction detail page or ADP), including pre first bid, system down, post first bid, and first bid maintenance pages. Example pages are illustrated in the following figures. The bid pages can further be optionally varied based on whether auction status is available or unavailable. The "during auction" pages can optionally further be varied based on whether the system is undergoing certain types of maintenance. In addition, a "locked out" page can optionally be presented to a user that has been locked out of an auction (e.g., for exceeding a retry limit, for canceling a bid, or for other designated reason). Optionally the bid page auction status area will not be displayed until a certain amount or types of information has been received, or until a certain date and/or time has been reached.

An example pre-first bid page, illustrated in FIG. 32, has a "bid on tickets" area that informs the user that the auction has not yet begun, and further informs the user of the date and time the auction will begin. If the user wants the system to automatically remind the user when the auction begins, the user can enter an email address to which the reminder is to be sent. In addition, in this example, the auction status area does not have low bids entered into the low bid fields of the corresponding ticket groups. In this example, a minimum bid to enter the auction ($100) is listed.

An example system down page, illustrated in FIG. 33, has a "bid on tickets" area that informs the user that the auction is temporarily inaccessible due to nightly system maintenance, and further informs the user of the time, and optionally the date, when the user can submit a bid and/or check the auction status. In this example, the auction status area has low bids entered into the low bid fields of the corresponding ticket groups, and provides a date and time for the same.

An example "locked out" page, illustrated in FIG. 34, has a "bid on tickets" area that informs the user that the user is blocked from participating in the auction. In this example, the auction status area has low bids entered into the low bid fields of the corresponding ticket groups, and provides a date and time for the same.

An example post first bid page, illustrated in FIG. 35, has a "bid on tickets" area that informs the user that the auction is completed, and further informs the user to check the user's mailbox to find out the user's final bid status. Of course the final bid status can be accessed via other interfaces, such as by accessing the user's account information. In this example, the auction status area has the final low bids entered into the low bid fields of the corresponding ticket groups, and provides an "auction closed" status. In this example, a minimum bid to enter the auction is not listed.

FIG. 36 illustrates an example rebid page which can be used to increase a bid for a given ticket or other Unit. The page includes a re-bid area that informs the user what the result would be if the auction were to end immediately, and/or if no bids higher than the user's were received. In this example, the user is informed of the current bid status at the current point in time (e.g. winning or losing), of the price the user would pay and the seat, section, row and/or ticket group the user would have purchased if the user won the auction. This example Web page provides the auction start date and time, the auction end date and time, the presale start date and name (e.g., for purchasing tickets for a fixed, non-auction price before the general public can and/or before notifying the general public of the sale), and the on sale start date and time (e.g., for purchasing tickets for a fixed, non-auction price).

Figure 37:
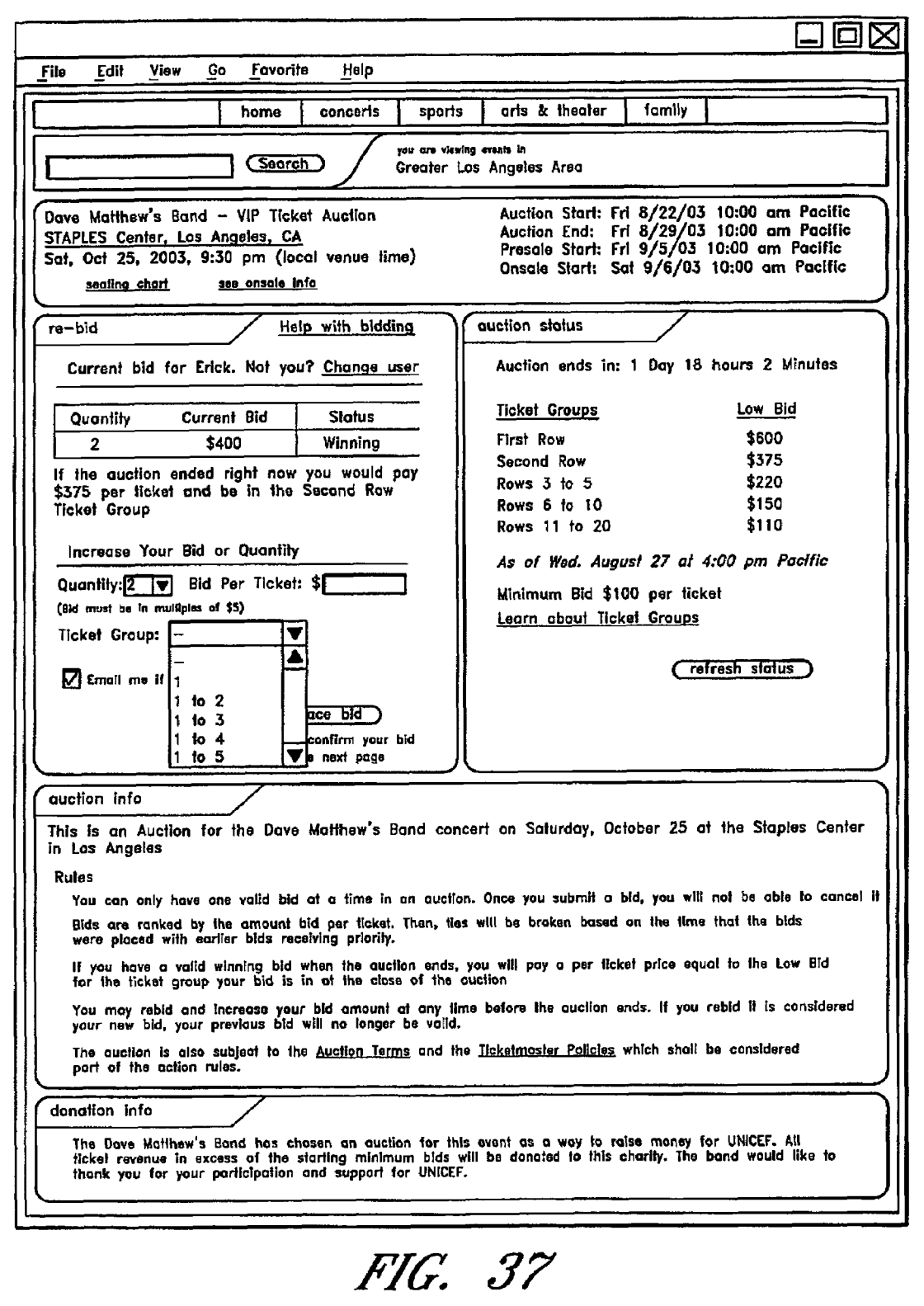

FIG. 37 illustrates the rebid page with the ticket group dropdown menu displayed. A similar dropdown menu can be employed in a first bid page. Via appropriate fields in the re-bid area, the user can change the ticket group being bid for as part of the rebiding process via a ticket group field. This, for example, can allow the user to maintain or even decrease their bid amount and change their status from a losing bidder to a winning bidder by selecting a lower priced ticket group. Optionally, users can be prevented from lowering their bids and/or change the ticket group being bid for if they currently have a "winner" status for the currently selected ticket group. The user can also increase the ticket quantity and bid via quantity and ticket $ fields. The example page re-bid area also informs the user what the result would be if the auction were to end immediately.

Different rebid page (for example, a normal rebid page, a maintenance rebid page, and a ticketing system down rebid page) can be displayed to the user based on auction status, system status, and/or timing with respect to the auction. Optionally, a rebid page for a given auction will only be displayed during the auction, and not before the auction or after auction close. During system maintenance, if auction status is available, the maintenance rebid page can be displayed. If the auction system is down, wherein auction status is not available, the ticketing system down rebid page can be displayed. Thus, an example rebid maintenance page can inform the user that the auction is temporarily inaccessible due to nightly system maintenance, and further informs the user of the time, and optionally the date, when the user can submit a bid and/or check the auction status. The example page re-bid area optionally also informs the user what the result would be if the auction were to end immediately.

FIG. 39 illustrates example error messages that can be generated and communicated to the user via a Web page, email, instant message, SMS message, and so on, and the trigger for the error message. The trigger check can be performed using Javascript, an application program, or otherwise. For example, the error message can relate to a bidder improperly submitting a bid of 0, a bid amount that contains non-numeric characters, a bid with an improper bid increment, a bid that is too low to be a currently winning bid, a ticket quantity of 0 or other improper ticket quantity amount, a rebid that decreases the bid amount, a rebid attempt wherein the bidder has not submitted a first bid, a rebid with a decrease in the ticket quantity, the bidder submitting a credit card with an unacceptable card expiration date, too many retries by the bidder, a cancelled bid, a bid entered after the auction close, a failure by the bidder to select a ticket group. Further, an error message can be presented via a Web page, informing the user that the bid could not be submitted at given time, optionally with a reason the bid could not be submitted, and requesting the user to return to the auction bid page.

Figure 40:
FIG. 40 illustrates an example processing wait page.

FIG. 40 illustrates an example auction status waiting Web page that can be presented when, for example, a user's bid submission is being queued for processing and/or is being processed. The example page further provides an estimated time on how long it will take until the user or user's bid is taken to the next state. The user is optionally cautioned that if the user refreshes the page or activates the browser back page, the bid will need to be resubmitted.

FIGS. 51A-B illustrates an example billing and shipping Web page form for a pending winning bid (before the auction completion), wherein the user account database already contains credit card information for the user. The stored credit card information and other desired user account information, can be retrieved from the user account database and used to populate one or more of the billing and shipping Web page form. The user can then select a credit card to be used to pay for tickets associated with a winning bid. If the credit card information is not stored, fields can be provided via which the user can enter the credit card information. A credit card identification (CID) field is provided into which the user enters the credit card CID. Optionally, the user is only asked to enter the CID for the user's first bid, and the field will not be presented for the user's subsequent bids. The example billing and shipping Web page form lists the auction name, the event date and time, the event venue, the auction start and stop times, and the bidder name. If the auction includes multiple bid guideline groups, then the bid guideline group identifier, such as a beginning group number and name and an end group number and name is listed in the "ticket groups" field (e.g., "(1) First Row to (4) Rows 6 to 10"). If there is only one bid group, then optionally only a single group number and name is listed. An "auction time remaining" field lists the remaining time (e.g., in days and hours) until the auction close. The example form further lists the bid per ticket, the ticket quantity being bid on by the user, the total (bid per ticket multiplied by the ticket quantity), and a handling fee.

The example billing and shipping Web page form illustrated in FIGS. 51A-B also lists one or more ticket delivery options (e.g., email, $2^{nd}$ day morning delivery, $2^{nd}$ day delivery, standard delivery, will call, etc.) and associated delivery fees, selectable by the user. The ticket delivery can optionally be performed via a Web page, wherein in the ticket is displayed on a Web page, which the user can print out. The form includes an optical barrier, which displays a visually distorted word or set of characters which the user needs to type into a field in order to confirm the submission. A field is provided via which the user agrees to certain terms and conditions. A submit button is provided on the Web page, and the bid will be submitted for processing upon activation by the user.

FIG. 38 illustrates an example uniform pricing auction bid confirmation Web page acknowledging that the bid has been successfully submitted. The confirmation page lists the auction name (e.g. Dave Matthews Band—VIP Ticket Auction), the event date and time, the bidder name, the date and time the bid was entered, and the shipping address. In addition, the bid confirmation page lists the auction start and end dates and times, the presale start date, and the on sale start date. In this example, the user is notified via a bid confirmation area of the page of the bid amount per ticket, the total bid amount (including, for example, the ticket bid amount per ticket multiplied by the ticket quantity, in addition to delivery fees, handling fees, and/or taxes, and minus any discounts, rebates, and so on if such are appropriate). The user is further informed that, in this example, the listed total is the most the user will have to pay if the user is a winner. The user is further informed that the actual amount may end up being lower as upon completion of the auction, the total will be calculated based on the lowest winning bid in the ticket group that the user is a winner in at the end of the auction. The bid confirmation page optionally includes an auction help link and a print button that can be used to print the confirmation page. In this example, the user is formed that a certain amount (e.g., the ticket revenue in excess if the starting minimum bids, a fixed dollar amount, a percentage of the ticket price, etc.) will be donated to a charity (e.g., UNICEF or other designated charity).

FIG. 52 illustrates an example rebid confirmation Web page. The example billing and shipping Web page form lists the auction name, the event date and time, the event venue, the auction start and stop times, and the bidder name. If the auction includes multiple bid guideline groups, then the bid guideline group identifier, such as a beginning group number and name to an end group number and name is listed in the "ticket groups" field (e.g., "(1) First Row to (4) Rows 6 to 10"). If there is only one bid group, then optionally only a single group number and name is listed. An "auction time remaining" field lists the remaining time (e.g., in days and hours) until the auction close. The example form further lists the bid per ticket, the ticket quantity being bid on by the user, the total (bid per ticket multiplied by the ticket quantity), and a handling fee.

The example billing and shipping Web page form illustrated in FIG. 52 also lists a delivery method (e.g., email) and associated fee, and links to alternative delivery methods (e.g., mail, will call, UPS). The form includes an optical barrier, as similarly described above. A submit button is provided on the Web page, and the bid will be submitted for processing upon activation by the user.

Figure 53:
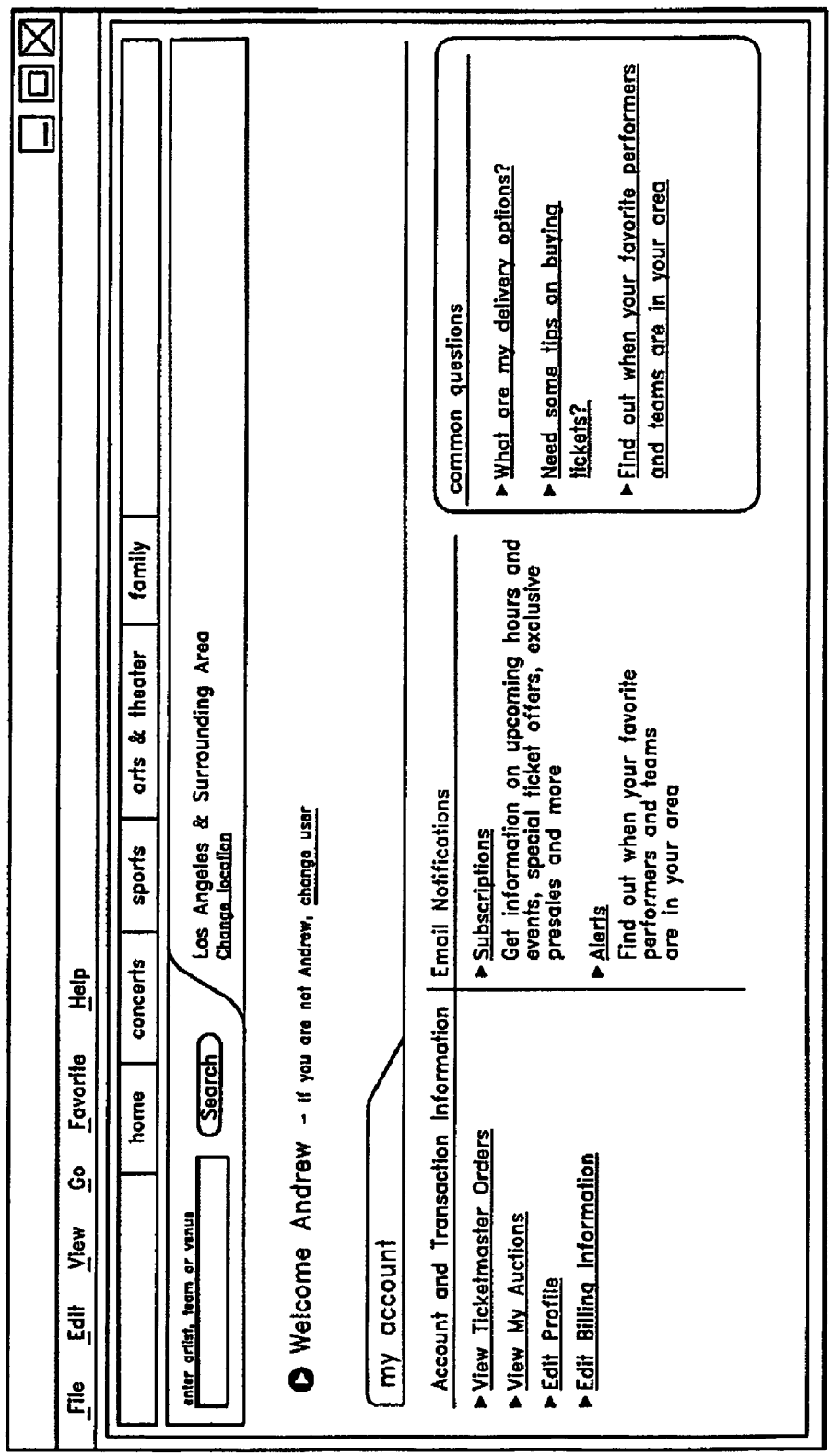
FIG. 53 illustrates an example user account home page.

FIG. 53 illustrates an example user account home page, includes links to pages showing the user's ticket purchases, the user's auction information (e.g., user bid dates, event names, event dates, current bid amounts, ticket quantities per auction, total ticket quantities for all auctions, total bid amounts per auction, total bid amounts for all auctions, and bid status), the user's profile information, and the user's billing information. In addition, links are provided via which the user can subscribe to event and ticket information, and for alert notifications for a particular performed or team.

FIG. 54 illustrates an example user account auction page providing information on the user's auction history, including bid dates, event names, event dates, amounts, quantity, totals, and/or the bid status (e.g., won-pending, won-paid, lost, view status, etc.). Optionally, the event date is a link that when activated by a user will cause an event detail page to be displayed in the user's browser. Optionally, the bid status is in the form of a link. For example, when the user activates the view status link, the auction rebid page with status will be displayed. Activation of a "won-pending" or "won-paid" link will cause a user's order page to be displayed. Activating a "lost" status link will cause an auction results page to be displayed. A status date and time is listed. The bid amounts and bid status are current as of the status date and time. Some or all of the status information and links are optionally not displayed after a period of time and/or upon a selected trigger. For example, losing bids are optionally not displayed after a predetermined amount of time elapses (e.g., 80 days after the event takes place, 60 days after the auction ended, or 60 days after the user submitted the losing bid). By way of further example, winning bids are optionally not displayed after a predetermined amount of time elapses, wherein the predetermined amount of time can be different than that for losing bids (e.g., one year after the event takes place, nine months after the auction ended, or 6 months after the user submitted the winning bid). By way of further example, the "lost" status may be rendered as text without the link if the event date has passed, or by way of further example, if the auction has closed.

FIG. 56 illustrates an example auction editor page. An event editor, or other designated person, can use the form to enter various parameters which will be stored in auction system memory, and retrieved as needed to generate the auction in accordance with the parameters. Thus, rather than having to manually code each auction, an event editor (e.g., a Seller, auction system operator, etc.) can optionally set up an auction using the auction editor form. Further, the event editor does not have to know how to write program code in order to set up an auction. The example auction editor form includes an auction inventory group field, wherein an event editor can enter an auction name for the auction being created or can select an already created auction for further editing via a dropdown menu. Start and End fields receive auction start and end dates. A release ADP field receives the date at which the auction detail page (including, for example, the information entered via the form, or a portion thereof) for the auction is to be made available to the public. Optionally, an ADP expiration date field can be provided as well. Optionally, if the ADP expiration date field is not filled in, the ADP expiration date defaults to the event date. The event editor can specify via the "use full packing" field whether any seat packing is to be performed for the auction. The event editor can specify via the "Use Uniform Pricing" field whether uniform pricing is to be used (optionally, if this field is not checked, the auction will default to pay-what-you-bid pricing). An "auction info" field can be used to receive auction information for display on an ADP or other appropriate user interface. The auction editor form can further optionally include fields that enable the event editor to specify if there is a maximum and/or minimum quantity of seats tickets that a bidder can bid on, and if the ticket quantity needs to be in multiples of a predetermined number.

The event editor can specify whether a portion of auction revenues are to be allocated to a charity using a "charities name" field. Optionally, the event editor can specify whether a fixed amount per ticket or a percentage of each ticket price is to be donated using "fixed", "%" and "amount" fields. A "donation text" field can be used to receive text regarding the charity donation for display on an ADP or other appropriate user interface.

The event editor can enter both short and long descriptions of the ticket inventory for later display on an ADP or other appropriate interface using "short desc" and "long desc" fields. The event editor can enter the auction minimum bid via a "minimum bid" field, and a minimum bid increment via a "bid increment" field. Multiple subsets, such as the example ticket groups illustrated in several of the user interfaces described herein, can be defined via the BID1-BINn row fields (e.g., subset field, short description field, long description field, seat data, the initial minimum bid for the group, and the total number of seats in the group, etc.). In this example, if subset box for GroupX is checked, then ticket groups 1 to X will be displayed to bidders for bidding. For example, if the BID3 subset box is checked, then the groups associated with BID1, BID2, and BID3 will be displayed to bidders.

An ADA dropdown menu can be used to specify whether ADA is accommodated, ADA is not accommodated, or other ADA. An ADA text box is used to receive a description of the ADA accommodation for display on an appropriate user interface. Optionally, the ADA text box is pre-populated with a text retrieved from the system database, and optionally, the text cannot be edited via this field unless the "ADA other" option is selected.

FIG. 41 illustrates example notification rules based on a change in bid status and/or whether the user has the option to "opt-in" for certain notifications. For example, a losing bid notice will be provided to a user whose bid status has changed from winning to losing if the user has opted in for such as notice (e.g., via a first bid or rebid page). Optionally, such a notice can be provided without having the user opt-in for the notice. A notification can also be provided to the user if the user's bid status changed from losing to winning, wherein the status change is not a result of a bid increase (rebid) by the user. Optionally, such a winning-to-losing notice can be automatically provided without having the user opt-in for the notice. Optionally, instead, the user may need to opt-in for the winning-to-losing notice. An email notification can further be provided upon the end of an auction, if the user's bid retained its winning designation (e.g., pending win), prior to the payment process being successfully completed. Optionally, such an auction end-winning notice can be automatically provided without having the user opt-in for the notice. Optionally, instead, the user may need to opt-in for the auction end-winning notice. An email notification can further be provided upon the end of an auction, if the user's bid changed to a losing status (e.g., lost the auction). Optionally, such an auction end-losing notice can be automatically provided without having the user opt-in for the notice. Optionally, instead, the user may need to opt-in for the auction end-losing notice. An email notification can further be provided upon payment being processed successfully for a pending winning bid (changing the bid status from win pending to win transacted). Optionally, such a payment notice can be automatically provided without having the user opt-in for the notice. Optionally, instead, the user may need to opt-in for the payment notice.

Figure 42:
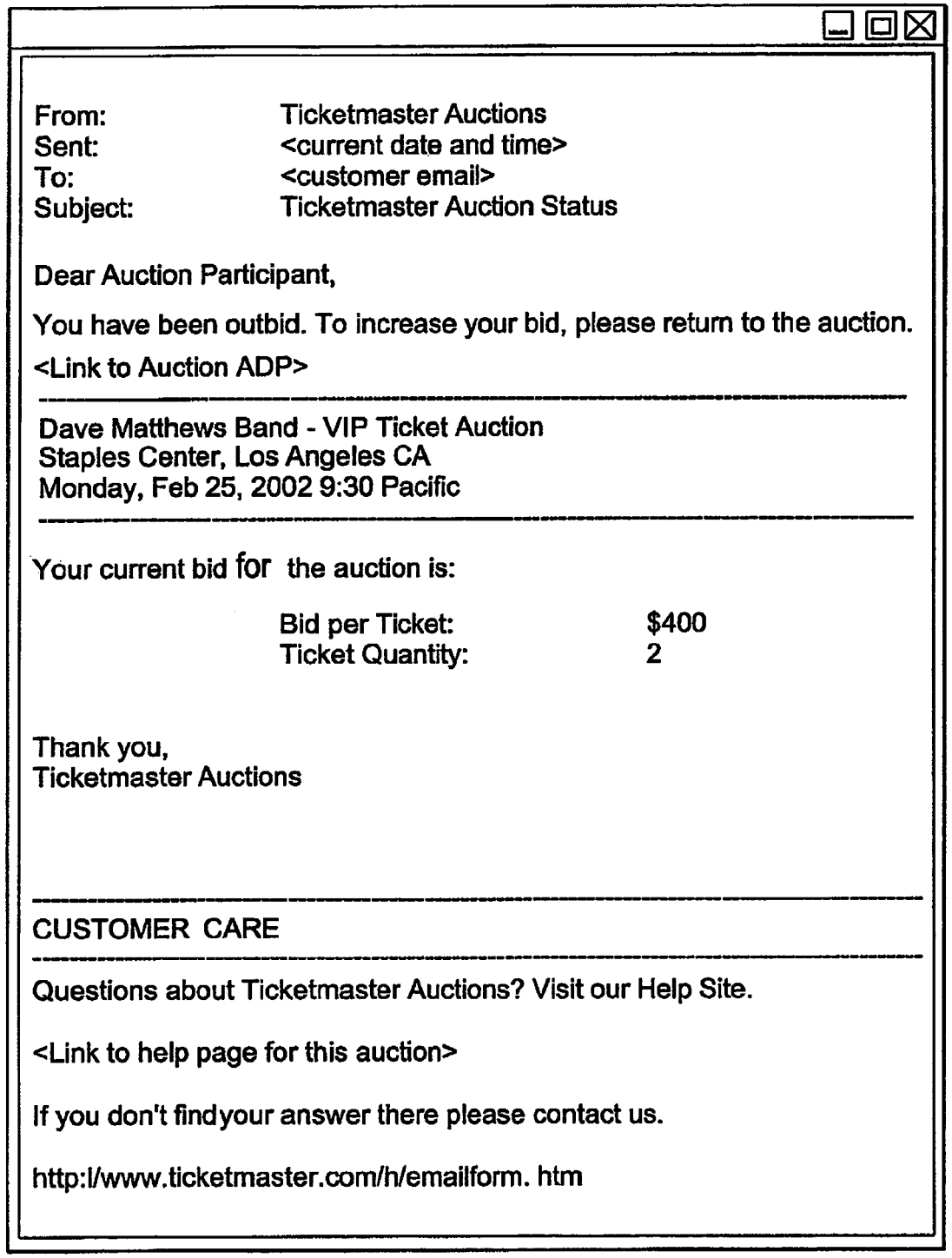
FIG. 42 illustrates example text for a notification regarding a losing bid.

FIG. 42 illustrates example text for a notification regarding a losing bid that can be included in an email, instant message, Web page, or other communication before the auction has closed. By optionally providing notifications to the user via email or instant messaging, the user does not have to constantly monitor a Web site to determine the status of the user's bid. The user is informed that the user has been outbid, and that the user can increase the user's bid by returning to the auction. A link can be provided, which when activated by the user, will cause the auction system to present the user with a rebid auction detail page. For example, the rebid auction detail page may be presented in the user's browser or other network resource user interface. The notification can further include a link to an auction help page. The notification lists the user's current bid per ticket and the ticket quantity the user is bidding on.

Figure 43:
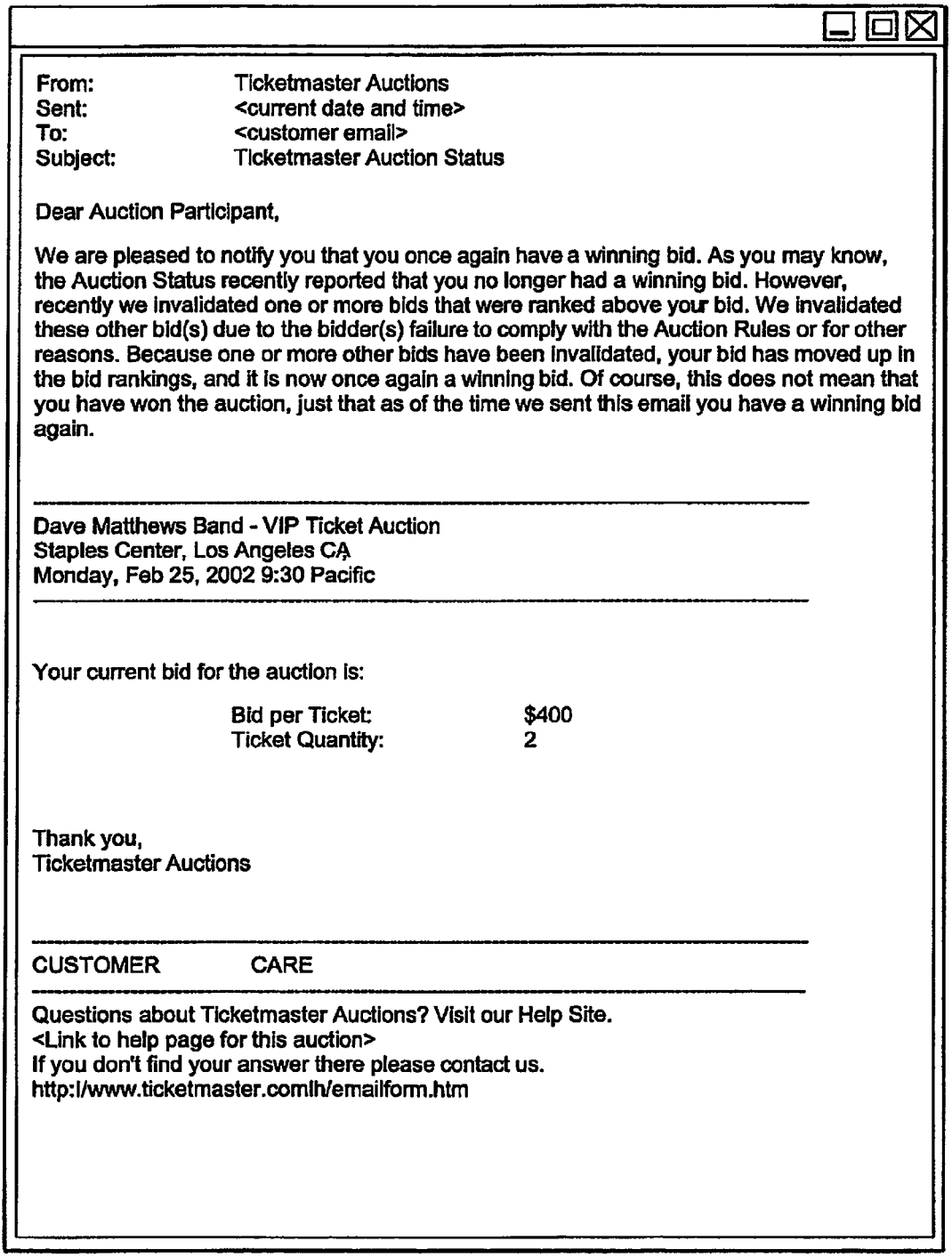
FIG. 43 illustrates example text for a notification regarding a re-winning bid.

FIG. 43 illustrates example text for a notification regarding a re-winning bid, wherein the user's bid previously had a winning bid status, which then transitioned to a losing bid status, and which has then transitioned back to a winning status. The notification text can be can be included in an email, instant message, Web page or other communication before the auction has closed. In this example, the notification informs the user that the bid has transitioned back to winning status as a result of higher winning bids being invalidated (e.g., for failure to comply with the auction rules or for other reasons), and that the user's bid has moved up in the bid ranking. The notification further informs the user that this notification does not mean that the user's bid has finally won. The notification further lists the auction event, venue, date, the user's current bid per ticket, and the ticket quantity the user is bidding on.

Figure 44:
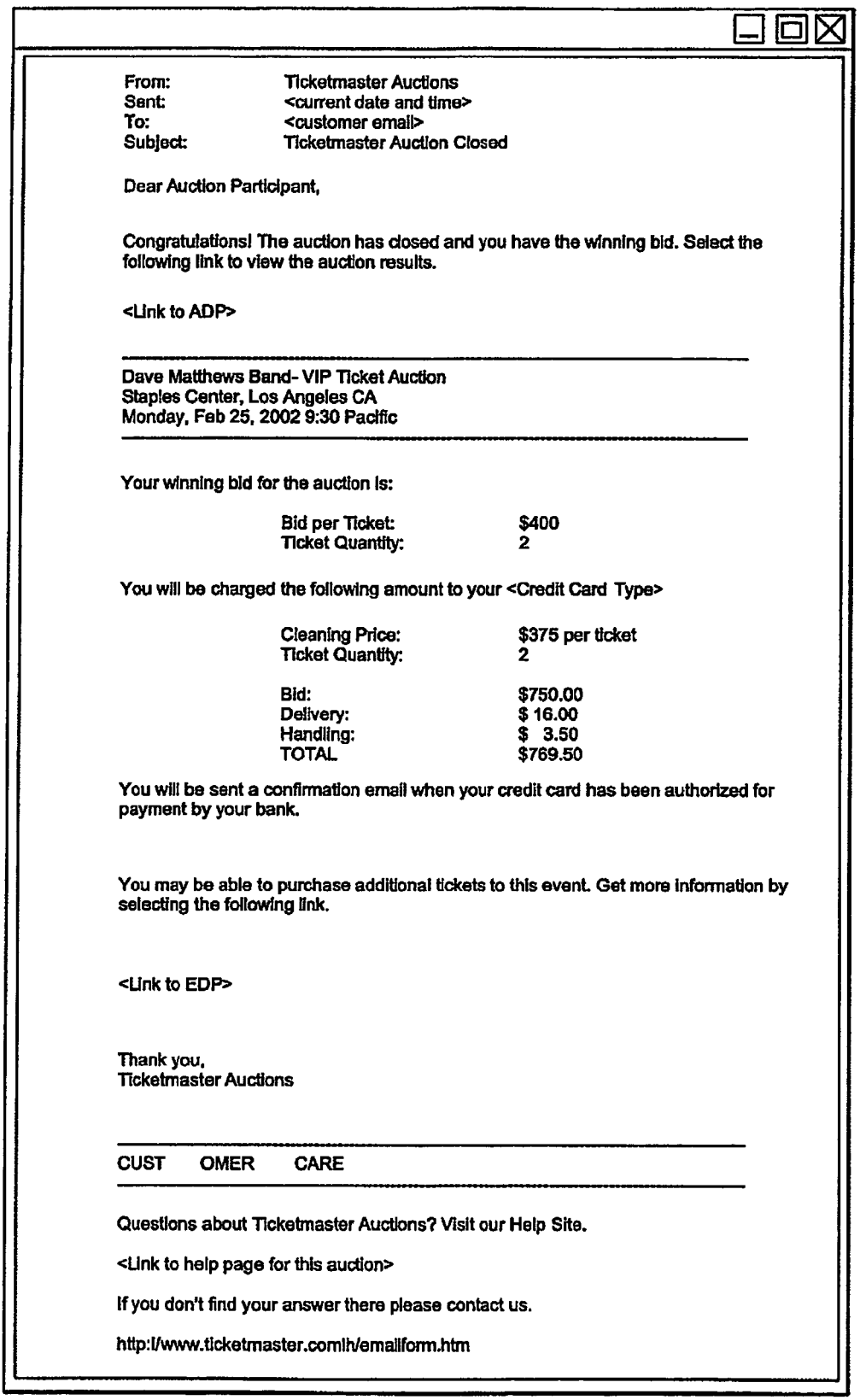
FIG. 44 illustrates example text regarding a winning bid notification.

FIG. 44 illustrates example text regarding a winning bid notification that can be sent in an email, instant message, Web page, or other communication upon the auction close. The winning bid notification informs the user that the auction has closed and that the user has a winning bid. A link if further provided to the auction results. This winning bid notification is for a uniform pricing auction, wherein the user is charged a per ticket clearing price corresponding to the lowest winning bid at the auction close, in addition to applicable delivery and handling fees. The example winning bid notification lists the user's current bid per ticket ($400 per ticket), the ticket quantity the user is bidding on (e.g., 2), the clearing price (e.g., $375 per ticket), the delivery and handling fees (e.g., $16.00 and $3.50 respectively), and a total amount (e.g., $769.50). The winning bid notification further lists the auction event, venue, and date.

Figure 45:
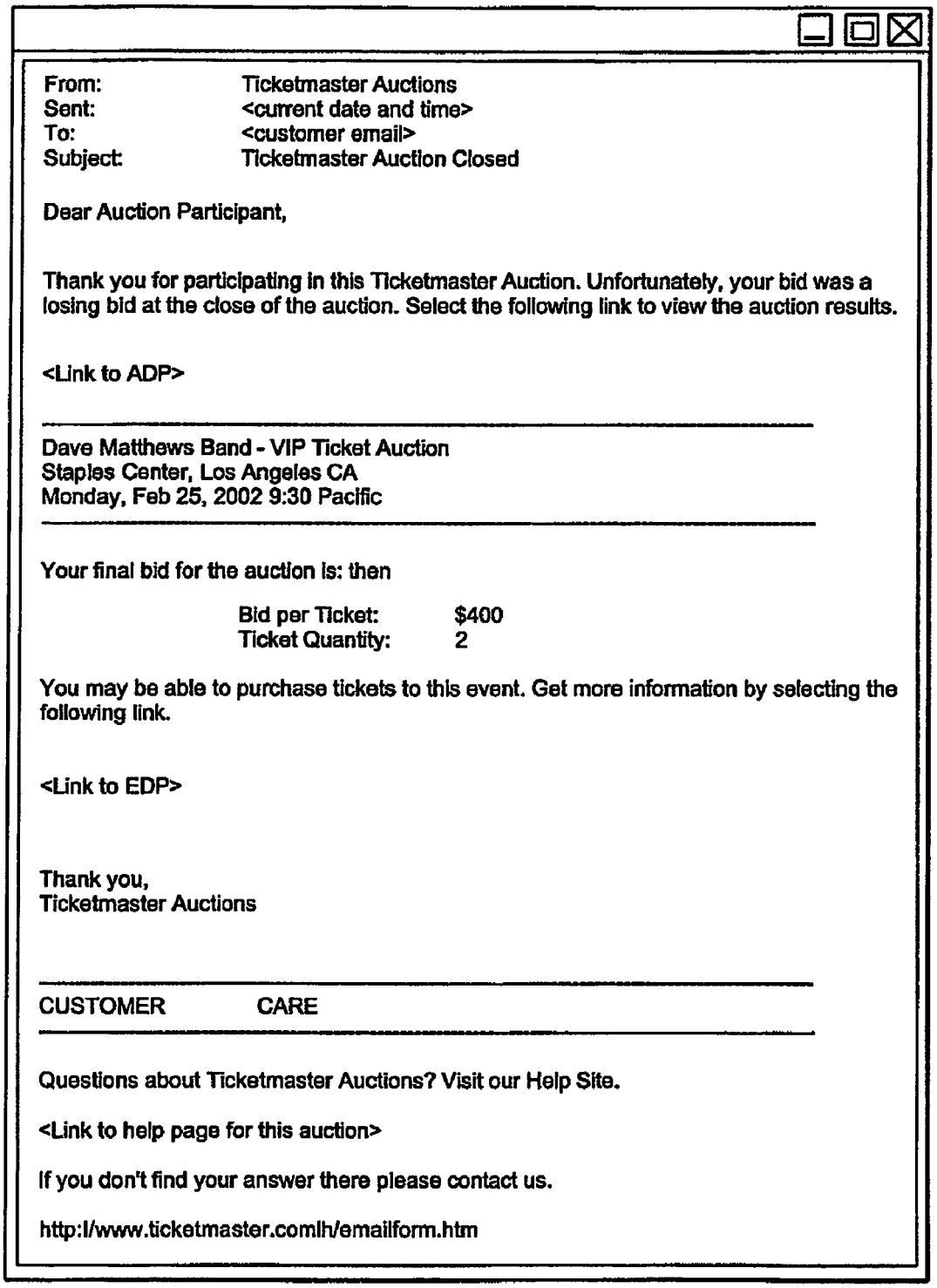
FIG. 45 illustrates example text regarding a losing bid notification.

FIG. 45 illustrates example text regarding a losing bid notification that can be sent in an email, Web page, or other communication upon the auction close. The losing bid notification informs the user that the user's bid was a losing bid at the close of the auction. A link is provided via which the user can view the auction results. The user is informed that the user may be able to purchase tickets for the event (e.g., at a set price), and the notification provides a link to an event detail page (EDP) via which the user can obtain information on purchasing the ticket.

Figure 46:
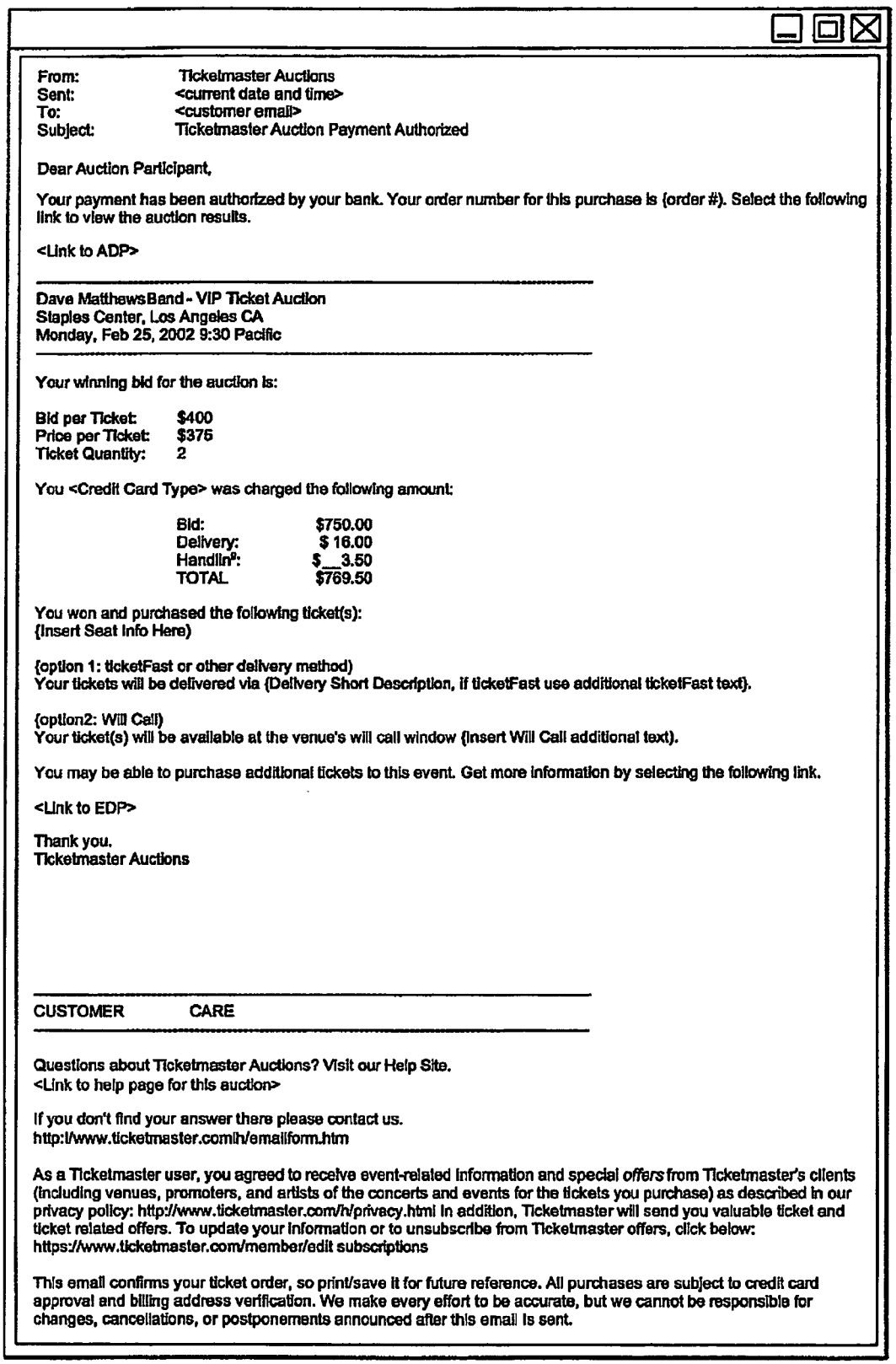
FIGS. 46-47 illustrate example text regarding successful payment authorization.
Figure 47:
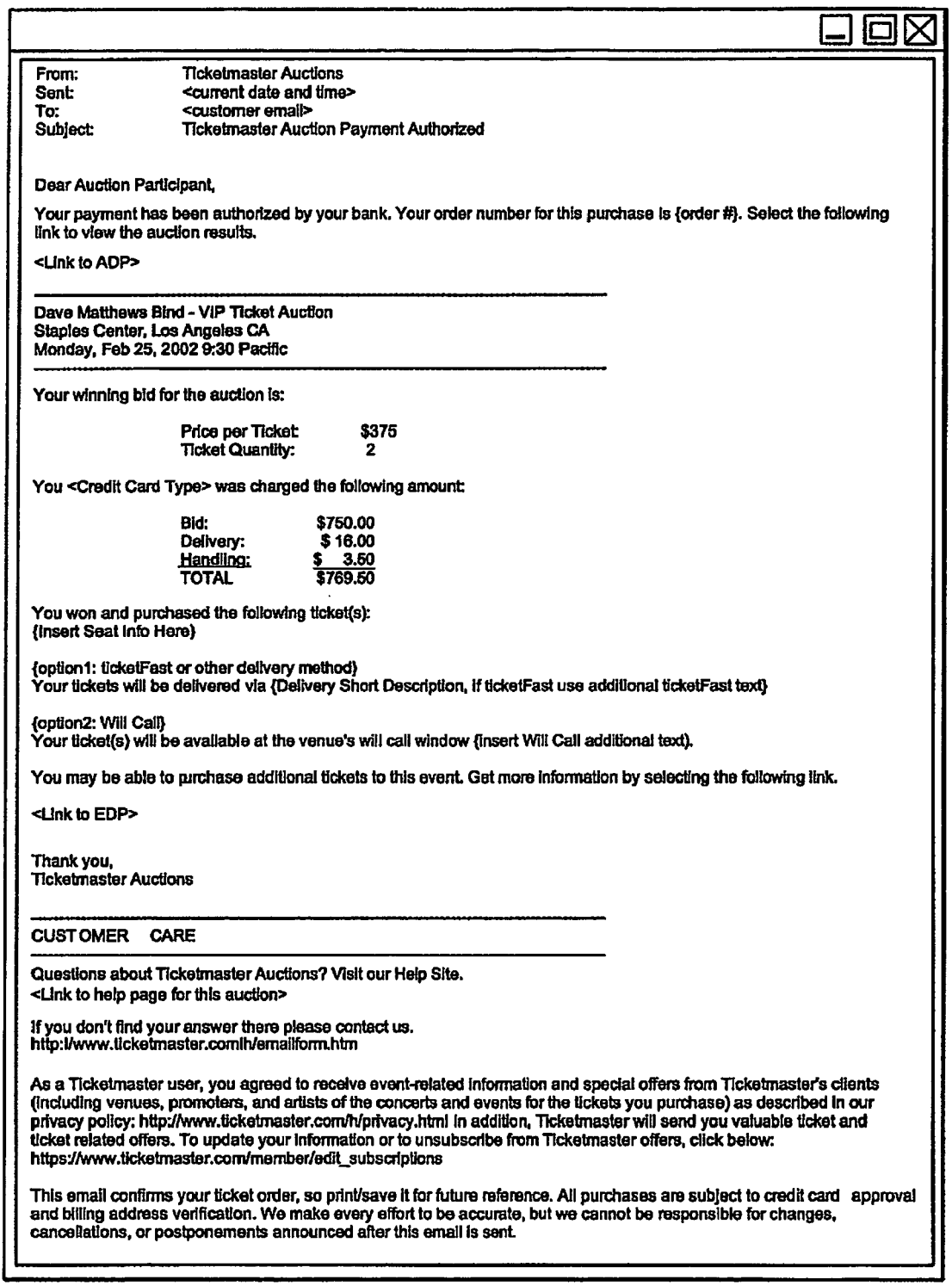

FIGS. 46-47 illustrate example notification text regarding successful payment authorization. For example, with respect to FIG. 46, the notification text is for successful payment authorization for a uniform pricing auction bid, wherein the user has been charged a per ticket clearing price corresponding to the lowest winning bid at the auction close, in addition to applicable delivery and handling fees. The notification informs the user that payment has been authorized (e.g., by the user's bank or credit card company) and provides an order number. In addition, a link is provided to the auction results. The example winning bid notification lists the user's final bid per ticket ($400 per ticket), the ticket quantity the user bid on (e.g., 2), and the actual price per ticket (e.g., $375 per ticket). The notification further lists the total bid amount (price per ticket multiplied by the quantity, e.g., $750), the delivery and handling fees (e.g., $16.00 and $3.50 respectively), and a total amount (e.g., $769.50). The winning bid notification further lists the auction event, venue, and date. The notification further lists ticket information (e.g., seat information), and lists the delivery option selected by the user (e.g., electronic or downloaded ticket or will call window at the venue). The notification provides a link to an event detail page (EDP) via which the user can obtain information on purchasing the ticket.

With respect to FIG. 47, the notification text is for successful payment authorization for a pay-what-you-bid auction bid, wherein the user has been charged what the user bid, in addition to applicable delivery and handling fees, and minus any discounts, rebates, and so on if such are appropriate. The notification informs the user that payment has been authorized (e.g., by the user's bank or credit card company) and provides an order number. In addition, a link is provided to the auction results. The example winning bid notification lists the user's final bid per ticket (price per ticket: $375 per ticket), and the ticket quantity the user bid on (e.g., 2). The notification further lists the total bid amount (price per ticket multiplied by the quantity, e.g., $750), the delivery and handling fees (e.g., $16.00 and $3.50 respectively), and a total amount (e.g., $769.50). The winning bid notification further lists the auction event, venue, and date. The notification further lists ticket information (e.g., seat information), and lists the delivery option selected by the user (e.g., electronic or downloaded ticket or will call window at the venue). The notification provides a link to an event detail page (EDP) via which the user can obtain information on purchasing the ticket.

FIG. 48 illustrates an example group discount form for an auction. The form lists the auction event, venue, and date, as well as the auction start and end dates and times. The "bid on tickets" area of FIG. 81 provides fields via which the user can enter the number of desired tickets, the maximum amount the user is willing to bid per ticket, and a request for an email communication if the user is outbid. The user interface also includes an auction status area that provides auction information, such as bidding information (e.g., the current low bid) for several categories or groups of seats, auction starting bid per ticket, and the time remaining in the auction. An invite area is provided informing the user that the user can collect money (e.g., a credit, a rebate, a discount, etc.) by inviting friends to the auction event. A link is provided to an invitation Web site page (e.g., eVITE). Optionally, the discount, credit, rebate, or the like can be based on the number of event tickets purchased by the invitees (e.g., via the auction and/or at set, predetermined prices) and/or the number of invitees that purchased event tickets. Optionally, the invitees can also be given a credit, a rebate, a discount, or the like, which can be the same as that given to the inviter, or different than that given to the inviter.

FIG. 49 illustrates an example invitation form wherein the user can enter information regarding an invitee and the event the user is inviting the invitee to (e.g., an event for which the user is bidding on or has had a winning bid), including host, venue, address, phone number, event name, event type, date, event begin time, event end time, and so on. The user can also schedule invitations to periodically go out for recurring events. Optionally, some or all of the foregoing information can be pre-populated by the auction system or selected from by the user from a menu of choices provided by the auction system. Optionally, the user can manually type in a guest list of invitee names and email addresses and/or select invitees and email address from an online or local electronic address book. The user can optionally enter an invitation message (e.g., a greeting, event details, etc.). The invitation will then be sent to the invitees who can accept or decline. The acceptance or declining of the invitation will be communicated back to the user.

Figure 55:
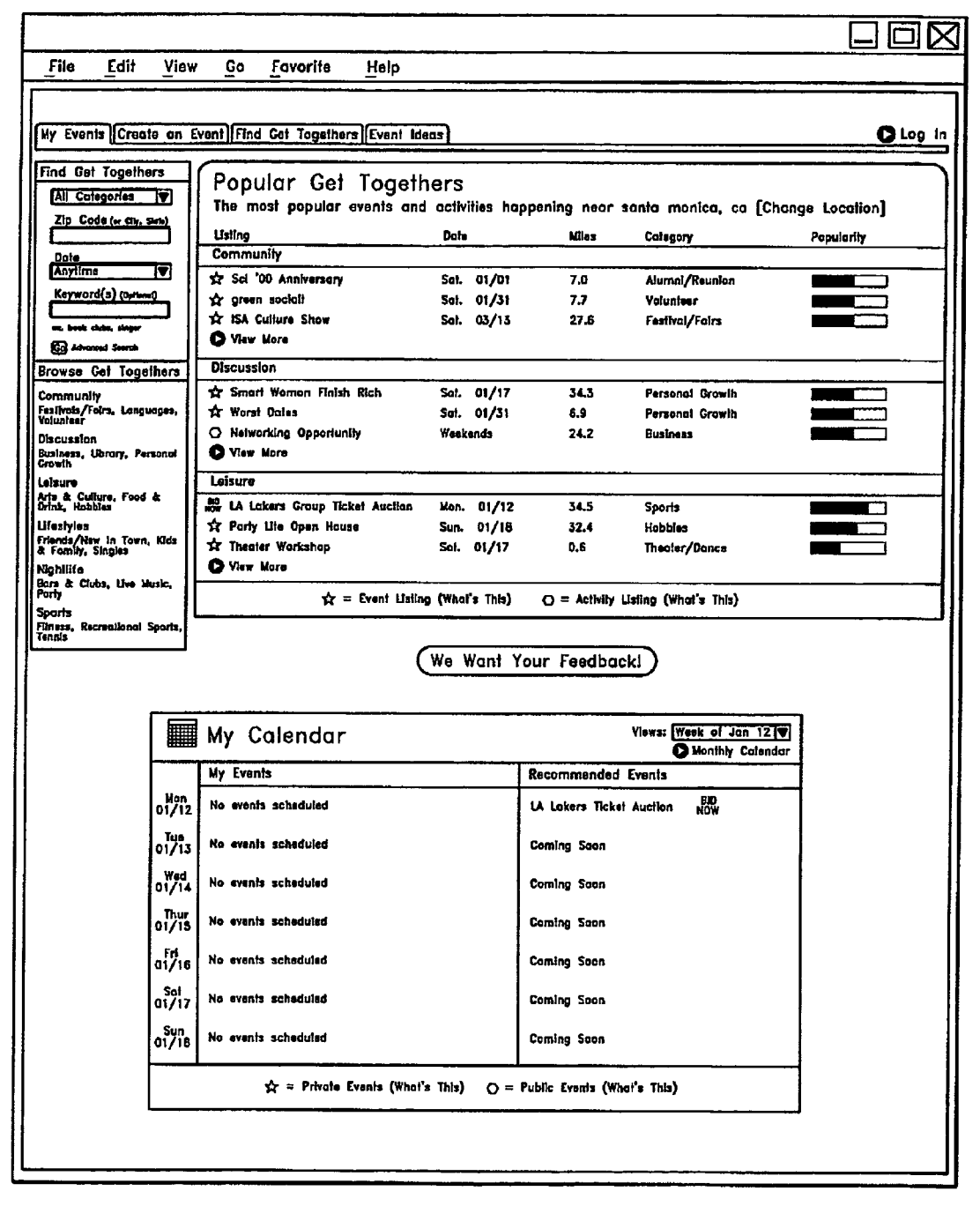

FIG. 55 illustrates an example invitation related page, listing events that others are issuing invitations for (optionally including popularity ratings, distance from a user address, and dates), as well as the user's calendar of ticketed and/or other events. The user's calendar can be hosted by the auction system and/or on the client terminal (e.g., on the user's Microsoft Outlook calendar or other personal information calendar. The auction system also selects recommended events and lists the recommended events on the user's calendar. The system can select the recommended events based on the user's profile (e.g., geographical location, preferred types of music, preferred artists, preferred teams, purchase history of other event tickets), and can optionally further use collaborative filtering (e.g., filtering that makes inferences or predictions regarding a user's interests based at least in part purchases and interest indications of other users with similar or overlapping profiles as the user), to select recommend events.

Figure 57:
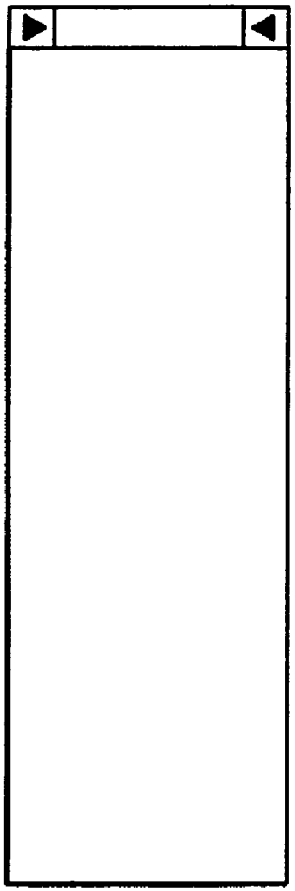
FIG. 57 illustrates an example assistance request form.

FIG. 57 illustrates an example form via which the user can request ticket sale/auction assistance from the auction system. Optionally, the user can select a main topic via a main topic dropdown menu or dialog box. Once the user selects a main topic, the system will list corresponding subtopic upon the user selecting a subtopic dropdown menu or dialog box. A message field is provided via which the user can enter a text message. Fields are provided via which the user can enter an applicable order number, presale password, or discount offer code/password.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. An electronic ticket auction system, comprising:
   a computer system configured to receive over a network user ticket bids in a ticket auction, including a bid from a first user and a bid from a second user, wherein the first user bid includes a first bid amount, and the second user bid includes a second bid amount that is less than the first bid amount;
   a data store configured to store the bid amounts; and
   program code stored in computer readable memory, the program code configured to:
   determine which bids are winning bids, wherein the winning bids include at least the first bid and the second bid;
   determine a ticket price for the users associated with the winning bids based on the second bid amount, wherein the first user is assigned a ticket at a price based on the second amount and that is less than the first bid amount;

cause an auction user interface to be displayed to at least one user, the auction user interface identifying:
an event for which tickets are being auctioned:
a plurality of ticket groups for the event for which tickets are being auctioned;
a maximum number of tickets that a given user can bid on with respect to tickets in a first ticket group of the plurality of ticket groups, wherein the maximum number is less than the number of tickets in the first ticket group that are up for bid;
corresponding current low winning bids for the ticket groups;
a minimum acceptable bid; and
a minimum bid increment;

selectively perform fair slotting packing and/or full shuffling packing in response to a packing instruction accessed from computer readable memory.

2. The electronic auction system as defined in claim 1, further comprising program code stored in computer readable memory configured to transmit an email, SMS message, or instant message to the first user that indicates that the first user bid is a winning bid, the notification further listing:
the first bid value; and
the ticket price, wherein the ticket price is different than the first bid value.

3. The electronic auction system as defined in claim 1, further comprising program code stored in computer readable memory configured to cause an auction user interface to be displayed on a user terminal, the auction user interface indicating that:
event tickets for at least a first ticket group are no longer available via the auction; and
event tickets are available for purchase at set prices.

4. The electronic auction system as defined in claim 1, further comprising program code stored in computer readable memory configured to:
transmit for display on a user terminal a list of ticket groups prior to accepting bids, wherein the ticket groups are not displayed in association with corresponding initial minimum bids during a period prior to accepting bids for the auction; and
transmit for display on the user terminal the list of ticket groups after receiving at least a first amount of bids, wherein one or more of the ticket groups are displayed in association with corresponding minimum bids.

5. The electronic auction system as defined in claim 1, further comprising program code stored in computer readable memory configured to change a bid status of at least one bid from losing to winning at least partly in response to another bid being invalidated.

6. The electronic auction system as defined in claim 1, further comprising program code stored in computer readable memory configured to assign a won-pending status to at least one bid at least partly in response to an occurrence of a first condition and to assign a won-paid status to the at least one bid at least partly in response to the occurrence of a second condition.

7. The electronic auction system as defined in claim 1, further comprising program code stored in computer readable memory configured to adjust downward the ticket price for at least one user in response to a discount condition.

8. The electronic auction system as defined in claim 1, further comprising program code stored in computer readable memory configured to determine a handling charge for at least one ticket associated with a winning bid.

9. The electronic auction system as defined in claim 1, further comprising program code stored in computer readable memory configured to transmit a notification to at least one user that bids are not being accepted due to system maintenance.

10. The electronic auction system as defined in claim 1, further comprising program code stored in computer readable memory configured to transmit:
a first notice to be provided to a bidder whose bid status has changed from winning to losing;
a second notice to be provided to a bidder if the bidder's bid status changed from losing to winning, wherein the status change is not a result of a bid increase by the bidder;
a third notice to be provided to a bidder with a winning bid after the auction close and prior to completion of the payment process; and
a fourth notice to be provided to a bidder with a winning bid after the auction close and after completion of the payment process.

11. The electronic auction system as defined in claim 1, further comprising program code stored in computer readable memory configured to transmit a user auction history that includes an identification of auctions to which the user has submitted bids, the user's current bid amounts for at least a portion of the identified auctions, and the bid status.

12. The electronic auction system as defined in claim 1, further comprising rules stored in computer readable memory for:
a first auction type wherein winning bidders for tickets in a first ticket group are charged a per ticket price corresponding to the lowest winning bid for the first ticket group; and
a second auction type wherein winning bidders for tickets in a first ticket group are charged a per ticket price corresponding to the amount of their corresponding winning bids.

13. The electronic auction system as defined in claim 1, further comprising a discount amount stored in computer readable memory, wherein the discount amount is to be applied against a ticket purchase from at least one bidder.

14. The electronic auction system as defined in claim 1, further comprising a rule stored in computer readable memory that specifies that ticket bids must be for an even number of tickets or a specified multiple number of tickets.

15. The electronic auction system as defined in claim 1, further comprising an electronic auction form that receives auction criteria used to define the auction, the form including:
an auction start field, configured to receive an auction start date;
an auction end field, configured to receive an auction end date; and
a packing field, configured to receive an indication as to whether a packing process is to be performed.

16. The electronic auction system as defined in claim 1, further comprising an auction form used to receive auction criteria, the form including a charity identification field configured to receive an identification of a charity that is to receive a portion of auction proceeds.

17. The electronic auction system as defined in claim 1, further comprising a data store that includes venue section rankings, wherein seats in at least one ranked section are unranked with respect to other seats in the section, wherein the venue section rankings indicate the relative quality of the venues.

18. An electronic ticket auction system, comprising:
a computer system configured to receive ticket bids over a network in an auction that includes a plurality of ticket groups for an event, including ticket bids from a first plurality of bidders for tickets in at least a first ticket group offered in the auction, the ticket bids including associated bid amounts;

computer readable memory operable to store the bid amounts; and program code stored in computer readable memory, the program code configured to:

cause an auction user interface to be displayed to at least one user, the auction user interface identifying:
  the event for which tickets are being auctioned:
  the plurality of ticket groups for the event for which tickets are being auctioned;
  a maximum number of tickets that a given user can bid on with respect to tickets in the first ticket group, wherein the maximum number is less than the number of tickets in the first ticket group that are up for bid;

determine which bids are winning bids with respect to bids for tickets in the first ticket group;

determine a ticket price for first group tickets associated with the winning bids, wherein the ticket price for tickets associated with the winning bids is based on the lowest winning bid amount for a first group ticket;

selectively perform fair slotting packing and/or full shuffling packing in response to a packing instruction accessed from computer readable memory.

19. The electronic auction system as defined in claim 18, further comprising program code stored in computer readable memory configured to transmit an email, SMS message, or instant message to a bidder having a winning bid a notification informing the bidder that the bidder's bid is a winning bid, the notification further providing:
  the bidder's highest bid amount; and
  the ticket price, wherein the bidder's highest bid amount is different than the ticket price.

20. The electronic auction system as defined in claim 18, further comprising program code stored in computer readable memory configured to cause an auction user interface to be displayed on a bidder terminal, the auction user interface identifying:
  a minimum acceptable auction bid for each of the plurality of ticket groups; and
  a minimum bid increment corresponding to each of the plurality of ticket groups.

21. The electronic auction system as defined in claim 18, further comprising program code stored in computer readable memory configured to cause an auction user interface to be displayed on a bidder terminal, the auction user interface indicating that:
  event tickets are no longer available via the auction; and
  event tickets are available for purchase at set prices.

22. The electronic auction system as defined in claim 18, further comprising program code stored in computer readable memory configured to cause an auction user interface to be displayed on a bidder terminal, the auction user interface indicating that event tickets are no longer available via the auction and providing a link to another user interface via which event tickets are available for purchase at set prices.

23. The electronic auction system as defined in claim 18, further comprising an electronic auction form via which an auction definer can define the auction, the form including:
  an auction start field, configured to receive an auction start date;
  an auction end field, configured to receive an auction end date; and
  a packing field, configured to receive an indication as to whether a packing process is to be performed.

24. The electronic auction system as defined in claim 18, further comprising an auction form used to receive auction criteria, the form including a charity identification field configured to receive an identification of a charity that is to receive a portion of auction proceeds.

25. The electronic auction system as defined in claim 18, further comprising an electronic auction form via which an auction definer can define the auction, the form including:
  fields via which ticket groups can be defined; and
  fields via which descriptions of the ticket groups can be entered.

26. The electronic auction system as defined in claim 18, further comprising program code stored in computer readable memory configured to:
  transmit for display on a bidder terminal a list of ticket groups prior to accepting bids, wherein the ticket groups are not displayed in association with corresponding low winning bids during a period prior to accepting bids in the auction; and
  transmit for display on the bidder terminal the list of ticket groups after receiving at least a first amount of bids, wherein the ticket groups are displayed in association with corresponding low winning bids.

27. The electronic auction system as defined in claim 18, further comprising program code stored in computer readable memory configured to change the bid status of at least one bid from losing to winning at least partly in response to another bid being invalidated.

28. The electronic auction system as defined in claim 18, further comprising program code stored in computer readable memory configured to assign a won-pending status to at least one bid at least partly in response to an occurrence of a first condition and to assign a won-paid status to the at least one bid at least partly in response to the occurrence of a second condition.

29. The electronic auction system as defined in claim 18, further comprising program code stored in computer readable memory configured to adjust downward the amount of the price paid for a ticket obtained via the auction at least partly in response to a discount condition.

30. The electronic auction system as defined in claim 18, further comprising program code stored in computer readable memory configured to inform a bidder of a handling charge for at least one ticket associated with a winning bid.

31. The electronic auction system as defined in claim 18, further comprising program code stored in computer readable memory configured to transmit a notification to at least one bidder that bids are not being accepted due to system maintenance.

32. The electronic auction system as defined in claim 18, further comprising program code stored in computer readable memory configured to transmit an indication to at least one bidder that bids are not being accepted and providing an indication as to when bids will be accepted.

33. The electronic auction system as defined in claim 18, further comprising program code stored in computer readable memory configured to transmit:
  a first notice to be provided to a bidder whose bid status has changed from winning to losing;
  a second notice to be provided to a bidder if the bidder's bid status changed from losing to winning, wherein the status change is not a result of a bid increase by the bidder;
  a third notice to be provided to a bidder with a winning bid after the auction close and prior to completion of the payment process; and a fourth notice to be provided to a bidder with a winning bid after the auction close and after completion of the payment process.

34. The electronic auction system as defined in claim 18, further comprising program code stored in computer readable memory configured to transmit a bidder auction history that includes an identification of auctions to which the bidder has submitted bids, the bidder's current bid amounts for at least a portion of the identified auctions, and bid status.

35. The electronic auction system as defined in claim 18, further comprising rules stored in computer readable memory for:
a first auction wherein winning bidders for tickets in a first ticket group are charged a per ticket price corresponding to the lowest winning bid for the first ticket group; and
and a second auction wherein winning bidders for tickets in a first ticket group are charged a per ticket price corresponding to the amount of their corresponding winning bids.

36. The electronic auction system as defined in claim 18, further comprising a discount amount stored in computer readable memory, wherein the discount amount is to be applied against a ticket purchase from at least one bidder.

37. The electronic auction system as defined in claim 18, further comprising a rule stored in computer readable memory that specifies that ticket bids for a first auction must be for an even numbers of tickets.

38. The electronic auction system as defined in claim 18, further comprising program instructions stored in computer readable memory and configured to provide an auction bidder with a plurality of ticket delivery choices, including at least delivery by:
email;
physical mail; or
box office.

39. The electronic auction system as defined in claim 18, wherein the winning bid determination is done in batch mode.

40. An electronic ticket auction system, comprising:
a system configured to receive over a network user ticket bids in a ticket auction, including a bid from a first user and a bid from a second user, wherein the first user bid includes a first bid amount, and the second user bid includes a second bid amount that is less than the first bid amount;
a data store configured to store:
the first and second bid amounts;
a rule that specifies that ticket bids must be for an even number of tickets or a specified multiple number of tickets;
rankings for venue seats; and
program code stored in computer readable memory, the program code configured to:
determine a ticket price for the users associated with winning bids using the second bid amount, wherein the first user is assigned a ticket at a price using the second amount and that is less than the first bid amount;
change a bid status of at least one bid from losing to winning at least partly in response to another bid being invalidated;
notify at least one user if the at least one user's bib status changed from losing to winning, wherein the status change is not a result of a bid increase by the at least one user;
determine whether no tickets remain available for the event via auction, and at least partly in response to determining there are no remaining tickets available for the event via auction, notify the at least one user that a ticket for the event is available for purchase at a fixed price;
at least partly cause an auction user interface to be displayed to at least one user, the auction user interface identifying:
an event for which tickets are being auctioned:
a plurality of ticket groups for the event for which tickets are being auctioned;
a maximum number of tickets that a given user can bid on with respect to tickets in a first ticket group, wherein the maximum number is less than the number of tickets in the first ticket group that are up for bid;
corresponding current low winning bids for the ticket groups;
a minimum acceptable bid for each of the plurality of ticket groups; and
a minimum bid increment corresponding to each of the plurality of ticket groups;
selectively perform fair slotting packing and/or full shuffling packing in response to a packing instruction accessed from computer readable memory.

41. The electronic auction system as defined in claim 40, further comprising program code stored in computer readable memory configured to:
transmit for display on a user terminal a list of ticket groups prior to accepting bids, wherein the ticket groups are not displayed in association with corresponding initial minimum bids during a period prior to accepting bids for the auction; and
transmit for display on the user terminal the list of ticket groups after receiving at least a first amount of bids, wherein one or more of the ticket groups are displayed in association with corresponding minimum bids.

42. The electronic auction system as defined in claim 40, further comprising program code stored in computer readable memory configured to adjust downward the ticket price for at least one user in response to discount information provided by the at least one user.

43. The electronic auction system as defined in claim 40, further comprising program code stored in computer readable memory configured to transmit a user auction history that includes an identification of auctions to which the user has submitted bids, the user's current bid amounts for at least a portion of the identified auctions, and the bid status.

44. The electronic auction system as defined in claim 40, further comprising rules stored in computer readable memory for:
a first auction type wherein winning bidders for tickets in a first ticket group are charged a per ticket price corresponding to the lowest winning bid for the first ticket group; and
a second auction type wherein winning bidders for tickets in a first ticket group are charged a per ticket price corresponding to the amount of their corresponding winning bids.

45. The electronic auction system as defined in claim 40, further comprising a fixed discount stored in computer readable memory, wherein the discount is to be applied against a ticket purchase from at least one bidder.

46. The electronic auction system as defined in claim 40, further comprising an electronic auction form that receives auction criteria used to define the auction, the form including:
an auction start field, configured to receive an auction start date;

an auction end field, configured to receive an auction end date; and a packing field, configured to receive an indication as to whether a packing process is to be performed.

47. The electronic auction system as defined in claim 40, further comprising an auction form used to receive auction criteria, the form including a charity identification field configured to receive an identification of a charity that is to receive a portion of auction proceeds.

48. The electronic auction system as defined in claim 40, further comprising:

a data store that includes venue section rankings, wherein seats in a first ranked section are unranked with respect to other seats in the first ranked section, and wherein seats in a second ranked section are ranked with respect to other seats in the second ranked section.

* * * * *

UNITED STATES PATENT AND TRADEMARK OFFICE
CERTIFICATE OF CORRECTION

PATENT NO. : 7,584,123 B1  Page 1 of 1
APPLICATION NO. : 11/100336
DATED : September 1, 2009
INVENTOR(S) : Andrew Karonis et al.

It is certified that error appears in the above-identified patent and that said Letters Patent is hereby corrected as shown below:

(Item 56), Page 4, Col. 2, line 31, Under Other Publications, change "retreived" to --retrieved--.

(Item 56), Page 4, Col. 2, line 33, Under Other Publications, change "retreived" to --retrieved--.

(Item 56), Page 4, Col. 2, line 54, Under Other Publications, change "Internate" to --Internet--.

(Item 56), Page 4, Col. 2, line 55, Under Other Publications, change "Univiersity" to --University--.

Sheet 29 of 67, (Above Box No. 2424A), line 1, Change "POICY" to --POLICY--.

Column 51, line 16, In Claim 35, change "and a second" to --a second--.

Column 51, line 61, In Claim 40, change "bib" to --bid--.

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,584,123 B1
APPLICATION NO. : 11/100336
DATED : September 1, 2009
INVENTOR(S) : Karonis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1105 days.

Signed and Sealed this

Fourteenth Day of September, 2010

David J. Kappos
*Director of the United States Patent and Trademark Office*